(12) United States Patent
Wong

(10) Patent No.: US 10,515,726 B2
(45) Date of Patent: Dec. 24, 2019

(54) REDUCING THE COULOMBIC BARRIER TO INTERACTING REACTANTS

(71) Applicant: Alpha Ring International, Ltd., Grand Cayman (KY)

(72) Inventor: Alfred Y. Wong, Los Angeles, CA (US)

(73) Assignee: Alpha Ring International, Ltd., Monterey, CA (US)

( * ) Notice: Subject to any disclaimer, the term of this patent is extended or adjusted under 35 U.S.C. 154(b) by 0 days.

(21) Appl. No.: 15/973,306

(22) Filed: May 7, 2018

(65) Prior Publication Data

US 2019/0057781 A1    Feb. 21, 2019

Related U.S. Application Data

(63) Continuation-in-part of application No. 15/589,902, filed on May 8, 2017, now Pat. No. 10,319,480, which is a continuation-in-part of application No. 14/318,246, filed on Jun. 27, 2014, now abandoned, and a continuation-in-part of application No. 14/205,339, filed on Mar. 11, 2014, now Pat. No.
(Continued)

(51) Int. Cl.
| | |
|---|---|
| *H05H 3/06* | (2006.01) |
| *G21B 1/05* | (2006.01) |
| *G21B 3/00* | (2006.01) |
| *G21B 1/21* | (2006.01) |
| *G21B 1/13* | (2006.01) |
| *H05H 1/16* | (2006.01) |

(52) U.S. Cl.
CPC ............. *G21B 1/05* (2013.01); *G21B 1/13* (2013.01); *G21B 1/21* (2013.01); *G21B 3/006* (2013.01); *G21B 3/008* (2013.01); *H05H 1/16* (2013.01); *Y02E 30/126* (2013.01)

(58) Field of Classification Search
CPC ... G21B 1/00; G21B 1/05; G21B 1/11; G21B 1/15; G21B 3/00; G21B 3/006
See application file for complete search history.

(56) References Cited

U.S. PATENT DOCUMENTS

| | | |
|---|---|---|
| 3,005,767 A | 11/1958 | Boyer et al. |
| 3,014,857 A | 12/1961 | Gow et al. |
| (Continued) | | |

FOREIGN PATENT DOCUMENTS

| | | |
|---|---|---|
| EP | 0 645 777 A1 | 3/1995 |
| FR | 2217903 A1 | 9/1974 |
| (Continued) | | |

OTHER PUBLICATIONS

U.S. Notice of Allowance dated Nov. 28, 2018 in U.S. Appl. No. 15/006,669.
(Continued)

*Primary Examiner* — Marshall P O'Connor
(74) *Attorney, Agent, or Firm* — Weaver Austin Villeneuve & Sampson LLP

(57) ABSTRACT

Methods, apparatuses, devices, and systems for producing and controlling and fusion activities of nuclei. Hydrogen atoms or other neutral species (neutrals) are induced to rotational motion in a confinement region as a result of ion-neutral coupling, in which ions are driven by electric and magnetic fields. The controlled fusion activities cover a spectrum of reactions including aneutronic reactions such as proton-boron-11 fusion reactions.

20 Claims, 30 Drawing Sheets

Related U.S. Application Data 9,245,654, application No. 15/973,306, which is a continuation-in-part of application No. 15/589,913, filed on May 8, 2017, now Pat. No. 10,269,458, and a continuation-in-part of application No. 15/679,094, filed on Aug. 16, 2017, now abandoned, which is a continuation-in-part of application No. 15/589,886, filed on May 8, 2017, now abandoned, application No. 15/973,306, which is a continuation-in-part of application No. 15/679,091, filed on Aug. 16, 2017, now abandoned, which is a continuation of application No. 15/589,905, filed on May 8, 2017, now abandoned.

(60) Provisional application No. 62/503,680, filed on May 9, 2017, provisional application No. 61/925,131, filed on Jan. 8, 2014, provisional application No. 61/925,114, filed on Jan. 8, 2014, provisional application No. 61/925,148, filed on Jan. 8, 2014, provisional application No. 61/925,142, filed on Jan. 8, 2014, provisional application No. 61/925,122, filed on Jan. 8, 2014, provisional application No. 61/843,015, filed on Jul. 4, 2013, provisional application No. 61/841,834, filed on Jul. 1, 2013, provisional application No. 61/840,428, filed on Jun. 27, 2013, provisional application No. 61/776,592, filed on Mar. 11, 2013.

(56) References Cited

U.S. PATENT DOCUMENTS

| | | |
|---|---|---|
| 3,029,199 A | 4/1962 | Baker et al. |
| 3,170,841 A | 2/1965 | Post |
| 3,343,020 A | 9/1967 | Gordon |
| 3,386,883 A | 6/1968 | Farnsworth |
| 3,663,360 A | 5/1972 | Post |
| 3,722,677 A | 3/1973 | Lehnert |
| 3,937,917 A | 2/1976 | Consoli |
| 4,046,527 A | 9/1977 | Kistemaker |
| 4,090,855 A | 5/1978 | Hora et al. |
| 4,145,250 A | 3/1979 | Ohkawa et al. |
| 4,189,346 A | 2/1980 | Jarnagin |
| 4,211,620 A | 7/1980 | Fowler |
| 4,347,621 A | 8/1982 | Dow |
| 4,363,775 A | 12/1982 | Bussard et al. |
| 4,563,341 A | 1/1986 | Flynn |
| 4,735,762 A | 4/1988 | Lasche |
| 4,767,590 A | 8/1988 | Stix et al. |
| 5,042,058 A | 8/1991 | Rentzepis |
| 5,076,971 A | 12/1991 | Barker |
| 5,182,075 A | 1/1993 | Gotoh et al. |
| 5,968,231 A | 10/1999 | Parmentier et al. |
| 6,096,220 A | 8/2000 | Ohkawa |
| 6,214,223 B1 | 4/2001 | Ohkawa |
| 6,217,776 B1 | 4/2001 | Ohkawa |
| 6,235,202 B1 | 5/2001 | Ohkawa |
| 6,248,240 B1 | 6/2001 | Ohkawa |
| 6,251,281 B1 | 6/2001 | Ohkawa |
| 6,251,282 B1 | 6/2001 | Putvinski et al. |
| 6,258,216 B1 | 7/2001 | Ohkawa |
| 6,322,706 B1 | 11/2001 | Ohkawa |
| 6,398,920 B1 | 6/2002 | Ohkawa et al. |
| 6,515,281 B1 | 2/2003 | Ohkawa |
| 6,593,539 B1 | 7/2003 | Miley et al. |
| 6,611,106 B2 | 8/2003 | Monkhorst et al. |
| 6,617,775 B1 | 9/2003 | Seward, III et al. |
| 6,654,433 B1 | 11/2003 | Boscoli |
| 6,726,844 B2 | 4/2004 | Ohkawa |
| 6,730,231 B2 | 5/2004 | Putvinski |
| 6,787,044 B1 | 9/2004 | Freeman et al. |
| 6,891,911 B2 | 5/2005 | Rostoker et al. |
| 7,015,646 B2 | 3/2006 | Rostoker et al. |
| 7,026,763 B2 | 4/2006 | Rostoker et al. |
| 7,719,199 B2 | 5/2010 | Monkhorst |
| 8,298,318 B2 | 10/2012 | Wong |
| 8,461,762 B2 | 6/2013 | Rostoker |
| 8,760,086 B2 | 6/2014 | Heid |
| 8,934,599 B2 | 1/2015 | Birnbach |
| 9,058,904 B2 | 6/2015 | Birnbach |
| 9,224,505 B2 | 12/2015 | Wong |
| 9,245,654 B2 | 1/2016 | Wong |
| 10,255,998 B2 | 4/2019 | Wong |
| 10,269,458 B2 | 4/2019 | Wong |
| 10,274,225 B2 | 4/2019 | Wong |
| 10,319,480 B2 | 6/2019 | Wong |
| 2003/0006707 A1 | 1/2003 | Monkhorst et al. |
| 2003/0223528 A1 | 12/2003 | Miley et al. |
| 2004/0047442 A1 | 3/2004 | Monkhorst et al. |
| 2004/0095705 A1 | 5/2004 | Mills et al. |
| 2004/0213368 A1 | 10/2004 | Rostoker et al. |
| 2005/0129160 A1 | 6/2005 | Indech |
| 2005/0173630 A1 | 8/2005 | Ohkawa |
| 2005/0249324 A1 | 11/2005 | Meacham |
| 2005/0280372 A1 | 12/2005 | Anderson |
| 2006/0198485 A1 | 9/2006 | Binderbauer |
| 2008/0169764 A1 | 7/2008 | Monkhorst et al. |
| 2008/0226011 A1 | 9/2008 | Barnes |
| 2009/0122940 A1 | 5/2009 | Breed |
| 2010/0243816 A1 | 9/2010 | Gochnour |
| 2010/0293947 A1 | 11/2010 | Chen |
| 2010/0294666 A1 | 11/2010 | Wong |
| 2011/0142185 A1 | 6/2011 | Woodruff |
| 2011/0148248 A1 | 6/2011 | Landa |
| 2011/0188623 A1 | 8/2011 | Wong |
| 2013/0089171 A1 | 4/2013 | Sykes et al. |
| 2013/0127376 A1 | 5/2013 | Heid |
| 2013/0148770 A1 | 6/2013 | Mofakhami |
| 2013/0229086 A1 | 9/2013 | Meinke |
| 2013/0315360 A1 | 11/2013 | Wong |
| 2014/0126679 A1 | 5/2014 | Egely |
| 2014/0219407 A1 | 8/2014 | Wong |
| 2015/0380113 A1 | 12/2015 | Wong et al. |
| 2016/0155517 A1 | 6/2016 | Wong |
| 2016/0307649 A1 | 10/2016 | Yazdanbod |
| 2017/0104426 A1 | 4/2017 | Mills |
| 2017/0337989 A1 | 11/2017 | Wong |
| 2017/0352435 A1 | 12/2017 | Wong |
| 2017/0358371 A1 | 12/2017 | Wong |
| 2017/0372801 A1 | 12/2017 | Wong |
| 2018/0005711 A1 | 1/2018 | Wong |
| 2018/0320926 A1 | 11/2018 | Wong |
| 2018/0322962 A1 | 11/2018 | Wong |
| 2018/0322963 A1 | 11/2018 | Wong |
| 2018/0330829 A1 | 11/2018 | Wong |
| 2018/0330830 A1 | 11/2018 | Wong |
| 2019/0057782 A1 | 2/2019 | Wong |
| 2019/0206578 A1 | 7/2019 | Wong |

FOREIGN PATENT DOCUMENTS

| | | |
|---|---|---|
| JP | 56-40424 A | 4/1981 |
| JP | 2016-524705 A | 8/2016 |
| WO | WO 97/10605 A1 | 3/1997 |
| WO | WO 2006/096772 A2 | 9/2006 |

OTHER PUBLICATIONS

U.S. Final Office Action dated Aug. 28, 2018 in U.S. Appl. No. 15/589,902.

U.S. Notice of Allowance dated Jan. 8, 2019 in U.S. Appl. No. 15/589,902.

U.S. Notice of Allowance dated Aug. 29, 2018 in U.S. Appl. No. 15/589,913.

U.S. Notice of Allowance dated Dec. 28, 2018 in U.S. Appl. No. 15/589,913.

U.S. Final Office Action dated Sep. 20, 2018 in U.S. Appl. No. 15/679,094.

U.S. Final Office Action dated Sep. 19, 2018 in U.S. Appl. No. 15/679,091.

(56) References Cited

OTHER PUBLICATIONS

U.S. Office Action dated Aug. 1, 2018 in U.S. Appl. No. 15/590,962.
U.S. Notice of Allowance dated Dec. 14, 2018 in U.S. Appl. No. 15/590,962.
International Search Report and Written Opinion dated Jul. 25, 2018 in International Application No. PCT/US18/31683.
International Search Report and Written Opinion dated Jul. 30, 2018 in International Application No. PCT/US18/31699.
International Search Report and Written Opinion dated Aug. 23, 2018 in International Application No. PCT/US2018/031244.
International Search Report and Written Opinion dated Jul. 23, 2018 in International Application No. PCT/US2018/031224.
International Search Report and Written Opinion dated Aug. 31, 2018 in International Application No. PCT/US18/31703.
International Search Report and Written Opinion dated Jul. 30, 2018 in International Application No. PCT/US18/31640.
International Search Report and Written Opinion dated Jul. 30, 2018 in International Application No. PCT/US18/31666.
U.S. Patent Record of Oral Hearing dated May 19, 2015 in U.S. Appl. No. 12/850,633 and U.S. Appl. No. 13/952,826 [Appeals 2014-006113 and 2014-008529].
U.S. Office Action dated Dec. 29, 2010 in U.S. Appl. No. 11/909,054.
U.S. Final Office Action dated Dec. 7, 2005 in U.S. Appl. No. 10/735,406.
U.S. Office Action dated Jul. 19, 2005 in U.S. Appl. No. 10/735,406.
U.S. Office Action dated Dec. 19, 2011 in U.S. Appl. No. 12/783,550.
U.S. Notice of Allowance dated Jun. 25, 2012 in U.S. Appl. No. 12/783,550.
U.S. Examiner's Answer to Appeal Brief dated Mar. 13, 2014 in U.S. Appl. No. 12/850,633.
U.S. Final Office Action dated Jun. 27, 2013 in U.S. Appl. No. 12/850,633.
U.S. Office Action dated Dec. 1, 2011 in U.S. Appl. No. 12/850,633.
U.S. Office Action dated Jun. 18, 2012 in U.S. Appl. No. 12/850,633.
U.S. Patent Board Decision, Examiner Affirmed dated Jun. 1, 2015 in U.S. Appl. No. 12/850,633.
U.S. Examiner's Answer to Appeal Brief dated Jul. 1, 2014 in U.S. Appl. No. 13/952,826.
U.S. Final Office Action dated Feb. 24, 2014 in U.S. Appl. No. 13/952,826.
U.S. Notice of Allowance dated Aug. 17, 2015 in U.S. Appl. No. 13/952,826.
U.S. Office Action dated Nov. 29, 2013 in U.S. Appl. No. 13/952,826.
U.S. Patent Board Decision, Examiner Affirmed in Part dated Jun. 1, 2015 in U.S. Appl. No. 13/952,826.
U.S. Final Office Action dated Jul. 7, 2015 in U.S. Appl. No. 14/205,339.
U.S. Notice of Allowance dated Sep. 16, 2015 in U.S. Appl. No. 14/205,339.
U.S. Office Action dated Dec. 3, 2014 in U.S. Appl. No. 14/205,339.
U.S. Office Action dated Jun. 13, 2017 in U.S. Appl. No. 15/006,669.
U.S. Office Action dated May 11, 2018 in U.S. Appl. No. 15/006,669.
U.S. Office Action dated Apr. 27, 2017 in U.S. Appl. No. 14/318,246.
U.S. Office Action dated Jan. 18, 2018 in U.S. Appl. No. 15/589,902.
U.S. Office Action dated Jan. 16, 2018 in U.S. Appl. No. 15/594,491.
U.S. Office Action dated Feb. 14, 2018 in U.S. Appl. No. 15/589,913.
U.S. Office Action dated Feb. 27, 2018 in U.S. Appl. No. 15/679,091.
International Search Report and Written Opinion dated Nov. 14, 2014 in Application No. PCT/US14/44681.
International Preliminary Report on Patentability dated Jan. 7, 2016 in International Application No. PCT/US2014/044681.
Alber, D. et al., "Search for neutrons from 'Cold Nuclear Fusion,'" Zetischrift fur Physik A Atomic Nuclei, vol. 333, No. 3, Sep. 1989, pp. 319-320. <doi:https://doi.org/10.1007/BF01294523>.
Alvarez, L.W., et al., "The Catalysis of Nuclear Reactions μ Mesons," Lawrence Berkeley National Laboratory, Dec. 10, 1956, pp. 5. <URL:https://escholarship.org/uc/item/5pp2h0qp>.
The Washington Post, "Panel Opposes Cold Fusion Efforts: [Final Edition]" WP Company LLC d/b/a The Washington Post, Jul. 13, 1989, p. A14.
The Washington Post, "Physicist: Utah Cold-Fusion Gear Doesn't Work: [Final Edition]" WP Company LLC d/b/a The Washington Post., Mar. 29, 1990, p. A03.
Barnes, D.C., "Plasma Centrifuge Heat Engine—A Route to Nonthermal p-$^{11}$B Fusion," Journal of Fusion Energy, vol. 26, No. 1/2, Jun. 2007, pp. 21-23. <doi:10.1007/s10894-006-9037-2>.
Bekhtenev, V.I., et al., "Problems of a Thermonuclear Reactor with a Rotating Plasma," Nculear Fusion, vol. 20, No. 5, Jan. 3, 1980, pp. 579-598. [retrieved Aug. 22, 2016] <URL:http://stacks.iop.org/0029-5515/20/i=5/a=007>.
Bencze, Gy., et al., "Coulomb screening in low-energy nuclear reactions," Physical Review C, vol. 45, No. 2, Feb. 1992, pp. 532-539.
Brotánková, J., "Study of high temperature plasma in tokamak-like experimental devices," PhD Thesis, Charles University, Dept. of Surface and Plasma Science, Prague, Czech Republic, Mar. 3, 2009.
Bures, M., "Experimental Evidence of Temperature Gradient Effect on the Neutral Gas Penetration into a Magnetized Rotating Plasma," Physica Scripta, vol. 27, No. 2, Feb. 1983, pp. 83-90. [retrieved Aug. 16, 2016] <URL:http://stacks.iop.org/1402-4896/27/i=2/a=005>.
Cartlidge, E., "Fusion energy pushed back beyond 2050," BBC News, Jul. 11, 2017, 9 pages. <www.bbc.com/news/science-environment-40558758> (downloaded Jan. 9, 2018).
Chapline, G., "Cold Confusion," UCRL-101583, Lawrence Livermore National Laboratory, Jul. 1989, pp. 1-9. <URL:https://www.osti.gov/scitech/servlets/purl/6026306>.
Cheung, A., et al., "Colliding Beam Fusion Reactor Space Propulsion System," AIP Conference Proceedings 699, 2004, pp. 354-361. <doi:10.1063/1.1649593> [retrieved Aug. 13, 2016] <URL:https://doi.org/10.1063/1.1649593>.
Clary, M.R., Phd., "Hα & Neutral Density Scaling in the Maryland Centrifugal Experiment," PhD. Dissertation submitted to the Faculty of the Graduate School of the University of Maryland, 2009, pp. 1-117.
Cribier, M. et al., "Conventional sources of fast neutrons in "Cold Fusion" experiments," Physics Letters B, vol. 228, No. 1, Sep. 7, 1989, pp. 163-166.
Czerski, K., et al., "Experimental and theoretical screening energies for the $^2$H (d,p) $^3$H reaction in metallic environments," The European Physical Journal A—Hadrons and Nuclei, vol. 27, Sup. 1, Mar. 2006, pp. 83-88. <doi:10.1140/epja/i2006-08-012-y> <URL:https://doi.org/10.1140/epja/i2006-08-012-y>.
Davidson, R.C., "Electrostatic shielding of a test charge in a non-neutral plasma," Journal of Plasma Physics, vol. 6, No. 1, Aug. 1971, pp. 229-235. <doi: 10.1017/S0022377800025812>.
Ellis, R.F., et al., "An experiment to test centrifugal confinement for fusion," Physics of Plasmas, vol. 8, No. 5, May 2001, pp. 2057-2065. <doi:10.1063/1.1350957> [retrieved Jun. 27, 2001] <URL:http://ojps.aip.org/pop/poper.jsp>.
Ellis, R.F., et al., "Steady supersonically rotating plasmas in the Maryland Centrifugal Experimenta$^{\infty}$," AIP Physics of Plasmas, vol. 12, No. 5, May 5, 2005, pp. 055704-1-055704-7. <doi:10.1063/1.1896954>.
Faller, S.H., et al., "Investigation of cold fusion in heavy water," Journal of Radioanalytical Nuclear Chemistry, Letters, vol. 137, No. 1, Aug. 21, 1989, pp. 9-16.
Fetterman, A.J., et al., "α Channeling in a Rotating Plasma," Physical Review Letters, vol. 101, No. 20, Nov. 13, 2008, pp. 205003-1-205003-4. <doi:10.1103/PhysRevLett.101.205003>.
Francis, M., "Fusion reactor achieves tenfold increase in plasma confinement time," Ars Technica, Nov. 18, 2013, 3 pages, <www.arstechnica.com/science/2013/11/fusion-reactor-achieves-tenfold-increase-in-plasma-confinement-time> (downloaded May 7, 2014).
Fukai, Y., "The ABC's of the Hydrogen-Metal System," Frontiers of Cold Fusion, Universal Academy Press, Inc., Tokyo (Japan) 1993, pp. 265-274. <URL:https://inis.iaea.org/search/search.aspx?orig_q=RN:25063104>.
Gaylord, et al., "Investigation of the Effect of Electric Fields on the Rate of Alpha Decay," Lawrence Berkeley Laboratory, University of California, Nuclear Science Division, Jul. 1991, pp. 1-17.

(56) References Cited

OTHER PUBLICATIONS

Hagelstein, P.L., et al., "New physical effects in metal deuterides," Proceedings of ICCF-11, Marseille, France, Condensed Matter Nuclear Science (2004), pp. 1-30.

Hajdas, W. et al., "Search for cold fusion events," Solid State Communications, vol. 72, No. 4, (1989), pp. 309-313.

Harms A. A., et al., "Principles of fusion energy," World Scientific Publishing Co., Singapore, 2000 (reprinted 2002).

Hellsten, T., "The Balance of Rotating Plasma Slabs," Report No. TRITA-EPP-74-19. Department of Plasma Physics and Fusion Research, Royal Inst. of Technology, (Sweden) Nov. 1974, pp. 25. [retrieved 2016] <URL:http://www.iaea.org/inis/collection/NCLCollectionStore/_Public/06/193/6193348.pdf>.

Hilts, P., "Significant Errors Reported in Utah Fusion Experiments," WP Company LLC d/b/a The Washington Post, May 2, 1989, p. A1 and A7.

Hora et al., "Screening in cold fusion derived from D-D reactions," Phys. Letters, A175: 138143, 1993.

Horányi, G., "Some basic electrochemistry and the cold nuclear fusion of deuterium," Journal of Radioanalytical Nuclear Chemistry, Letters, vol. 137, No. 1, Aug. 21, 1989, pp. 23-28.

Indech, R., "Design and Construction of Probe Tips for Scanning Tunneling Microscopy (STM)" Exhibit B (Applicant's report describing such devices) of Applicant's Response to Office Action dated Jul. 19, 2005 in U.S. Appl. No. 10/735,406.

Jackson, J.D., "Catalysis of Nuclear Reactions between Hydrogen Isotopes by $\mu^-$ Mesons," Physical Review, American Physical Society, vol. 106, No. 2, Apr. 15, 1957, pp. 330-339. <doi:10.1103/PhysRev.106.330>.

James, B.W., et al., "Isotope Separation in the Plasma Centrifuge," Plasma Physics, vol. 18, No. 4 (1976) Pergamon Press (1976) Northern Ireland, pp. 289-300. [retrieved Aug. 14, 2016] <URL: http://stacks.iop.org/0032-1028/18/i=4/a=004>.

Jimenez, G., et al., "A Comparative Assessment of Hydrogen Embrittlement: Palladium and Palladium-Silver (25 Weight% Silver) Subjected to Hydrogen Absorption/Desorption Cycling," Advances in Chemical Engineering and Science, vol. 6, Jul. 2016, pp. 246-261. <doi:10.4236/aces.2016.63025>.

Kaneko, O., et al., "Mass Separation Experiment with a Partially Ionized Rotating Plasma," Plasma Physics, vol. 20, No. 11, Pergamon Press (1978), Northern Ireland, pp. 1167-1178. [retrieved Aug. 15, 2016] <URL: http://stacks.iop.org/0032-1028/20/i=11/a=007>.

Kreysa, G. et al., "A critical analysis of electrochemical nuclear fusion experiments," Journal of Electroanalytical Chemistry, vol. 266, (1989), p. 437-450.

Lawson, J. D., "Some criteria for a power producing thermonuclear reactor," Proc. Phys. Soc. B70, 1957, pp. 6-10.

Lehnert, B., "Electromagnetic Ring Confinement of Plasmas," Annals of the New York Academy of Sciences, Part VI., New Techniques, Mar. 1975, pp. 550-567. <doi:10.1111/j.1749-6632.1975.tb00115.x>.

Lehnert, B., "Rotating Plasmas," Review Paper; Nuclear Fusion, vol. 11, No. 5, (manuscript received Apr. 1971), pp. 485-533. [retrieved Aug. 21, 2016] <URL:http://stacks.iop.org/0029-5515/11/i=5/a=010>.

Lehnert, B., "The Partially Ionized Plasma Centrifuge," Physica Scripta, vol. 7, No. 3 (1973) pp. 102-106. [retrieved Aug. 14, 2016] <URL: https://doi.org/10.1088/0031-8949/7/3/002>.

Lehnert, B., et al., "On the Interaction between a Fully Ionized Plasma and a Neutral Gas Blanket," Physica Scripta, vol. 1, No. 1, Oct. 16, 1970, pp. 39-45. [retrieved Sep. 14, 2016] <URL:http://stacks.iop.org/1402-4896/1/i=1/a=007>.

Lewis, N. S., et al., "Searches for low-temperature nuclear fusion of deuterium in palladium," Nature, vol. 340, Aug. 17, 1989, pp. 525-530.

Miley, G. H., et al., "Inertial electrostatic confinement (IEC) fusion," Fundamentals and Applications, 2014. <doi:10.1007/978-1-4614-9338-9> <URL:https://doi.org/10.1007/978-1-4614-9338-9>.

Miskelly, G. et al., Analysis of the published calorimetric evidence for electrochemical fusion of deuterium in palladium, Science, vol. 246, No. 4931, Nov. 10, 1989, p. 793-796.

Ng, S., et al., "Neutral penetration in centrifugally confined plasmas," AIP Physics of Plasmas, vol. 14, No. 10, Oct. 2007, pp. 102508-1-102508-9. <doi: 10.1063/1.2786074>.

Ohashi, H., et al., "Decoding of Thermal Data in Fleischmann & Pons Paper," Journal of Nuclear Science and Technology, vol. 26, No. 7, Jul. 1989, pp. 729-732.

Orr, B., et al., "A review of car waste heat recovery systems utilising thermoelectric generators and heat pipes," Applied Thermal Engineering, vol. 101, May 25, 2016, pp. 490-495. <URL:http://dx.doi.org/10.1016/j.applthermaleng.2015.10.081>.

Petitjean, C., "Muon Catalyzed Fusion," Paul Scherrer Institute, CH-5232 (Villigen PSI, Switzerland 1992), pp. 408-415.

Post, R.F., "Mirror Systems: Fuel Cycles, Loss Reduction and Energy Recovery," British Nuclear Energy Society, Nuclear Fusion Reactor Conference at Culham Laboratory, Sep. 1969, pp. 1-17.

Price, P. B., et al., "Search for energetic-charged-particle emission form deuterated Ti and Pd foils," Physical Review Letters, vol. 63, No. 18, Oct. 30, 1989, pp. 1926-1929.

Ragheb, M., et al., "Inertial Confinement Fusion," Ragheb Inertial, Jan. 14, 2015, pp. 27. <URL:http://www.ragheb.co/NPRE%20402%20ME%20405%20Nuclear%20Power%20Engineering/Inertial%20Confinement%20Fusion.pdf>.

Raiola, F., et al., "Electron screening in d(d,p) for deuterated metals and the periodic table," Physics Letters B, vol. 547, No. 3-4, Nov. 2002, pp. 193-199. <URL:https://doi.org/10.1016/S0370-2693(02)02774-0>.

Salamon, M. H., et al., "Limits on the emission of neutrons, gamma rays, electrons and protons from ONPs/Fleischmann electrolytic cells," Nature, vol. 344, Mar. 29, 1990, pp. 401-405.

Scharping N., "Why nuclear fusion is always 30 years away," Discover Magazine, Mar. 23, 2016, 7 page <www.blogs.discovermagazine.com/crux/2016/03/23/nuclear-fusion-reactor-research/#.WITDb_I95aQ> (downloaded Jan. 9, 2018).

Schrieder, G., et al., "Search for cold nuclear fusion in palladIum-deuteride," Zeitschrift fur Physik B-Condensed Matter, vol. 76, No. 2, 1989, pp. 141-142.

Seife, C., "Sun in a bottle," Chapter 10, New York: Penguin Group, 2008, pp. 220-227.

Shani, Gad, et al., "Evidence for a background neutron enhanced fusion in deuterium absorbed palladium," Solid State Communications, vol. 72, No. 1, 1989, pp. 53-57.

Simpson, et al., [Abstract Only] "Neon Isotope Separation in a Plasma Centrifuge," Australian Inst. of Nuclear Science and Engineering, (1976) pp. 1-2.

Van den Berg, M.S., "Theory on a Partially Ionized Gas Centrifuge," Stellingen: Doctoral dissertation, TU Delft, Delft University of Technology, Apr. 15, 1982, pp. 1-150. <URL:https://repository.tudelft.nl/islandora/object/uuid:0bb65bac-072a-4d3c-abad-d2143b0b5e96/datastream/OBJ>.

Volosov, V.I., "Aneutronic fusion on the base of asymmetrical centrifugal trap," Nuclear Fusion, vol. 46, No. 8, Jul. 25, 2006, pp. 820-828. <doi:10.1088/0029-5515/46/8/007> [retrieved Aug. 21, 2016] <URL:http://stacks.iop.org/0029-5515/46/i=8/a=007>.

Volosov, V.I., "MHD Stability of a Hot Rotating Plasma: A Brief Review of PSP-2 Experiments," Plasma Physics Reports, vol. 35, No. 9, Mar. 31, 2009, pp. 719-733. <doi:10.1134/S1063780X09090025>.

Wesson, et al., [Abstract] "Tokamaks.2. ed." Clarendon Press, Oxford (United Kingdom), 2nd Edition (1997) p. 680. [ISBN 0 19 856293 4] <URL: https://inis.iaea.org/search/search.aspx?orig_q=RN:28060453>.

Wijnakker, M.M.B., "Centrifugal effects in a weakly ionized rotating gas," Ph.D. Thesis Amsterdam Univ. (Netherlands), Sep. 3, 1980, pp. 1-108. <URL: http://adsabs.harvard.edu/abs/1980PhDT........35W>.

Wijnakker, M.M.B., et al., "Limitations on Mass Separation by the Weakly Ionized Plasma Centrifuge," Zeitschrift far Naturforschung A, vol. 35, No. 8 (Aug. 1980), (Online) Jun. 2, 2014, pp. 883-893. <doi:10.1515/zna-1980-0815> [retrieved Aug. 15, 2016] <URL: https://doi.org/10.1515/zna-1980-0815>.

(56) References Cited

OTHER PUBLICATIONS

Wijnakker, M., Granneman, E. & Kistemaker, J., "A Study of a Weakly Ionized Rotating Plasma," Zeitschrift für Naturforschung A, vol. 34, No. 6 (1979), pp. 672-690. [Retrieved Mar. 8, 2018] <doi:10.1515/zna-1979-0602>.
Wilets, L., et al., "Effect of screening on thermonuclear fusion in stellar and laboratory plasmas," The Astrophysical Journal, 530.1 (2000): 504. <URL:https://arxiv.org/pdf/astro-ph/9906320.pdf>.
Declaration under 37 CFR §1.132 (Alfred Y. Wong, Ph.D.) dated Jun. 18, 2013 for U.S. Appl. No. 12/850,633.
Ziegler, J. F., et al., "Electrochemical experiments in cold nuclear fusion," Physical Review Letters, vol. 62, No. 25, Jun. 19, 1989, pp. 2929-2932.
INTEGRAN—Applications—Technologies [Webpage] pp. 1-4. [retrieved Feb. 11, 2005] <URL:http://www.integran.com/contact/index.htm>.
Gupta, et al., "Nanofabrication of a two-dimensional array using laser-focused atomic deposition," Appl. Phys. Lett., vol. 67, No. 10, Sep. 4, 1995, pp. 1378-1380.
Zhirnov, et al., "Field emission from silicon spikes with diamond coatings," J. Vac. Sci. Technol. B, vol. 13, No. 2, Mar./Apr. 1995, pp. 418-421.
Amato, I., "Tin Whiskers: The Next Y2K Problem?" Time Inc Time & Life Building Rockefeller Center, New York, NY 10020-1393 USA, Jan. 10, 2005, pp. 27-28.
Physics 114—Spring 2000—Week 6.2 [Course Syllabus] "Muons in Matter," Spring 2000, pp. 1-2. [retrieved Apr. 6, 2003]<URL:http://wug.physics.uiuc.edu/courses/phys114/summer02/Discussions/html/wk6/sol6_2.htm>.
U.S. Appl. No. 15/679,094, filed Aug. 16, 2017, Wong.
U.S. Appl. No. 15/590,962, filed May 9, 2017, Wong.
U.S. Appl. No. 61/179,625, filed May 19, 2009, Wong.
U.S. Appl. No. 15/973,421, filed May 7, 2018, Wong.
U.S. Appl. No. 15/974,592, filed May 8, 2018, Wong.
U.S. Appl. No. 15/973,439, filed May 7, 2018, Wong.
U.S. Appl. No. 15/974,617, filed May 8, 2018, Wong.
A. Preliminary Amendment filed Aug. 23, 2017 in U.S. Appl. No. 15/590,962.
U.S. Office Action dated Mar. 1, 2018 in U.S. Appl. No. 15/679,094.
U.S. Office Action dated Mar. 26, 2019 in U.S. Appl. No. 15/973,421.
U.S. Office Action dated Mar. 28, 2019 in U.S. Appl. No. 15/974,592.
U.S. Office Action dated Apr. 30, 2019 in U.S. Appl. No. 15/973,439.
U.S. Office Action dated Mar. 7, 2019 in U.S. Appl. No. 15/974,617.
Lee, et al., "Practical laser-activated photoemissive electron source," Review of Scientific Instruments, vol. 56, No. 4 (1985), pp. 560-562.
"Temperatures for Fusion," HyperPhysics (2016), pp. 1., The Department of Physics and Astronomy. Georgia State University. <URL:http://hyperphysics.phy-astr.gsu.edu/hbase/NucEne/coubar.html>.
U.S. Appl. No. 16/282,218, filed Feb. 21, 2019, Wong.

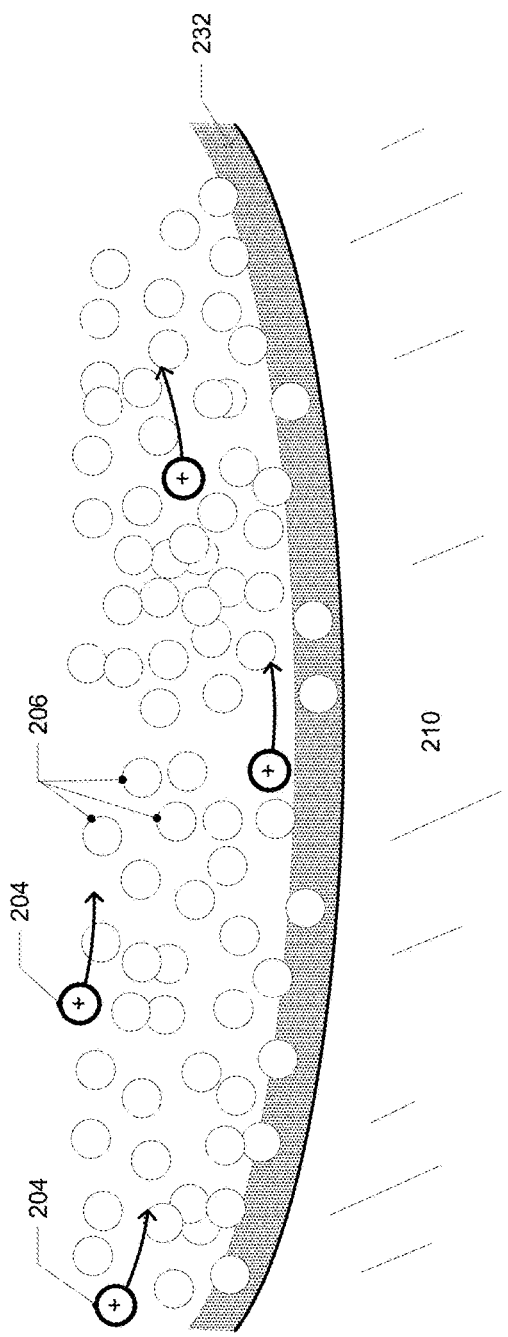
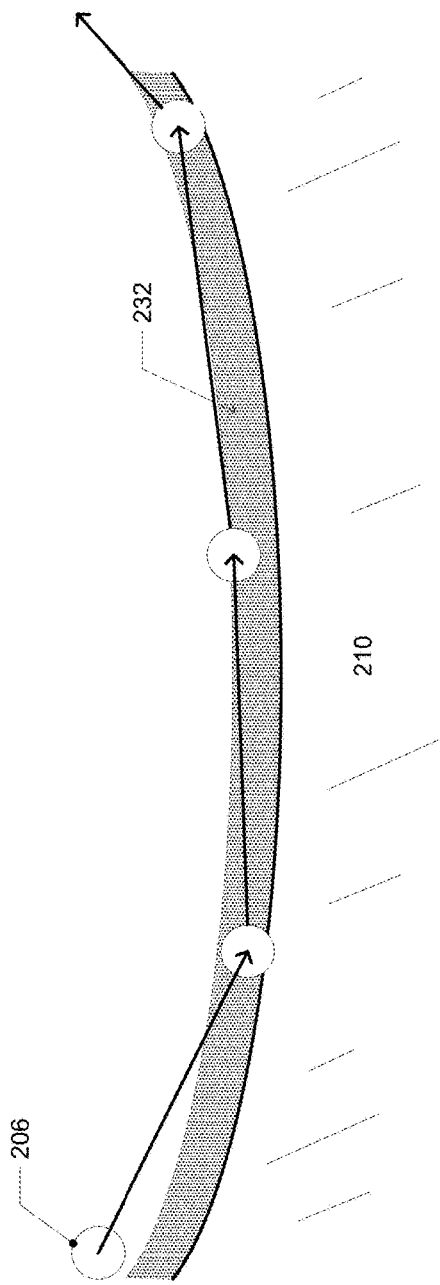
FIGURE 2a
FIGURE 2b

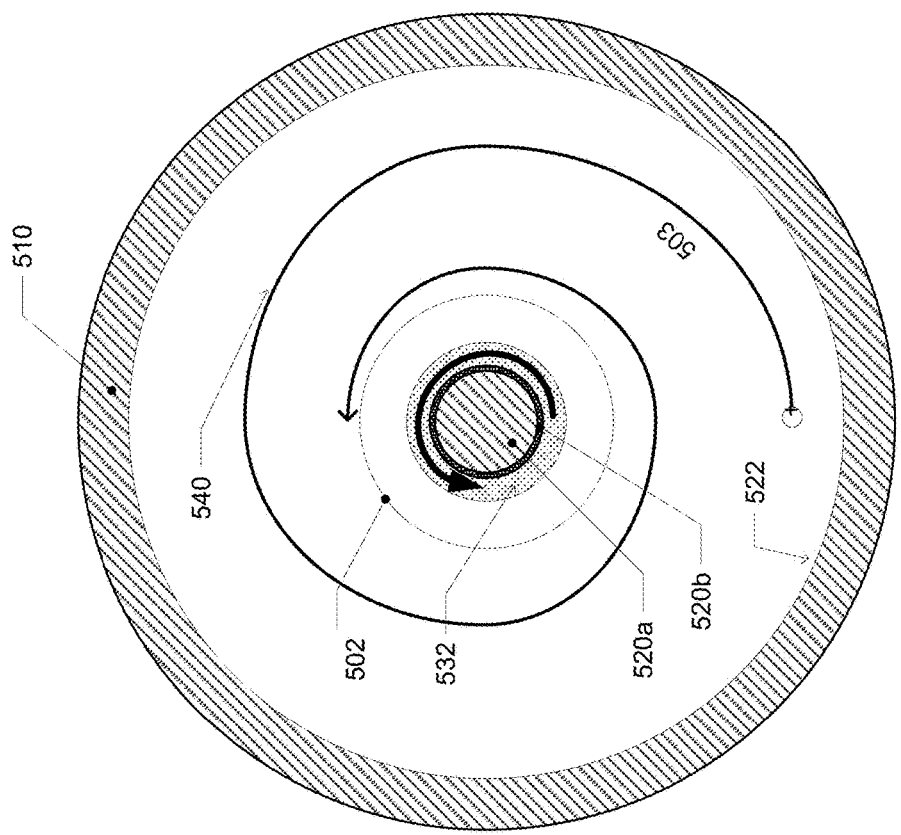

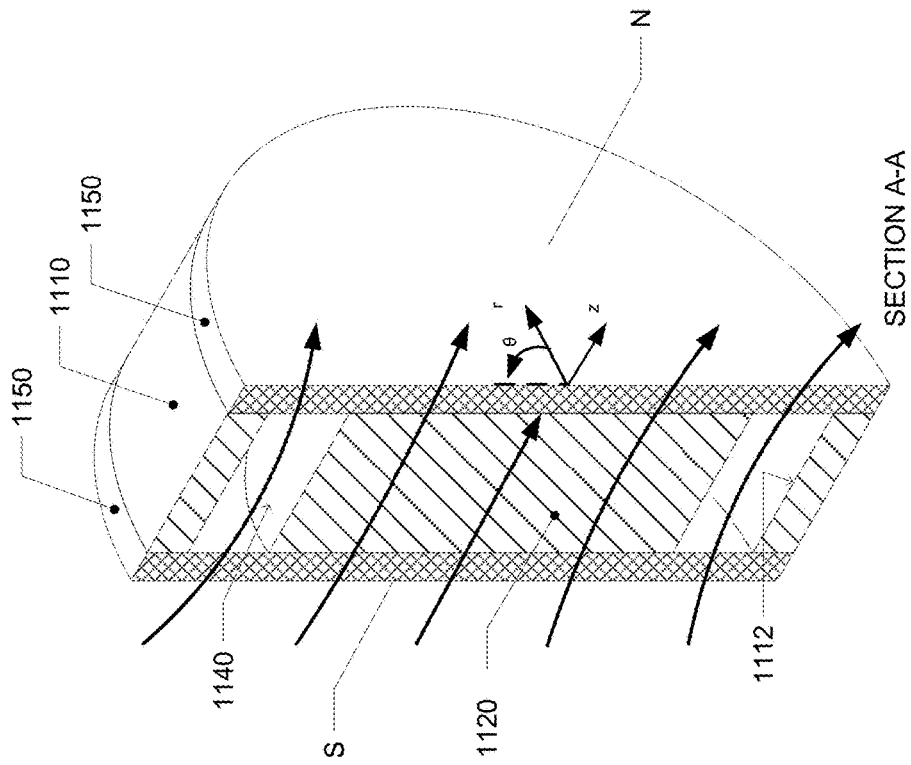
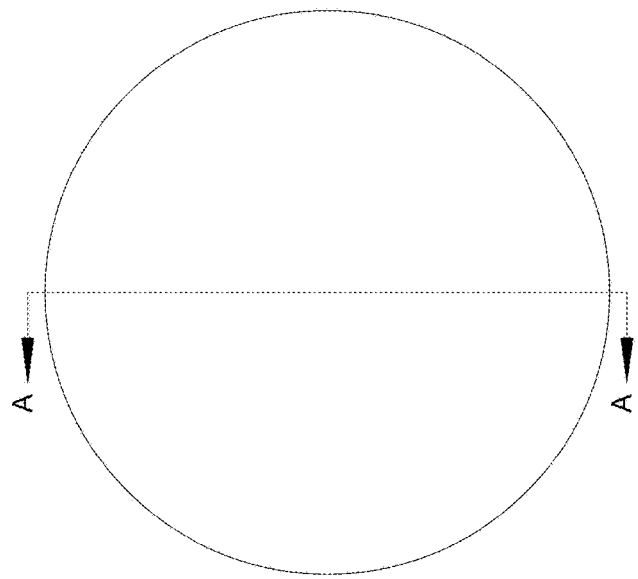
FIGURE 11b
FIGURE 11a

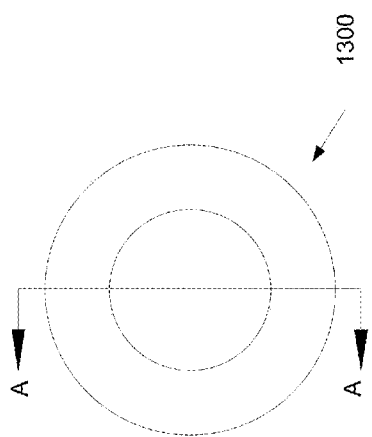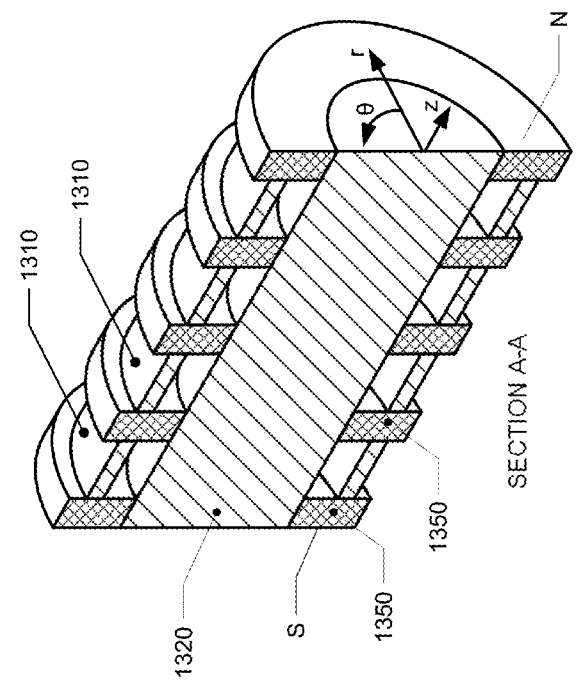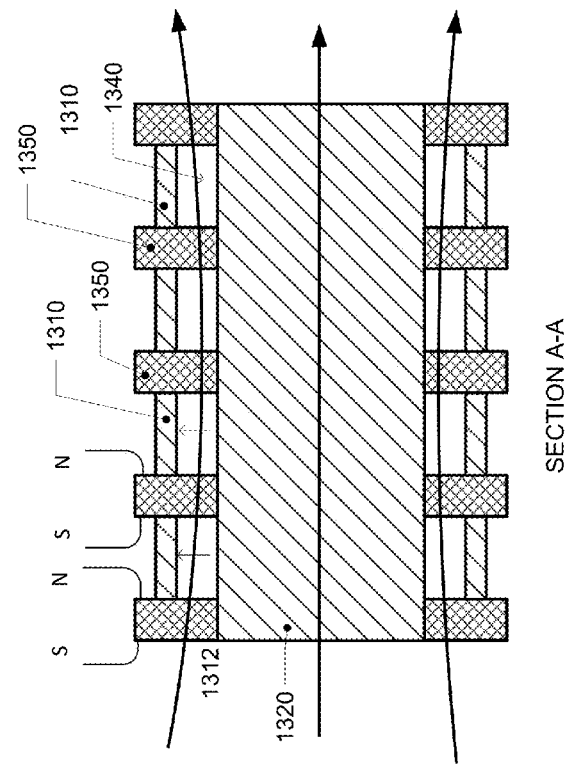

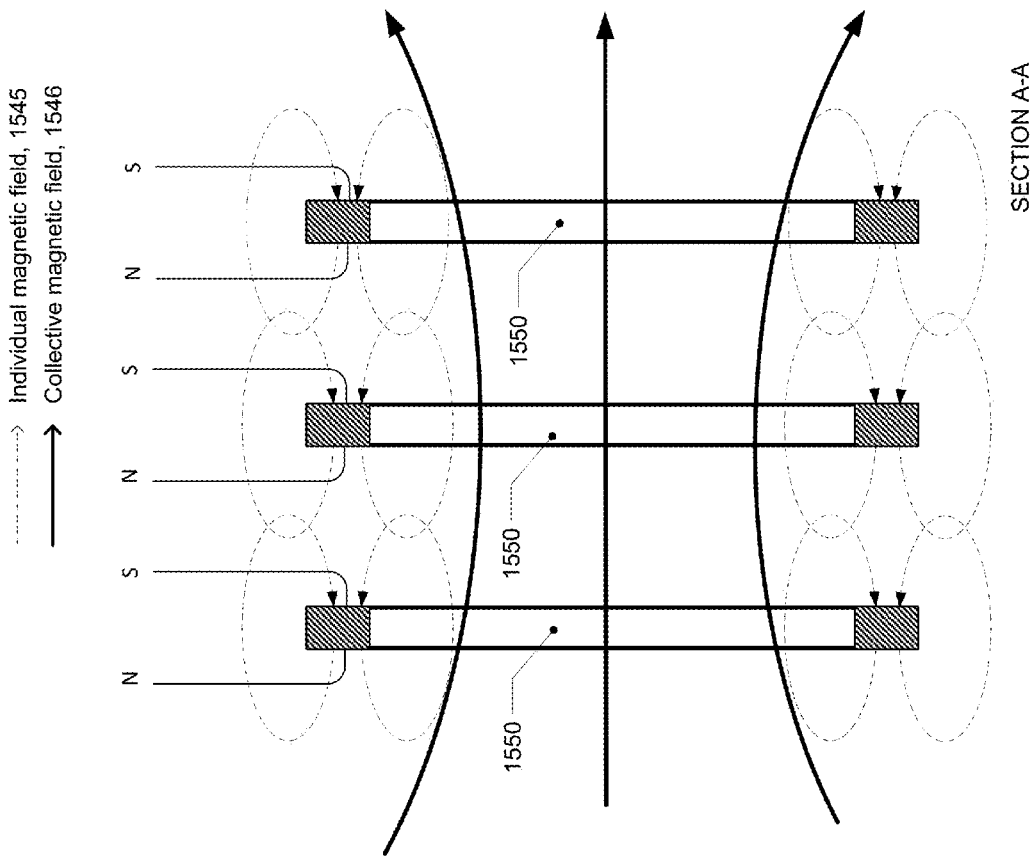
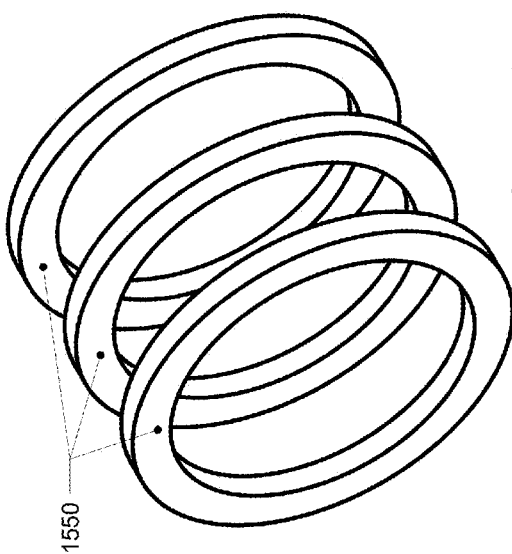
FIGURE 15a
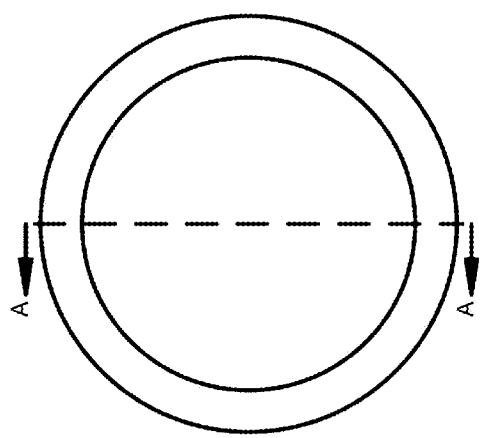
FIGURE 15b
FIGURE 15c

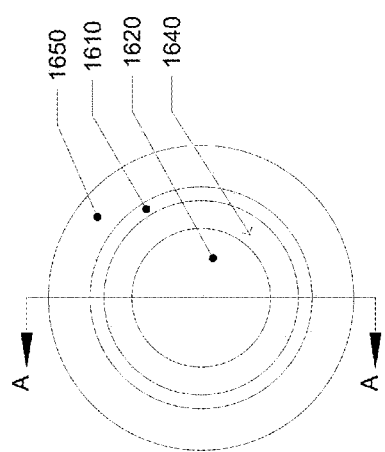
FIGURE 16a
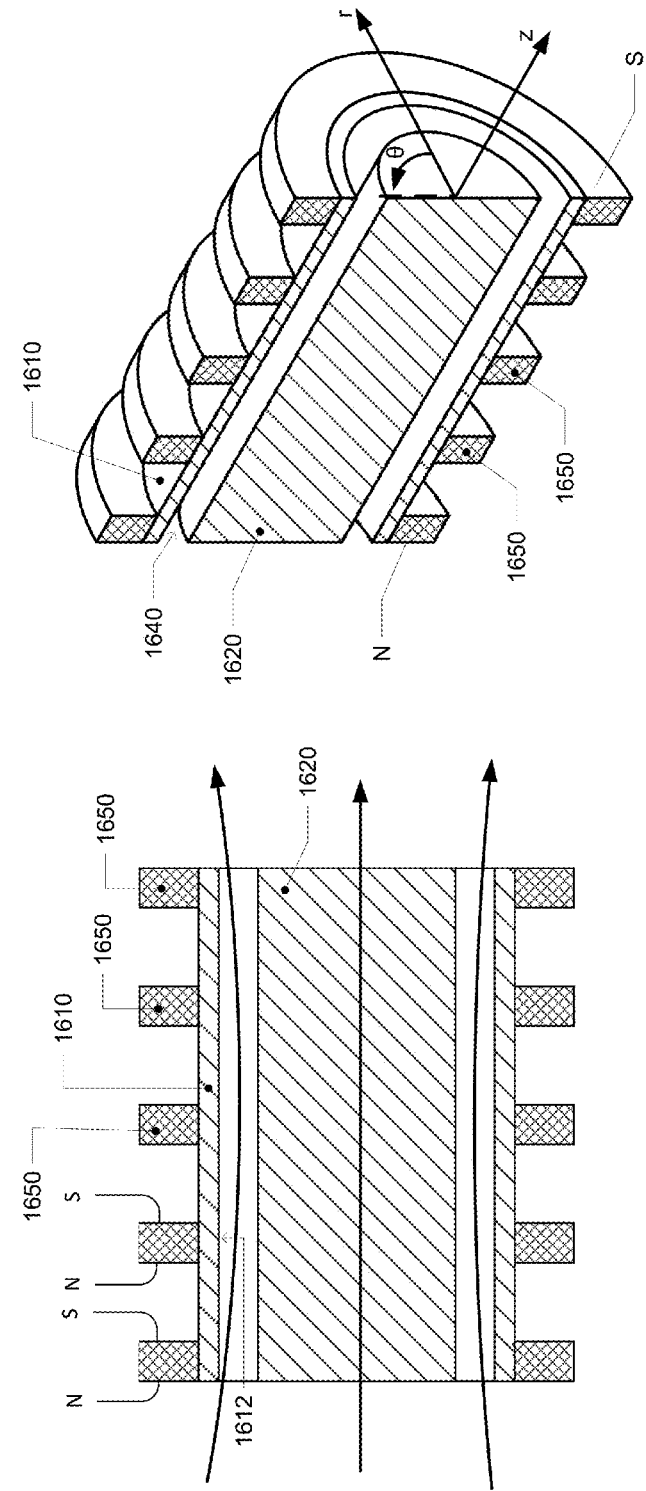
FIGURE 16b
FIGURE 16c

REDUCING THE COULOMBIC BARRIER TO INTERACTING REACTANTS

CROSS-REFERENCE TO RELATED APPLICATIONS

This application claims benefit of U.S. provisional application Ser. No. 62/503,680, filed May 9, 2017; this application is also a continuation in part of U.S. patent application Ser. No. 15/589,902 filed May 8, 2017, titled REACTOR USING ELECTRICAL AND MAGNETIC FIELDS, which is a continuation in part of U.S. patent application Ser. No. 14/318,246, filed Jun. 27, 2014, entitled METHODS, DEVICES AND SYSTEMS FOR FUSION REACTIONS, which claims the benefit of (i) U.S. provisional application Ser. No. 61/840,428, filed Jun. 27, 2013; (ii) U.S. provisional application Ser. No. 61/925,114, filed Jan. 8, 2014; (iii) U.S. provisional application Ser. No. 61/925,131, filed Jan. 8, 2014; (iv) U.S. provisional application Ser. No. 61/925,122, filed Jan. 8, 2014; (v) U.S. provisional application Ser. No. 61/925,148, filed Jan. 8, 2014; (vi) U.S. provisional application Ser. No. 61/925,142, filed Jan. 8, 2014; (vii) U.S. provisional application Ser. No. 61/841,834, filed Jul. 1, 2013; (viii) U.S. provisional application Ser. No. 61/843,015, filed Jul. 4, 2013; U.S. patent application Ser. No. 14/318,246 is also a continuation-in-part of U.S. patent application Ser. No. 14/205,339 filed Mar. 11, 2014, now U.S. Pat. No. 9,245,654 issued Jan. 26, 2016, which claims benefit of U.S. provisional application Ser. No. 61/776,592 filed Mar. 11, 2013; this application is also a continuation in part of U.S. patent application Ser. No. 15/589,913, filed May 8, 2017, entitled REACTOR USING ELECTRICAL AND MAGNETIC FIELDS; this application is also a continuation in part of U.S. patent application Ser. No. 15/679,094, filed Aug. 16, 2017, entitled REACTOR USING ELECTRICAL AND MAGNETIC FIELDS, which is a continuation of U.S. patent application Ser. No. 15/589,886, filed May 8, 2017, entitled REACTOR USING ELECTRICAL AND MAGNETIC FIELDS; and this application is also a continuation in part of U.S. patent application Ser. No. 15/679,091, filed Aug. 16, 2017, entitled REACTOR USING AZIMUTHALLY VARYING ELECTRICAL FIELDS, which is a continuation of U.S. patent application Ser. No. 15/589,905, filed May 8, 2017, entitled REACTOR USING AZIMUTHALLY VARYING ELECTRICAL FIELDS; the entire disclosures of each of these priority applications are incorporated herein by reference for all purposes.

STATEMENT OF JOINT RESEARCH AGREEMENT

The subject matter and the claimed invention were made by or on behalf of Alpha Ring International, Ltd. of Monterey, Calif. and Nonlinear Ion Dynamics, LLC of Monterey, Calif., under a joint research agreement titled "JOINT RESEARCH AND DEVELOPMENT AGREEMENT." The subject matter disclosed was developed and the claimed invention was made by, or on behalf of, one or more parties to the joint research agreement that was in effect on or before the effective filing date of the claimed invention, and some aspects of the claimed invention were made as a result of activities undertaken within the scope of the joint research agreement.

FIELD OF THE INVENTION

The present disclosure relates to inter-nuclear reactions and reactors for initiating and maintaining these reactions.

BACKGROUND

Since the 1950s, the science and technology communities have been striving to achieve controlled and economically viable fusion. Fusion is an appealing energy source for many reasons, but after billions of dollars and decades of research, to most, the idea of a sustainable fusion source for clean energy has become a pipe dream. The challenge has been to find a way to sustain a fusion reaction in a way that is economical, safe, reliable, and environmentally sound. This challenge has proved to be extraordinarily difficult. The commonly held belief in the art is that another 25-50 years of research remain before fusion is a viable option for power generation—"As the old joke has it, fusion is the power of the future—and always will be" ("Next ITERation?", Sep. 3, 2011, *The Economist*).

Prior efforts in large-scale fusion research have primarily focused on two methods of creating conditions for fusion ignition: inertial confinement fusion (ICF) and magnetic confinement fusion. ICF attempts to initiate a fusion reaction by compressing and heating fusion reactants such as a mixture of deuterium and tritium in the form of a small pellet about the size of a pinhead. The fuel is energized by delivering high-energy beams of laser light, electrons, or ions to the fuel target, causing the heated outer layer of the target fuel to explode and produce shockwaves that travel inward through the fuel pellet compressing and heating the fusion reactants, thereby initiating a fusion reaction.

At the time of this filing, the most successful ICF program is the National Ignition Facility (NIF) which was constructed at the cost of nearly 3.5 billion dollars and completed in 2009. NIF reached a milestone by causing a fuel pellet to give off more energy than was applied to it, but as of 2015, the NIF experiments were only able to reach about ⅓ of the energy levels needed for ignition. Regarding a sustainable reaction, the longest reported ICF fusion reaction was on the order of 150 picoseconds. Even if ICF efforts achieve ignition conditions, there are still many obstacles to making it a viable energy source. For example, solutions are needed to remove heat from the reaction chamber without interfering with the fuel targets and driver beams, and solutions are needed to mitigate the short lifetime of fusion plants due to the radioactive byproducts of the fusion reactants: deuterium and tritium reactions produce neutrons.

The second major research direction, magnetic confinement fusion, attempts to induce fusion by using magnetic fields to confine hot fusion fuel in the form of a plasma. This method seeks to lengthen the time that ions spend close together and increase the likelihood that they fuse. Magnetic fusion devices apply a magnetic force on charged particles in a manner that, when balanced with centripetal force, causes the particles to move in circular or helical path within the plasma. The magnetic confinement prevents the hot plasma from contacting the walls of its reactor. In magnetic confinement, fusion occurs entirely within the plasma.

Most of the research in magnetic confinement is based on the tokamak design in which hot plasma is confined within a toroidal magnetic field. The Tokamak Fusion Test Reactor (TFTR) at Princeton, N.J. is world's first magnetic fusion device to perform extensive scientific experiments with plasmas composed of 50/50 deuterium/tritium. Built in 1980, it was hoped that TFTR would finally achieve fusion energy, but it never achieved this goal and was shut down in 1997. To date, the longest plasma duration time of any tokamak is 6 minutes and 30 seconds, held by the Tore Supra tokamak in France. Current efforts in magnetically confined fusion are focused on the International Thermonuclear Experimental Reactor (ITER), a Tokamak reactor that began construction in 2013. As of June 2015, the building costs have exceeded $14 billion, and construction of the facility is not expected until 2019 with full deuterium-tritium experiments starting in 2027. The current estimate for the cost of the project is over $50 billion, and it is likely the costs will continue to rise. Recently, the Energy and Water Development Subcommittee of the Senate Appropriations Committee released a recommendation that the U.S. withdraw from the ITER project. Due to market realities, and the inherent limitations of the tokamak design for fusion power, many analysts doubt that fusion reactors such as ITER will become commercially viable.

An alternative form of magnetic confinement is being studied by the Maryland Centrifugal Experiment (MCX), at the University of Maryland. It will test the concepts of centrifugal confinement and velocity shear stabilization. In this experiment, capacitors are discharged from a cylindrical cathode through hydrogen gas to a surrounding vacuum chamber in the presence of a magnetic field. The orthogonal electric and magnetic fields (represented as J×B) produce a force that drives hot ionized plasma (>$10^5$K) into rotation around the discharge electrodes. Due to the significant change in temperatures at the plasma boundary, there inevitably exists cold neutral species that significantly affect plasma flows. Studies have focused on the effect of neutrals and as they have thought to "impede the required plasma rotation" needed for fusion conditions. "Neutral species" or simply "neutrals" are atoms or molecules with a neutral charge, i.e., they have the same number of electrons and protons, the atomic number in the case of an atom. An ion or ionized atom or other particle has a charge, i.e., it has at least one more electron than proton or at least one more proton than electron.

Rotating plasma devices that do not employ highly ionized plasmas have been considered for fusion research, but the neutrals have always been seen as a problem for reaching fusion conditions. Due to limiting effects including neutral drag and instabilities, one researcher in the field considered that while "not quite impossible [it is] still unlikely that rotating plasmas alone would lead to the realization of a self-sustained fusion reactor." (Review Paper: ROTATING PLASMAS", Lehnart, Nuclear Fusion 11 (1971)).

All credible prior approaches have all faced confinement and engineering issues. A gross energy balance for a fusion reactor, Q, is defined as:

$$Q = E_{fusion}/E_{in},$$

where $E_{fusion}$ is the total energy released by fusion reactions, and $E_{in}$ is the energy used to create the reactions. The goal is to exceed a Q of one or "unity" toward the end of creating a viable energy source. Officials of the Joint European Torus (JET) claim to have achieved Q≈0.7 and the US National Ignition Facility recently claims to have achieved a Q>1 (ignoring the very substantial energy losses of its lasers). The condition of Q=1, referred to as "breakeven," indicates that the amount of energy released by fusion reactions is equal to the amount of energy input. In practice, a reactor used to produce electricity should exhibit a Q value significantly greater than 1 to be commercially viable, since only a portion of the fusion energy can be converted to a useful form. Conventional thinking holds that only strongly ionized plasmas that do not have significant quantities of neutrals present have the potential of achieving Q>1. These conditions limit the particle densities and energy confinement times that can be achieved in a fusion reactor. Thus, the field has looked to the Lawson criterion as the benchmark for controlled fusion reactions—a benchmark, it is believed, that no one has yet achieved when accounting for all energy inputs. The art's pursuit of the Lawson criterion, or substantially similar paradigms, has led to fusion devices and systems that are large, complex, difficult to manage, expensive, and, as yet, economically unviable. A common formulation of the Lawson criterion, known as the triple product, is as follows:

$$nT\tau_E > \frac{12k_B}{E_{ch}} \frac{T^2}{\langle \sigma v \rangle}$$

While the Lawson criterion will not be discussed in detail here; in essence, the criterion states that the product of the particle density (n), temperature (T), and confinement time ($\tau_E$) must be greater than a number dependent on the energy of the charged fusion products ($E_{ch}$), the Boltzmann constant ($k_B$), the fusion cross section ($\sigma$), the relative velocity ($v$), and temperature in order for ignition conditions to be reached. For the deuterium—tritium reaction, the minimum of the triple product occurs at T=14 keV and the number for the triple product is about $3 \times 10^{21}$ keV s/m$^3$ (J. Wesson, "Tokamaks", Oxford Engineering Science Series No 48, Clarendon Press, Oxford, 2nd edition, 1997.) In practice, this industry-standard paradigm suggests that temperatures in excess of 150,000,000 degrees Centigrade are required to achieve positive energy balance using a D-T fusion reaction. For proton-boron 11 fusion, the Lawson criterion suggests that the required temperature must be yet substantially higher. More specifically, $n\tau \sim 10^{16}$ s/cm$^3$, which is ~100× greater than required for D-T fusion [from *Inertial Electrostatic Confinement (IEC) Fusion: Fundamentals and Applications* by George H. Miley and S. Krupaker Murali].

An aspect of the Lawson criterion is based on the premise that thermal energy must be continually added to the plasma to replace lost energy, maintain the plasma temperature, and keep it fully or highly ionized. In particular, a major source of energy loss in conventional fusion systems is radiation due to electron bremsstrahlung and cyclotron motion as mobile electrons interact with ions in the hot plasma. The Lawson criterion was formulated for fusion methods where electron radiation loss is a significant consideration due to the use of hot, heavily ionized plasmas with highly mobile electrons.

Because the conventional thinking holds that high temperatures and a strongly-ionized plasma, absent of the presence of a significant presence of neutrals, are required, it was further believed that inexpensive physical containment of the reaction was impossible. Accordingly, the methods that have been most heavily pursued are directed to complex and expensive schemes to contain the reaction, such as those used in magnetic confinement systems (e.g., the ITER tokamak) and in inertial confinement systems (e.g., NIF laser).

In fact, at least one source acknowledges the believed impossibility of containing a fusion reaction with a physical structure: "The simplest and most obvious method with which to provide confinement of a plasma is by a direct-contact with material walls, but is impossible for two fundamental reasons: the wall would cool the plasma and most wall materials would melt. We recall that the fusion plasma here requires a temperature of ~$10^8$K while metals generally melt at a temperature below 5000 K." ("Principles of Fusion Energy," A. A. Harms et al.). The need for extremely high temperatures is premised on the belief that only highly energized ions with charge can fuse, and that the coulombic repulsion force limits the fusion events. The present teaching in the field relies on this basic assumption for the vast majority of all research and projects.

In rare instances, researchers have considered methods for reducing the Coulombic barrier or repulsion force, which repels interacting positive nuclei, in order to reduce the required energy to initiate and maintain fusion. Such methods have largely been disregarded as infeasible with the methods described above.

In the 1950's the concept of muon-catalyzed fusion was studied by Luis Alvarez using a hydrogen bubble chamber at the University of California at Berkeley. Alvarez's work ("Catalysis of Nuclear Reactions by μ Mesons." Physical Review. 105, Alvarez, L. W.; et al. (1957)) demonstrated nuclear fusion taking place at temperatures significantly lower than the temperatures required for thermonuclear fusion. In theory, it was proposed that fusion could occur even at or below room temperature. In this process, a negatively charged muon replaces one of the electrons in a hydrogen molecule. Since the mass of a muon is 207 greater than an electron, the hydrogen nuclei are consequently drawn 207 times closer together than in a normal molecule. When the nuclei are this close together, the probability of nuclear fusion is greatly increased, to the point where a significant number of fusion events can happen at room temperature.

While muon-catalyzed fusion received some attention, efforts to make a muon-catalyzed fusion source have not been successful. Current techniques for creating large numbers of muons require significant amounts of energy that exceed the energy produced by the catalyzed nuclear fusion reactions, thus precluding breakeven or Q>1. Moreover, each muon has about a 1% chance of "sticking" to the alpha particle produced by the nuclear fusion of a deuteron (the nucleus of deuterium atom) with a triton (the nucleus of tritium atom), removing the "stuck" muon from the catalytic cycle. This means that each muon can only catalyze at most a few hundred deuterium-tritium nuclear fusion reactions. Thus, these two factors—muons being too expensive to make and then sticking too easily to alpha particles—limit muon-catalyzed fusion to a laboratory curiosity. To create useful muon-catalyzed fusion, reactors would need a cheaper, more efficient muon source and/or a way for each muon to catalyze many more fusion reactions. To date, none have been found or even theorized.

In March of 1989, Martin Fleischmann and Stanley Pons submitted a paper to the Journal of Electroanalytical Chemistry reporting that they had discovered a method of reducing the Coulombic barrier by a method that is now commonly referred to as "cold fusion." Fleishmann and Pons believed they had observed nuclear reaction byproducts and a significant amount of heat generated by a small tabletop experiment involving electrolysis of heavy water on the surface of palladium electrodes. One explanation for cold fusion considered that hydrogen and its isotopes could be absorbed in certain solids, such as palladium, at high densities. The absorption of hydrogen creates a high partial pressure, reducing the average separation of hydrogen isotopes and thus lowering the potential barrier. Another explanation was that electron screening of the positive hydrogen nuclei in the palladium lattice was sufficient for lowering the barrier.

While the Fleischmann-Pons findings initially received significant press, the reception by the scientific community was largely critical as a group at Georgia Tech University quickly found problems with their neutron detector, and Texas A&M University discovered bad wiring in their thermometers. These experimental mistakes, along with many failed attempts to replicate the Fleischmann-Pons experiment by well-known laboratories, lead most in the scientific community to conclude that any positive experimental results should not be attributed to "fusion." Due in part to the publicity received, the United States Department of Energy (DOE) organized a special panel to review cold fusion theory and research. First in November of 1989, and again 2004, the DOE concluded that results thus far did not present convincing evidence that useful sources of energy would result from the phenomena attributed to "cold fusion."

Another attempt to reduce the Coulombic barrier employs electron screening in a solid matrix. Electron screening has first been observed in stellar plasmas where it was determined to change the fusion rate by five orders of magnitude if the screening factor changes by only a few percent (Wilets, L., et al. "Effect of screening on thermonuclear fusion in stellar and laboratory plasmas." The Astrophysical Journal 530.1 (2000): 504.). According to Wilets, "[t]he rate of thermonuclear fusion in plasmas is governed by barrier penetration. The barrier itself is dominated by the Coulomb repulsion of the fusing nuclei. Because the barrier potential appears in the exponent of the Gamow formula, the result is very sensitive to the effects of screening by electrons and positive ions in the plasma. Screening lowers the barrier and thus enhances the fusion rate; the greater the nuclear charges, the more important it becomes."

One example that tries to make use of this electron screening effect to create ignition conditions is presented in US Patent Publication No. US2005/0129160A1 by Robert Indech. In this application, Indech describes the electron shielding of the positively-charged repulsive forces between two deuterons located near the tip of a microscopic cone structure when electrons concentrate at the top of the cone structure due to an applied potential. As disclosed, these cones were arrayed on a surface measuring 3 cm by 3 cm.

While Indech and others have realized the potential electron screening to lower the Coulombic barrier for fusion reactors, it is doubtful any efforts have been successful. At most these efforts appear to propose methods for ignition and not a sustained and controlled fusion reaction. Despite efforts in ICF, magnetic confinement fusion, and various methods of reducing the Coulombic barrier, there is currently no commercially feasible fusion reactor design that exists.

SUMMARY

This disclosure concerns various aspects of reactor designs and operations. Of particular interest is reactor designs and operation in which electron screening is employed to reduce the coulombic barrier to fusion of two nuclei. The electron screening is provided in an electron-rich region where fusion reactions are promoted.

One aspect of the disclosure pertains to reactors characterized by the following elements: (a) a confining wall at least partially enclosing a confinement region within which charged particles and neutrals can rotate; (b) a plurality of electrodes adjacent or proximate to the confinement region; (c) a control system having a voltage and/or current source configured to apply an electric potential between at least two of the plurality of electrodes, wherein the applied electric potential generates an electric field within the confinement region that alone, or in conjunction with a magnetic field, induces and/or maintains rotational movement of the charged particles and the neutrals in the confinement region; and (d) a reactant disposed in or adjacent to the confinement region such that, during operation, repeated collisions between the neutrals and the reactant produce an interaction with the reactant that gives off energy and produces a product having a nuclear mass that is different from a nuclear mass of any of the nuclei of the neutrals and the reactant. During operation, the confinement region proximate the reactant has an electron-rich region having an excess of electrons over positively charged particles of at least about $10^6/cm^3$.

In certain embodiments, the electrodes are azimuthally distributed about the confinement region, and the control system is configured to induce rotational movement of charged particles and the neutrals in the confinement region by applying time-varying voltages to the plurality of electrodes. In certain embodiments, the reactor is configured to induce rotational movement of charged particles and the neutrals in the confinement region by an interaction between the electric field and an applied magnetic field within the confinement region.

During operation of the reactor, the electron-rich region may have one or more of the following characteristics: (i) an electric field strength of at least about $10^6$ V/m, (ii) electrons having a temperature, on average, of between about 10,000 K to 50,000 K, (iii) electrons having a density of about $10^{10}$ cm$^{-3}$ to about $10^{23}$ cm$^{-3}$, (iv) a ratio of electrons to positive ions within is between about $10^6$:1 and $10^8$:1, (v) neutrals having an energy of, on average, of between about 0.1 eV and 2 eV, (vi) neutrals having a concentration of at least about $10^{16}/cm^3$ (in some cases, between about $10^{16}/cm^3$ to about $10^{18}/cm^3$) and/or (vii) an extension into the confinement region by a distance of between about 50 nanometers and 50 micrometers.

In some embodiments, the reactor includes an electron emitter disposed in or adjacent to the confinement region such that, during operation, the electron emitter generates electrons in the confinement region. The electron emitter may be attached to or embedded in the confining wall. In some cases, one or more insulating layers may separate confinement wall and the emitter to provide thermal insulation and/or electrical insulation. These layers may be, e.g., made from zirconium oxide, aluminum oxide, zinc nitride, and magnesium oxide. In some cases, an electron emitter has a pointed geometry protruding into the confinement region which increases the generation of electrons.

In some cases, a reactor may have a filament in thermal communication with the electron emitter, and the control system may be configured to apply a current through the filament to heat the emitter. The reactor may include a temperature sensor for monitoring the temperature of the electron emitter, and the control system may be configured to adjust the current to the filament based on the monitored temperature.

In some embodiments, a reactor has a laser configured to emit a beam of light through the confinement region and onto the electron emitter or the confining wall so that electrons are emitted into the confinement region based on the interaction between the beam of light and the electron emitter or the confining wall. The reactor may include a temperature sensor for monitoring the temperature of the electron emitter, and the control system may be configured to control the laser emissions on the monitored temperature.

In some embodiments, the electron emitter is configured for movement into and out of the confinement region during operation of the reactor. The control system may be configured to move the position of the electron emitter, e.g., to control the temperature of the electron emitter (e.g., as measured using a temperature sensor) and the generation of electrons.

The electron emitter may include boron or a boron-containing material. In some cases, the reactant includes boron-11. In some cases, the nuclear mass of the product is greater than the nuclear mass of any of the nuclei of the neutrals and the reactant. The interaction may be a fusion reaction—in some cases, an aneutronic fusion reaction. In some cases, the neutrals include neutral hydrogen, deuterium, and/or tritium.

In certain embodiments, the reactor also includes an energy conversion device configured to extract thermal energy, the kinetic energy of charged reaction products, and/or mechanical energy from the reactor and convert said thermal, kinetic, and/or mechanical energy to electrical and/or mechanical energy for doing work outside the reactor.

Another aspect of the disclosure pertains to a method of operating a reactor that involves applying an electric potential between at least two of a plurality of electrodes in a reactor characterized by the following elements: (a) a confining wall at least partially enclosing a confinement region, (b) the plurality of electrodes adjacent or proximate to the confinement region, (c) a control system having a voltage and/or current source configured to apply an electric potential between the at least two of the plurality of electrodes, where the applied electric potential generates an electric field within the confinement region, and (d) a reactant disposed in or adjacent to the confinement region. The electric field in the confinement region, acting alone or in conjunction with a magnetic field, induces and/or maintains rotational movement of charged particles and neutrals in the confinement region. Additionally, the confinement region proximate the reactant has an electron-rich region having an excess of electrons over positively charged particles of at least about $10^6/cm^3$. Further, repeated collisions between the neutrals and the reactant produce an interaction with the reactant that gives off energy and produces a product having a nuclear mass that is different from a nuclear mass of any of the nuclei of the neutrals and the reactant.

In certain embodiments, the plurality of electrodes are azimuthally distributed about the confinement region, and the control system is configured to induce rotational movement of charged particles and the neutrals in the confinement region by applying time-varying voltages to the plurality of electrodes. In certain embodiments, the electric field in the confinement region acts in conjunction with the magnetic field to induce and/or maintain the rotational movement of the charged particles and the neutrals in the confinement region.

When applying an electric potential between the plurality of electrodes, the electron-rich region may have one or more of the following characteristics: (i) an electric field strength of at least about $10^6$ V/m, (ii) electrons having a temperature, on average, of between about 10,000 K to 50,000 K, (iii) electrons having a density of about $10^{10}$ cm$^{-3}$ to about $10^{23}$ cm$^{-3}$, (iv) a ratio of electrons to positive ions within is between about $10^6$:1 and $10^8$:1, (v) neutrals having an energy of, on average, of between about 0.1 eV and 2 eV, (vi) neutrals having a concentration of at least about $10^{16}/cm^3$ (in some cases, between about $10^{16}/cm^3$ to about $10^{18}/cm^3$) and/or (vii) an extension into the confinement region by a distance of between about 50 nanometers and 50 micrometers.

The reactor may include an electron emitter disposed in or adjacent to the confinement region so that, during operation, the electron emitter generates electrons in the confinement region. The method may, in some cases, include an operation of controlling the generation of electrons in the confinement region.

For example, in some cases, the generation of electrons in the confinement region is controlled by applying a current to a filament in thermal communication with the electron emitter. In some cases, the generation of electrons in the confinement region is controlled by moving the electron emitter into or out of the confinement region. In some cases, the generation of electrons in the confinement region is controlled by controlling the light emissions from a laser directed at the electron emitter or the confining wall.

In some cases, the nuclear mass of the product is greater than the nuclear mass of any of the nuclei of the neutrals and the reactant. The interaction may be a fusion reaction—e.g., an aneutronic fusion reaction. In certain embodiments, the fusion reaction occurs in the electron-rich region at a rate that is about $10^{17}$ to about $10^{22}$ fusion reactions per second per cubic centimeter. In certain embodiments, the neutrals include hydrogen, deuterium, and/or tritium.

In certain embodiments, the method additionally includes converting thermal energy, kinetic energy of charged reaction products, and/or mechanical energy from the reactor to electrical and/or mechanical energy for doing work outside the reactor.

These and other features of the disclosure will be described in more detail with reference to the associated drawings.

BRIEF DESCRIPTION OF DRAWINGS

FIGS. 2a-b schematically illustrate the movement of charged particles and neutral particles rotating within a confinement wall.

FIGS. 5a-d depict a reverse electrical polarity reactor.

FIGS. 11a-b depict a first embodiment reactor in which permanent magnets are configured to apply an axial magnetic field in a first embodiment reactor.

FIGS. 13a-c depict a configuration of a first embodiment reactor.

FIGS. 15a-c depict how ring magnets may be positioned along a common axis create a magnetic field substantially pointed along that axis.

FIGS. 16a-c depict a first embodiment reactor in which the applied magnetic field in the confinement region is applied using ring magnets.

DETAILED DESCRIPTION

Introduction

Figure 1C:
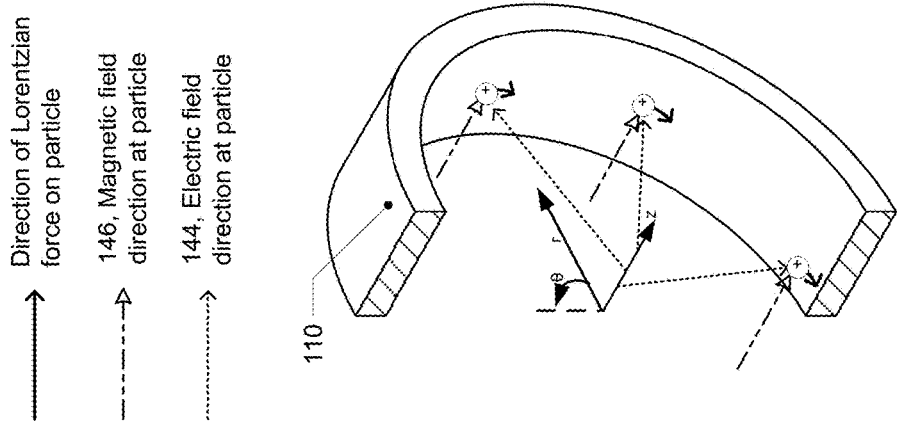
FIGS. 1a-c depict several views of a first embodiment reactor.

Various embodiments disclosed herein pertain to reactors and methods of operating those reactors under conditions that induce a reaction between two or more nuclei in a manner that produces more energy than is input to the reactor. This disclosure refers to such reactions as nuclear fusion reactions or simply fusion reactions, although aspects of the reaction may be quantitatively or qualitatively different from aspects of reactions conventionally characterized as nuclear fusion. Therefore when the term fusion is used in the remainder of this disclosure, the term does not necessarily connote all the features conventionally ascribed to nuclear fusion. In some embodiments disclosed herein, a reactor may generate a sustained fusion reaction making it suitable as a viable energy source. As described herein, a sustained fusion reaction refers to a fusion reaction in which reactor may continuously operate above unity for a period of about a second.

In various embodiments, the reactor in which the fusion reaction occurs is designed or configured to constrain or confine rotating species including, typically, one or more of the nuclei participating in a fusion reaction. Various structures may be provided for confining the rotating species. Typically, though not necessarily, these structures define a solid physical enclosure. As explained more fully elsewhere herein, the enclosed structure may have many shapes such as a generally cylindrical shape. Examples of suitable structures that may be used for a physical enclosure are depicted in FIGS. 1, 7, and 6.

Regardless of any other functions, the wall of the reactor typically serves to confine species rotating in the region adjacent to and internal to the wall. The wall is confining in the sense that it confines the rotating species to remain within the reactor. As described herein, this wall of the reactor is referred to as the wall, the confining wall, or the shroud. In various embodiments, the wall also serves other functions: notably as an electrode, as a magnet, as a source of fusion reactants (e.g., boron compounds), and/or as an electron emitter. Because the wall constrains the reactants species physically rather than by a magnetic field or a pressure wave—as are done in conventional approaches to fusion—it is unlike any conventional fusion reactor designs. Its other functions, such as being an electrode for imparting a voltage difference, being a magnet, being a source of reactant material, and being an electron emitter, provide additional distinctions from conventional fusion reactor designs.

In certain embodiments, the reactor contains a wall, as described, and a space interior to the wall (which may be annular in shape) where reactant species, including a substantial fraction or percentage of neutrals, rotate and repeatedly impinge on the surface of the reactor wall and sometimes fuse with species present in the wall. When accounting for the energy input to the reactor, the resulting reaction can breakeven and result in Q>1. To ensure that the fusion reaction is sustainable over a period required by particular energy-generation applications, the ratio of energy out to energy in should be significantly greater than 1. This accounts for inherent inefficiencies in using energy generated by a fusion reaction to sustain the conditions that allow fusion to occur (e.g., particular plasma densities in the confinement region). In certain embodiments, the ratio should be at least about 1.2. In certain embodiments, the ratio should be at least about 1.5. In certain embodiments, the ratio should be at least about 2. In certain embodiments, the reactor is continuously operated under sustainable conditions for at least about fifteen minutes, or at least about one hour. In one example, hydrogen atoms rotate in the reactor and impinge on boron or lithium atoms in the reactor wall to undergo fusion. In some embodiments, the reactor includes one or more electron emitters that produce an electron flux that, during operation, produce a strong field that reduces the Coulombic repulsion between interacting nuclei.

The reactants can be any species that can support a fusion reaction in the space interior to the confining wall of the reactor. In various embodiments, at least one of the reactants is a species that is rotating within the reactor interior region. In some cases, both of the reactants are rotating species. In some cases, one of the reactants is a rotating species and the other is a species that is held stationary, such as when a reactant is embedded in a part of the reactor wall that confines the rotating species. In some cases, there is some combination of reactants that are rotating and stationary such that fusion may occur between rotating species or between a rotating species and a stationary species. In cases where the reacting species are predominantly rotating species, the physical structure of the reactor may be configured such that the rotating species need not substantially impinge on the inner surface of a wall of the reactor to support a fusion reaction. In some designs, the rotating species are constrained by a force such as a force that prevents them from substantially striking the reactor wall. In such designs, two rotating species fuse in the region interior to the confining wall (e.g., the confinement region) or along the surface of the wall. In some designs, a rotating species may fuse with a stationary species (e.g., a target material) located within the confinement region.

In certain embodiments, the reactants are species that react aneutronically. In other embodiments, the reactants are species that react neutronically. One or both of the reactants may also be a neutral, or uncharged, species. Sometimes the species present in the reactor are referred to as "particles." However, such species are only particles at the molecular or atomic scale.

The disclosed small-scale, e.g., table-top, aneutonic reactors require relatively little or no biological shielding from neutron radiation. Fusion reactions in reactors described herein may be characterized as "warm fusion," e.g., where fusion occurs in the temperature range of about 1000K to 3000K, and as such are much easier to handle compared to "hot fusion reactors" (e.g. those in tokamak reactors). Since the fusion is substantially aneutronic and "warm," materials and thus costs associated with "warm fusion" reactors may be significantly reduced. For instance, in some cases, a prototype reactor has been built for less than $50,000. Since radiation shielding and the industrial-grade hardware commonly used for hot plasma reactors may not be required, the disclosed small-scale reactors may also have a small weight and footprint.

Figure 1B:
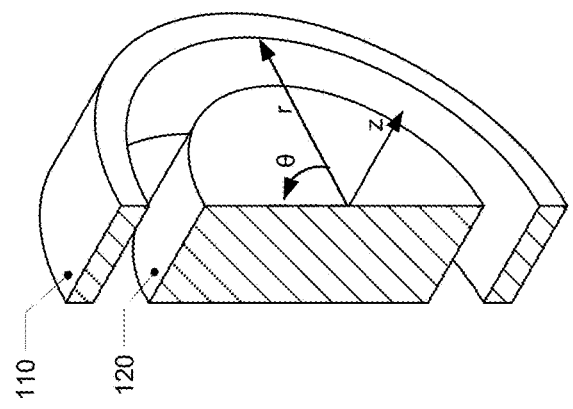
Figure 1A:
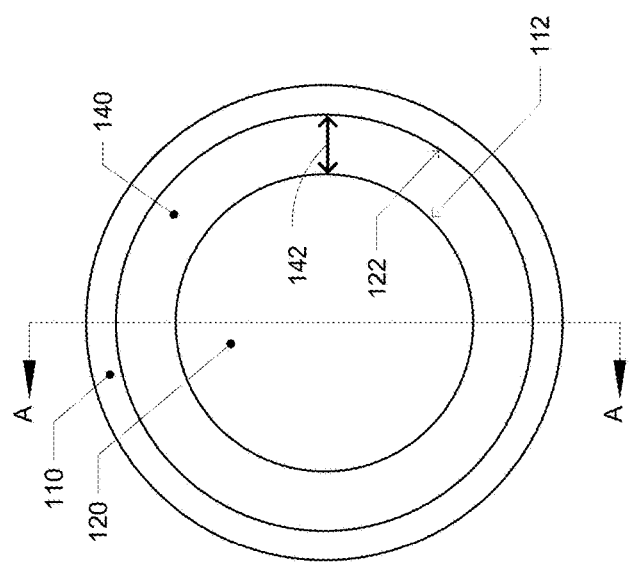

The rotational motion of the species in the reactor may be imparted by a number of mechanisms. One mechanism imparts rotation via the application of interacting electric and magnetic fields. The interaction is manifest as a Lorentzian force that acts on charged particles in the reactor. Examples of reactor designs that can produce a Lorentzian force to act on charged species are depicted in FIGS. 1a-c and 6. FIGS. 1a-c depict a Lorentzian driven reactor where the reactor has inner electrode 120, and where the shroud (confining wall) is an outer electrode 110. An electric field 144 between the electrodes in the presence of an applied magnetic field 146, having a perpendicular component, causes a Lorentzian force on charge particles or charged species traveling in between the electrodes. This force drives them azimuthally into rotation as indicated in FIG. 1c. In another class of reactor design, rotational motion is imparted to charged species by applying a potential or a change in potential sequentially to a plurality of electrodes arranged azimuthally around a wall of the reactor. An example of a suitable reactor design is shown in FIG. 7.

In many implementations, the reactor is operated in a manner such that the rotating charged species interact with neutral species and impart angular momentum to those neutral species, thereby setting up rotational motion of the neutral species as well as the charged species within the reactor. In many implementations, the majority of rotating species are neutrals and the charged species are ionized particles such as a proton ($p^+$). As described herein, this process may be referred to as ion-neutral coupling. FIG. 2a schematically illustrates the ion-neutral coupling process in which a few charged particles 204 impart motion to the surrounding neutral particles 206.

Figure 21B:
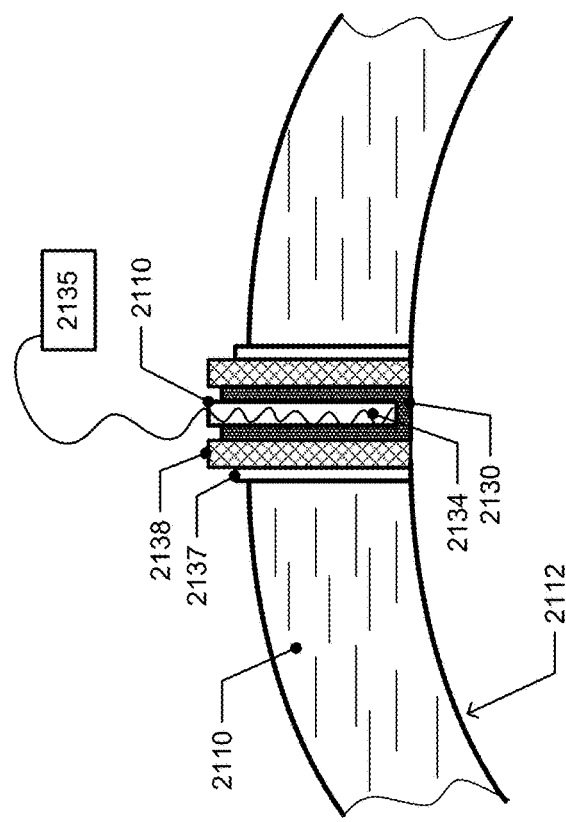
FIGS. 21a-b depict electron emitting modules that may be placed on a confinement wall of a reactor.
Figure 21A:
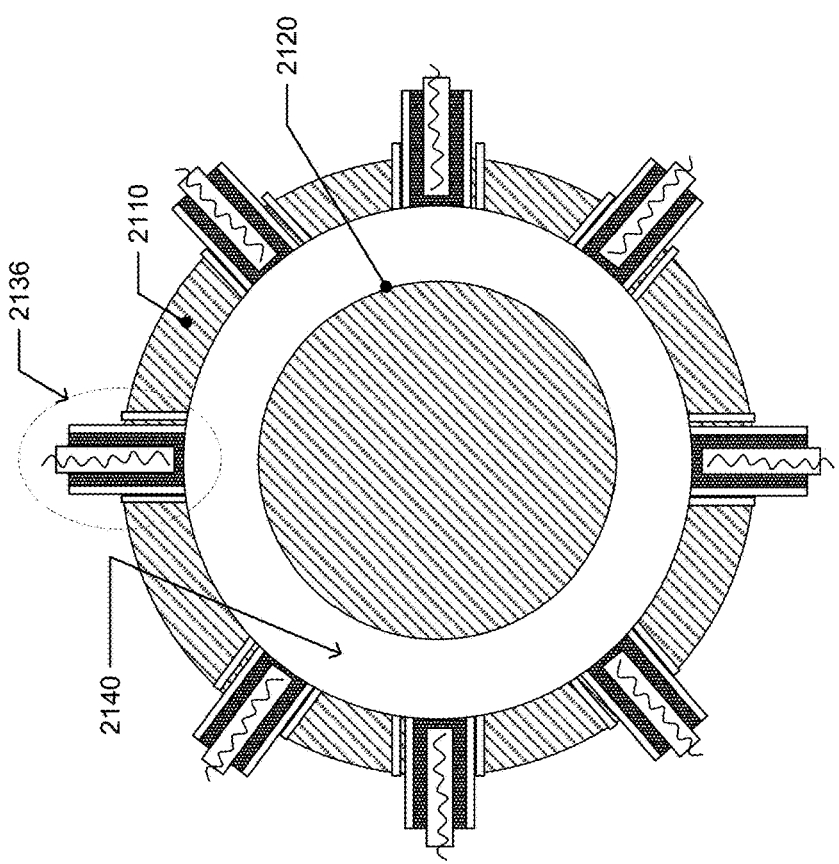

In various embodiments, the reactor is designed to emit electrons in an internally localized region of the reactor where fusion events are expected to occur. Referring again to FIG. 2a, these electrons may form an electron-rich region 232 near the confining wall 210. The presence of excess electrons lowers the Coulomb barrier and thereby increases the probability of fusion. As explained elsewhere herein, emitting electrons in this manner can produce an electron-rich region that reduces the intrinsic Coulombic repulsion between two positively charged nuclei, which are candidates for fusion. In certain embodiments, the electron emission occurs at or adjacent to the wall that confines the rotating species within the reactor. In one example, electron emission is provided by passive structures such as boron-containing coupons or strips embedded in or attached to the confining wall of the reactor. Such passive structures emit electrons when the localized temperatures increase during operation of the reactor. In other embodiments, electron emission is implemented using active structures that are controlled independently of the heating produced during normal operation of the reactor. An example of an active structure for electron emission is depicted in FIGS. 21a and 21b and includes separately controlled resistive elements for heating the individual electron emitters.

Another aspect of this disclosure relates to structures or systems for capturing and converting energy produced by a fusion reaction within the reactor. One class of energy capture systems provides for direct capture of electrical energy produced by traveling alpha particles generated by the fusion reaction. This may be done by generating an applied electric field in the path of emitted alpha particles which causes the alpha particles to decelerate and generates an electric current in a circuit connected to the electrodes used to produce the electric field. Another class of energy capture systems provides for energy capture using heat engines such as those including a turbine, heat exchanger, or other conventional structure employed to convert thermal energy produced from the fusion reaction into mechanical energy. These and other energy capturing mechanisms will be discussed later in this disclosure.

Interactions by Neutrals with the Wall

Neutral species interacting with the wall of a reactor provide a different type of interaction than has been employed in conventional fusion studies. The repeated interactions take place over a relatively large volume, which may be the annular space next to the inner wall of or the inner surface of the confinement wall. Because the rotating neutrals frequently interact elastically with the wall at a shallow angle, e.g., at a glancing or grazing angle, they may immediately leave the wall and reenter the interior space with much of the energy they had upon entry. FIG. 2b illustrates an example trajectory path a neutral 206 may have as it moves along the surface of the confinement wall 210. When a rotating neutral particle enters or strikes the wall, it typically encounters a potential fusion partner with which it may react or not. When it does not react, it re-enters the interior space where it continues on its rotational journey. In this manner, it repeatedly interacts with the surface of the wall, and in each such elastic collision little to no energy is lost.

Figure 3B:
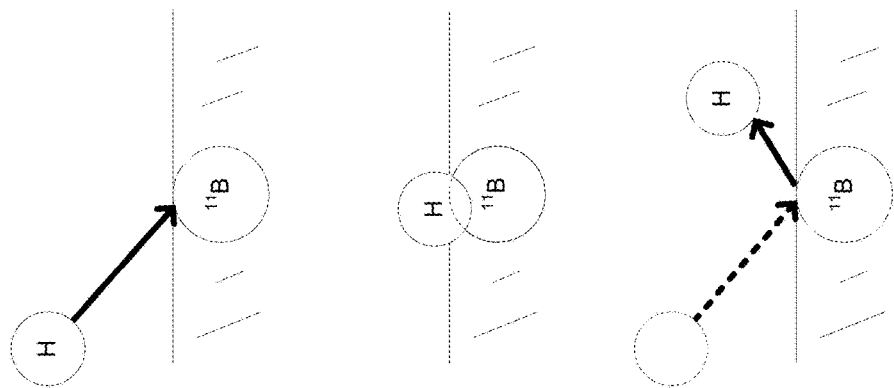
FIGS. 3a-d schematically depict neutral and charged particle interactions with a confinement wall.
Figure 3A:
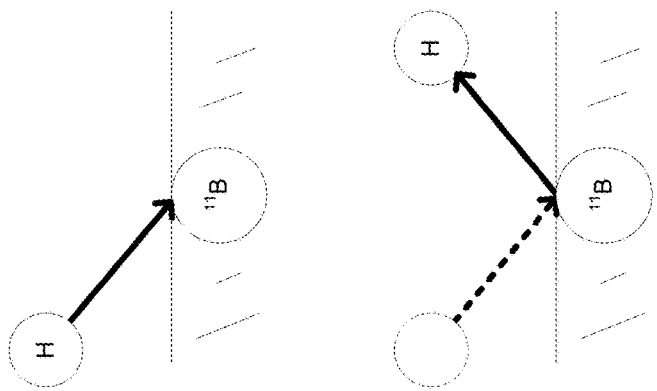
Figures 3C, 3D:
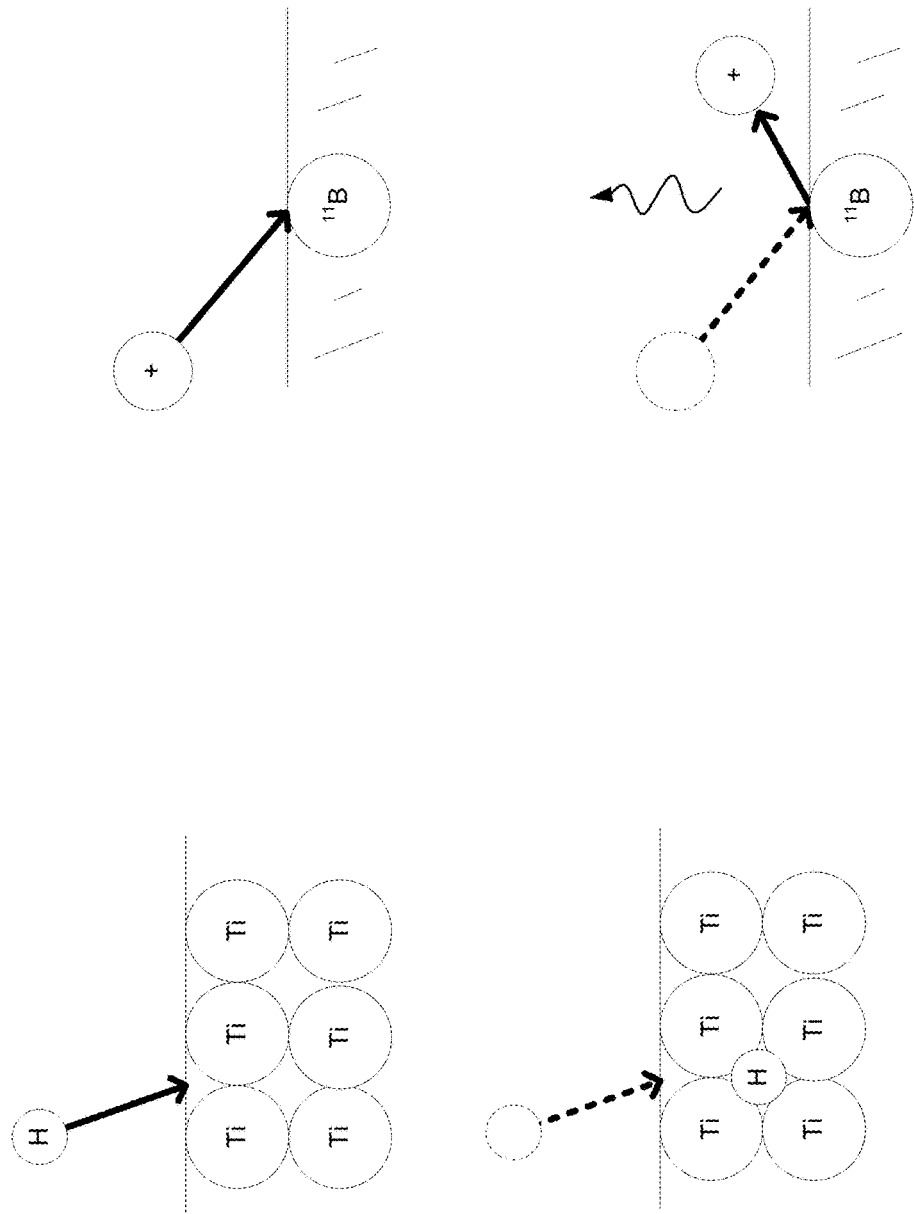

Some particle-wall interactions that do not result in fusion are illustrated schematically in FIGS. 3a-d. While the figures depict interactions with boron[11] and/or titanium, these interactions may also occur when other reactant materials are used in the confinement wall. As illustrated in FIG. 3a, in some fraction of the neutral-wall interactions, the neutral particle experiences an elastic collision with a nucleus in the wall (in this case an atom of boron[11]), and the rebounding neutral maintains most of the energy it had going into the interaction. Of all neutral-wall interactions, elastic collisions typically have that highest occurrence. In a much smaller fraction of the collisions, depicted in FIG. 3b, the nucleus of the neutral comes sufficiently close to the nucleus of an atom in the wall that the collision becomes inelastic as a result of tunneling that occurs when the two nuclei come into very close proximity. FIG. 3c depicts yet another interaction that may occur; in this case, a neutral penetrates into the wall. This type of collision may occur somewhat frequently when the confinement surface contains a material such as titanium or palladium that may absorb hydrogen molecules.

FIG. 3d depicts an inelastic collision of a charged particle, e.g., a proton, with the confining wall. This situation contrasts with the frequent elastic collisions that neutrals such as atomic hydrogen have with the confining wall (previously depicted in FIG. 3a). When a charged particle approaches and departs from the confining wall, the particle may experience Bremsstrahlung energy loss. This energy loss is caused by electrostatic interaction between the charged particle and electrons in the electron-rich region. As a result of the electrostatic forces, some kinetic energy is lost, and high energy electromagnetic radiation such as x-rays are emitted. In conventional fusion reactors that focus on trying to fuse ionized particles, Bremsstrahlung radiation may result in significant energy loss. By using a weakly ionized plasma having a high proportion of neutrals to ions, these losses are largely avoided.

Figure 4A:
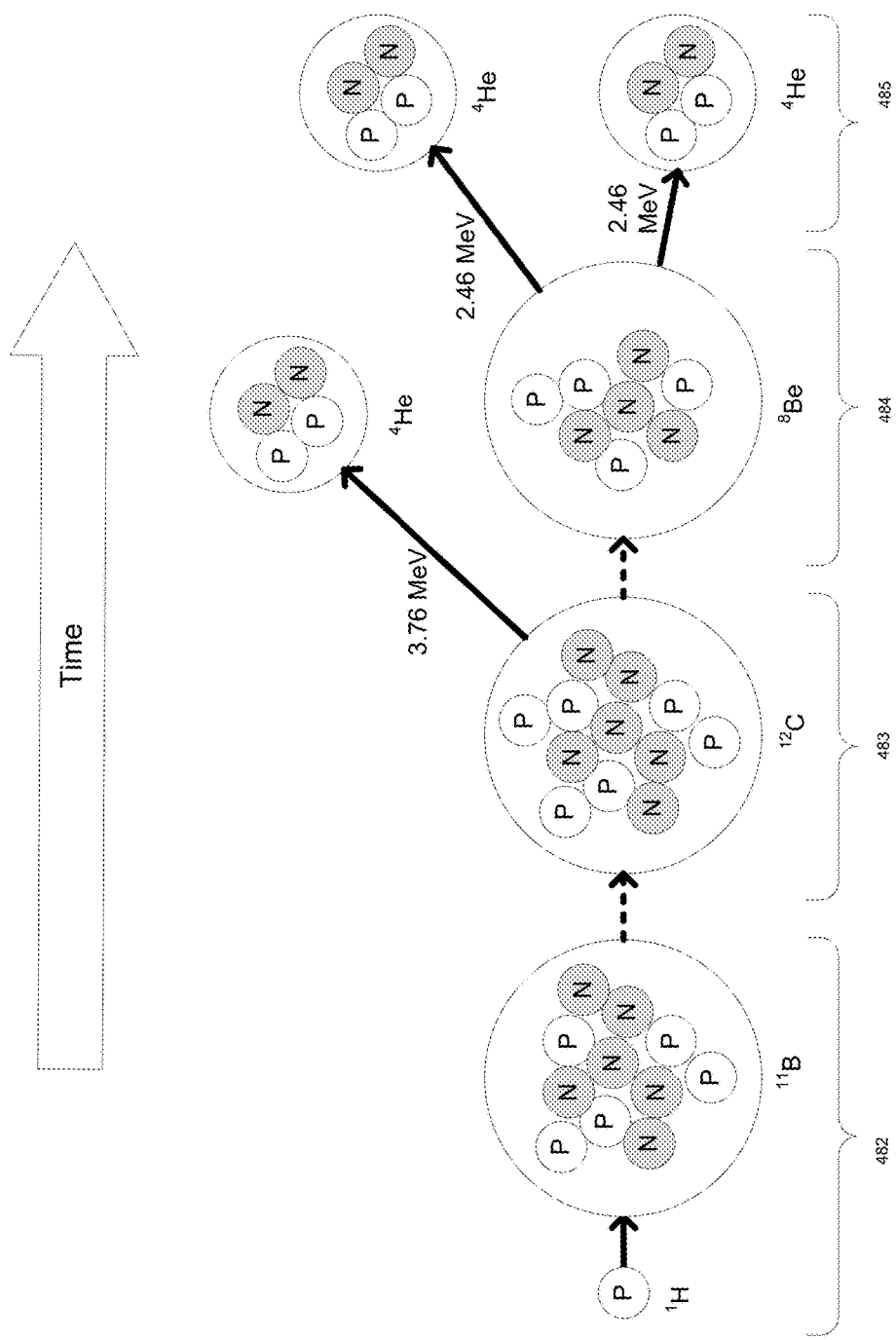
FIGS. 4a-e depict stages of the aneutronic proton-boron-11 fusion reaction.
Figure 4B:
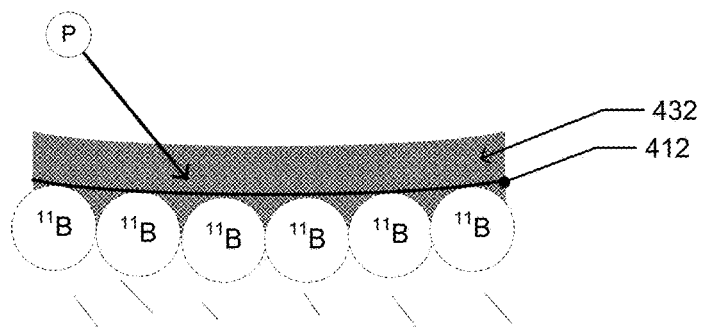
Figure 4C:
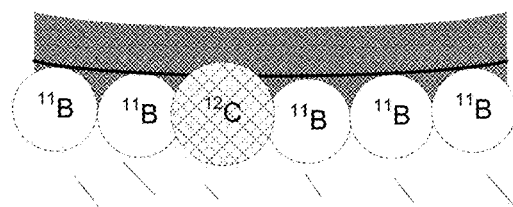
Figure 4D:
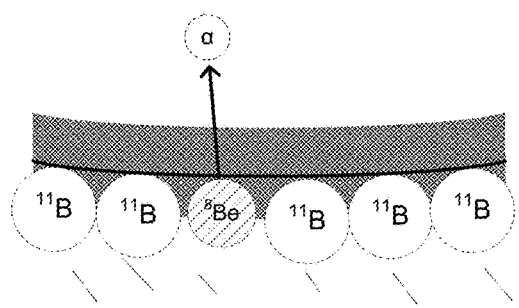
Figure 4E:
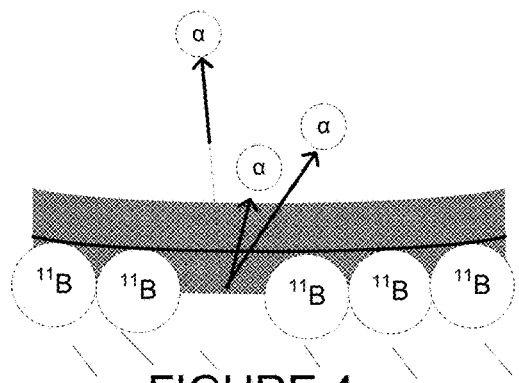

In a certain fraction of tunneling interactions between the neutral nucleus in motion and the nucleus of an atom in the wall, fusion may occur. FIG. 4a depicts the stages of the aneutronic fusion reaction that occurs when a hydrogen atom or proton fuses with a boron 11 atom. First, in 482, a proton traveling at high velocity collides with a boron 11 atom, and the two nuclei fuse to form an excited carbon nucleus, depicted in 483. The excited carbon nucleus is short-lived, however, and decomposes into a beryllium nucleus and an alpha particle that is emitted having a kinetic energy of 3.76 MeV, as seen in 484. Finally, in 485, the newly formed beryllium nucleus almost immediately decomposes into two more alpha particles, each having a kinetic energy of 2.46 MeV. FIGS. 4b-e depict the various stages of the same proton-boron 11 fusion reaction shown in FIG. 4a in relation to the surface of the confining wall 412. FIG. 4a depicts a proton traveling at high velocity towards a surface of boron 11 atoms on the confining wall. As the neutral hydrogen atom approaches the confining wall it passes through and the electron-rich region 432, which partially screens the repulsive force between the two positively charged nuclei. FIG. 4c depicts the stage at which the neutral hydrogen has fused with a boron atom to form a carbon nucleus. In FIG. 4d, the carbon nucleus has decomposed into a beryllium nucleus one alpha particle. Lastly, in FIG. 4e, the beryllium nucleus decomposes, emitting two additional alpha particles. Because the potential reactants are neutral species rather than ions, most of their interactions with atoms in the surface of the confinement wall are elastic collisions. In contrast, a positively charged particle entering the wall will be deflected by electrostatic repulsive forces at a distance from other nuclei in the wall. These electrostatic interactions cause the charged particle to lose energy; i.e., the collisions are inelastic. A neutral particle, which has a positively charged nucleus screened to a degree by the orbital electrons, does not experience the same repulsive force. As a consequence, the neutral is more likely to directly impact another atom in the wall. The use of neutrals rather than ions, therefore, increases the likelihood of a fusion reaction, and when a fusion reaction does not occur, the neutral is more likely to rebound elastically with a higher energy than a corresponding ion.

Overall, the rotating neutral particles undergo many repeated interactions with the wall and those that are unproductive in producing a fusion reaction elastically rebound with relatively little energy loss. As mentioned, the neutrals tend to reemerge from the wall and with sufficient energy that they can enter into a next interaction with the wall which might be productive in creating a fusion reaction. Each of the interactions with the wall has a probability of resulting in a fusion reaction between the neutral nucleus and the nucleus of an atom in the wall.

Where the reactants are different species (e.g., $^{11}$B and $p^+$), the rate of fusion per unit volume is given by $$dN/dT = n_1 n_2 \sigma v$$

where $n_1$ and $n_2$ are the densities of the respective reactants, $\sigma$ is the fusion cross section at a particular energy, and $v$ is the relative velocity between the two interacting species. For a system in which at least one species rotates in a confinement region and repeatedly strikes a confining wall containing a second species, the values of the densities of the species may be on the order of $10^{20}$ cm$^{-3}$ for the rotating species and $10^{23}$ cm$^{-3}$ for the immobilized species (e.g., boron), the values of the fusion cross section may be on the order of $10^{-32}$ cm$^2$, and the relative velocity of the interacting species may be on the order of $10^3$ m/s. By comparison, for a tokamak reactor, the values of the density of each of the species is on the order of $10^{14}$ cm$^{-3}$, the values of the fusion cross section are on the order of $10^{-28}$ cm$^2$, and the relative velocity of the interacting species is on the order of $10^6$ m/s. (Based on information provided in "Inertial Confinement Fusion.pdf" by M. Ragheb dated on Jan. 14, 2015.) Clearly, systems employing neutral species, like those described herein, have a strong advantage by virtue of their higher densities. The rate of fusion energy per unit volume for such systems exceeds that of tokamak and inertial confinement systems by at least about eight orders of magnitude. Thus, a system as disclosed herein can achieve a defined rate of energy production in about one-hundred-millionth of the volume of a tokamak or internal confinement system.

Coulombic Barrier Reduction

As explained, credible, prior approaches to nuclear fusion have energized fusion reactants and the supporting environment to extremely high temperatures, on the order of at least 150,000,000K (13000 eV). This is done to impart sufficient kinetic energy to the fusion reactants to overcome their natural electrostatic repulsion. In this environment, each reactant is a nucleus having an intrinsic positive charge which must first be overcome to allow some probability of a fusion reaction.

Certain embodiments of the present disclosure employ much lower temperatures; e.g., on the order of 2000K (0.17 eV) in fusion reactions. These embodiments employ neutral species as one or more reactants and/or modify the reaction environment to reduce the strong Coulombic repulsive force between reactant nuclei. Reduction of the Coulombic force may be accomplished in various ways including, for example, (i) providing an electron rich field in the region of the reaction and/or (ii) aligning the quantum mechanical spins of reactant nuclei. Depending on the structure of the reactor, the apparatus and methods for reducing Coulombic repulsion may take many forms. The following description assumes that the reactor includes an annular space with an outer confining wall or shroud. Other reactor structures can likewise produce reduced Coulombic repulsion environments that support fusion, but they may accomplish this in manners different than the one that follows.

The following is provided as one possible explanation of the environment near the inner surface of a confining electrode and should not be construed as a limitation on the practice of the disclosed embodiments. In this explanation, reactant species, particularly neutrals, rotate at high velocity and strike the inner surface of the electrode. Concurrently, electrons are emitted from or near the confining wall. The rapidly rotating neutrals have high angular velocity and therefore exert extreme pressure on the inner surface of the confining wall through an associated centrifugal force. Electrons emitted from the inner surface of the wall oppose this force.

The emitted electrons will diffuse away from the location where they are emitted, e.g., away from the wall and toward an interior space. However, the centrifugal force of the neutrals constrains the electrons to the region near the inner surface of the outer electrode. A resulting thin region of balanced forces adjacent to the inner surface of the electrode possesses a strong field that reduces the Coulombic repulsion between reactant nuclei.

The force balance may be expressed mathematically as the equilibrium of (i) the gradient (in a direction away from the wall surface in which electrons are emitted) of the product of the temperature and the density of electrons and neutrals, and (ii) the centrifugal force exerted toward the inner surface. The centrifugal force is proportional to the product of the neutrals' density, the radial position, and the square of their angular velocity.

$$\frac{\partial}{\partial r}(n_e K T_e + n_0 K T_0) = n_0 m_0 \omega^2 r$$

In this expression, r is the radial direction away from the inner surface of the confining electrode, K is the Boltzmann constant, $T_e$ and $T_0$ are the electron and neutral temperatures in Kelvin, $n_e$ and $n_0$ are the densities of electrons and neutrals, $n_0$ is the density of neutral species, $m_0$ is the mass of one rotating neutral species (e.g., a hydrogen atom), and $\omega^2$ is the square of the angular velocity of the rotating neutral species.

In a thin region next to the surface from which the electrons are emitted (e.g., the inner surface of the confining wall), the free electrons create a strong electrical field (see the schematic representation of electron-rich region 232 adjacent confining wall 210 in FIGS. 2a-b). The high concentration of neutrals limits the mean free path of the electrons, preventing them from following ballistic trajectories and thus obtaining sufficient kinetic energy to significantly ionize the neutrals. Also, there are relatively few positive ions available for recombination because the neutrals have a significantly higher density than the ions. For example, the prevalence of ions to neutrals may be in the ranges of less than about 1:10, less than about 1:100, less than about 1:1000, or less than about 1:10000. Hence the neutrals are frequently positioned between the electrons and positive ions. This set of conditions produces a high concentration of excess electrons near the confining wall's inner surface and hence a strong electric field.

The combination of a large excess of electrons (over ions) in a very thin region (e.g., next to the inner surface of the electrode) and in the presence of a high concentration of neutrals produces a very strong electric field. In this region, the strong field reduces the Coulombic repulsion of interacting positively charged nuclei. Hence, the probability of two positively charged nuclei coming in close proximity is significantly increased.

Additionally, as mentioned, rotating particles impinging on the inner surface of the confining wall produce repeated opportunities for interacting fusion reactants. Neutrals repeatedly pass through the electron-rich layer and strike the inner surface of the confining wall or shroud and reenter the interior space of the reactor. This impingement on the wall represents the radial component of centrifugal force produced by particles rotating in a constrained environment (e.g., the inner surface of the confining wall). The repeated collisions, contact, or strikes increase the probability of a fusion reaction in a given area over a given period of time.

The repetition replaces the need for a long confinement time and addresses the concerns that led to Lawson's criterion for characterizing prior approaches to fusion reactions. In simple terms, the overall probability of a fusion reaction is increased significantly.

As an example, the electron-rich region may be characterized by any combination of the following parameter values:

Density of free electrons: about $10^{23}/cm^3$
Density of neutrals: about $10^{20}/cm^3$
Density of positive ions: about $10^{15}$-$10^{16}/cm^3$ (about $10^{-5}$ to 0.01% of neutrals)
Difference in densities of electrons and positive ions: about $10^6$ to $10^8/cm^3$
Thickness (radial) of free electron-rich region (region where most of the electron density gradient exists): about 1 micrometer
Electric field strength in the electron-rich region: about $10^6$ to $10^8$ V/m
Electron temperature: about 1800-2000 K. (about 0.15 to 0.17 eV)
Centripetal acceleration: about $10^9$ g's (where g is the acceleration due to gravity=9.8 $ms^{-2}$)

The free electrons in such systems may be viewed as collectively catalyzing the fusion reaction of two nuclei. By analogy, one or more muons in association with protons and deuterons are sometimes described as catalyzing the fusion of hydrogen and deuterium atoms. Just as muons catalyze the fusion by allowing two fusing nuclei to get closer to one another, the free electrons in the vicinity of fusing nuclei catalyze fusion reactions described herein. Effectively, the electrons reduce the energy barrier that prevents the two reactants from coming close enough to react. This is very similar to the action of any catalyst in a chemical or physical context. Both muons and electrons increase the rate of reaction but do not actually participate in the reaction; they simply reduce the energy barrier required to bring the reactants in close enough proximity to react.

However, muon and electron catalysis have few other similarities. Muon catalyzed fusion is not commercially viable for various reasons. Notably, muons have a much greater mass than electrons and hence producing them is much more energetically expensive. Further, only relatively few of them can be produced at any instant in time, which means the breakeven requirement for fusion is not attainable. For the proton-boron-11 reaction, breakeven fusion may require approximately $10^{17}$ successful fusion interactions per cubic centimeter per second. Only a few nuclei in a large pool would be able to benefit from muon catalyzed fusion, nowhere near the level needed to support fusion.

In contrast, electrons can be easily produced, and in high density. For example, in accordance with the techniques disclosed herein, electrons can be generated at densities of approximately $10^{20}$ per cubic centimeter or greater. With such high densities, the electrons act collectively to produce a high electric field, which over a relatively large volume reduces the Coulombic barrier to interaction between approaching nuclei. Such a relatively large volume permits the needed interactions to breakeven, i.e. at least about $10^{17}$ successful fusion interactions per cubic centimeter per second.

Terminology

A "reactor" is an apparatus in which one or more reactants react to produce one or more products, often with an accompanying release of energy. The one or more reactants are provided in a reactor by continuous delivery, intermittent delivery, and/or a one-time delivery. They may be provided in the form of gasses, liquids, or solids. In some cases, a reactant is provided as a component of a reaction; for example, it may be included in a structure of the reactor such as a wall. Boron 11, lithium 6, carbon 12, and the like may be provided in a confining wall of a reactor. In some cases, a reactant is provided from an external source such as from a gas supply tank. In certain embodiments, the reactor is configured to promote a nuclear fusion reaction having a Q>1. A reactor may have components for removal of products and/or energy produced during the reaction. Product removal components may be ports, passages, getters, and the like. Energy removal components may be heat exchangers and the like for removing thermal energy, inductors and similar structures for directly removing electrical energy, etc. The reactor components may permit products and energy to be removed continuously or intermittently. In certain embodiments, a reactor has one or more confining walls that contain the reactants, and in some cases, provides a source of reactant, an electrical field, etc. As illustrated throughout this disclosure, reactors suitable for providing a sustained fusion reaction may have many different designs.

A "rotor" is a reactor or reactor component in which one or more reactant or product species (particles) rotates in a space. The space may be defined at least in part by a confining wall as described herein. In some cases, the rotation is induced by a magnetic force, an electrical force, and/or a combination of the two, as in the case of a Lorentz force. In certain embodiments, the rotation is induced by applying an electrical and/or magnetic force to electrically charged particles in a manner that causes them to rotate in a confinement region; the rotating charged particles collide with neutrals to cause the neutrals to likewise rotate in the confinement region, a phenomenon sometimes called ion-molecule coupling. Because the neutrals are not affected by the electrical and/or magnetic force, they would not rotate in the confinement region absent the interaction with the charged particles. The confining wall or other outer structure of the rotor may have many closed shapes as described herein. In some embodiments, the outer structure has a generally or substantially circular or cylindrical shape. In such cases, the shape need not be geometrically exact, but may exhibit certain variations such as eccentricity around an axis of rotation, non-continuous curvature such as vertices, and the like.

In some cases, the confinement region of a rotor has an interior rod or other structure arranged concentrically with respect to the confining wall. In such cases, the rotor has an "annular space" where the particles rotate. When used herein, an "annular space" refers to a confinement region wherein the region is substantially ring-shaped. It should be understood that some rotors do not have an interior rod or other structure to define an annular space. In such cases, the confinement region of the rotor is simply a hollow structure. While an annular space may have a generally cylindrical shape, such a shape may exhibit certain variations such as eccentricity around an axis of rotation, non-continuous curvature such as vertices, and the like.

The "Lorentz force" is provided by a combination of electric and magnetic forces on a charge due to the resulting electromagnetic fields. The magnitude and direction of the force is given by the cross product of the electric and magnetic fields; hence the force is sometimes referred to as J×B. When the electric and magnetic fields have orthogonal directions, the force applied to a charged particle has a rotational direction that may be represented by the right-hand rule mnemonic.

In fusion reactions, participating reactants and products, which may include protons, alpha particles, and boron ($^{11}B$), are not necessarily present in complete purity. To the extent that any such reactant, product, or other component of a reaction is presented herein, such component is understood to be substantially present. In other words, the component need not be present at the level of 100% but may be present at a lower level, e.g., about 95% by mass or about 99% by mass.

An aneutronic reaction is conventionally understood to be a fusion reaction in which neutrons carry no more than 1% of the total released energy. As used herein, an aneutronic reaction or a substantially aneutronic reaction is one that meets this criterion.

Examples of aneutronic reactions include:

$$p + B^{11} \rightarrow 3He^4 + 8.68 \text{ MeV}$$

$$D + He^3 \rightarrow He^4 + p + 18.35 \text{ MeV}$$

$$p + Li^6 \rightarrow He^4 + He^3 + 4.02 \text{ MeV}$$

$$p + Li^7 \rightarrow 2He^4 + 17.35 \text{ MeV}$$

$$p + p \rightarrow D + e^+ + \nu + 1.44 \text{ MeV}$$

$$D + p \rightarrow He^3 + \gamma + 5.49 \text{ MeV}$$

$$He^3 + He^3 \rightarrow He^4 + 2p + 12.86 \text{ MeV}$$

$$p + C^{12} \rightarrow N^{13} + \gamma + 1.94 \text{ MeV}$$

$$N^{13} \rightarrow C^{13} + e^+ + \nu + \gamma + 2.22 \text{ MeV}$$

$$p + C^{13} \rightarrow N^{14} + \gamma + 7.55 \text{ MeV}$$

$$p + N^{14} \rightarrow O^{15} + \gamma + 7.29 \text{ MeV}$$

$$O^{15} \rightarrow N^{15} + e^+ + \nu + \gamma + 2.76 \text{ MeV}$$

$$p + N^{15} \rightarrow C^{12} + He^4 + 4.97 \text{ MeV}$$

$$C^{12} + C^{12} \rightarrow Na^{23} + p + 2.24 \text{ MeV}$$

$$C^{12} + C^{12} \rightarrow Na^{20} + He^4 + 4.62 \text{ MeV}$$

$$C^{12} + C^{12} \rightarrow Mg^{24} + \gamma + 13.93 \text{ MeV}$$

Examples of neutronic reactions include $$D + T \rightarrow He^4 + n + 17.59 \text{ MeV}$$

$$D + D \rightarrow He^3 + n + 3.27 \text{ MeV}$$

$$T + T \rightarrow He^4 + 2n + 11.33 \text{ MeV}$$

The coulombic repulsion force is the electrostatic force experienced by two or more particles of the same charge. For two interacting particles, it is proportional to the reciprocal of the square of the separation distance (Coulomb's law). Thus, the repulsion becomes significantly stronger as charged particles approach one another. The repulsive force experienced by a charged particle in an electric field produced by multiple charged particles is given by the superposition of the contributions of all charged particles in the vicinity.

Lowering the coulombic barrier means that the commonly known and understood coulombic repulsion force typically calculated or experienced between two isolated particles is "lowered" or reduced by some calculable degree when the particles are in some proximity to a sufficient number of electrons or other charged particles to reduce the repulsive force that isolated particles would otherwise experience. As an example, the presence of excess electrons at a density of XX reduce the coulombic repulsive force between two positively charged YY particles in the domain of the electrons by ZZ %.

Lorentzian Rotor Embodiments

First Embodiment

FIGS. 1a-c depict a first embodiment of a reactor in which charged particles, charged species, or ions are rotated by the Lorentz force. FIG. 1a is a cross-section view of a reactor, while FIG. 1b provides an isometric cutout view of the same reactor along of section A-A from FIG. 1a. Unless stated otherwise, directionality using the r, θ, and z coordinates pertains to a cylindrical coordinate system as shown in FIG. 1b. In the depicted embodiment, a Lorentzian driven rotor has outer wall 110, which also serves as the outer electrode, and concentric inner electrode 120, sometimes referred to as a discharge rod, that is separated from the outer electrode by annular space 140. An electric field is formed across the annular space by applying an electric potential between the inner electrode 120 and the shroud 140. When a sufficient electric potential is applied between the electrodes, a portion of the gas in the annular space is ionized, and a radial plasma current across the annular space is generated. In various embodiments, the inner electrode is held at a high positive potential while the shroud is grounded such that the electric field, and the flow of current, is substantially in the positive r-direction.

FIG. 1c depicts how the Lorentzian force is used to drive charged particles azimuthally within the confining wall 110. In FIG. 1c, the discharge rod has been removed and the axis has translated in the z-direction to improve clarity. While not shown, a magnet such as a permanent magnet or a superconducting magnet is used to generate an applied magnetic field that is substantially parallel to the z-axis (substantially axial direction) within the annular space. The magnetic field is substantially perpendicular to the direction of the electrical current causing the moving charged particles, charged species, and ions to experience a Lorentz force in the azimuthal (or Θ) direction. For example, consider the case in which the discharge rod has a positive potential vis-à-vis the outer electrode (e.g., the discharge rod has an applied positive potential while the outer electrode is grounded), thereby producing an electric field in the r-direction (144). In this configuration positively charged ions will move in the r-direction towards the outer electrode through the annular space 140. If a magnetic field concurrently points in the z-direction (146), the ions will experience a Lorentz force in the −Θ direction, or clockwise direction as viewed from the perspective shown in FIGS. 1b and 1c. In some cases the electric field and magnetic field may be at an angle that differs from the perpendicular yet is not parallel, such that perpendicular components, to a lesser or greater extent, are present in sufficient strength to create a sufficiently strong azimuthal Lorentz force. This azimuthal force acts on charged particles, charged species, and ions, which in turn couple with neutrals such that neutrals in the annular space between the central discharge rod and outer electrode also are made to move at high rotational velocity. The lack of any moving mechanical parts means that there is little limitation to the speed at which rotation can occur, thus providing rotation rates of neutrals and charged particles that are in excess of, for example, 100,000 RPS.

Reverse Electrical Polarity Embodiment

Figure 5A:
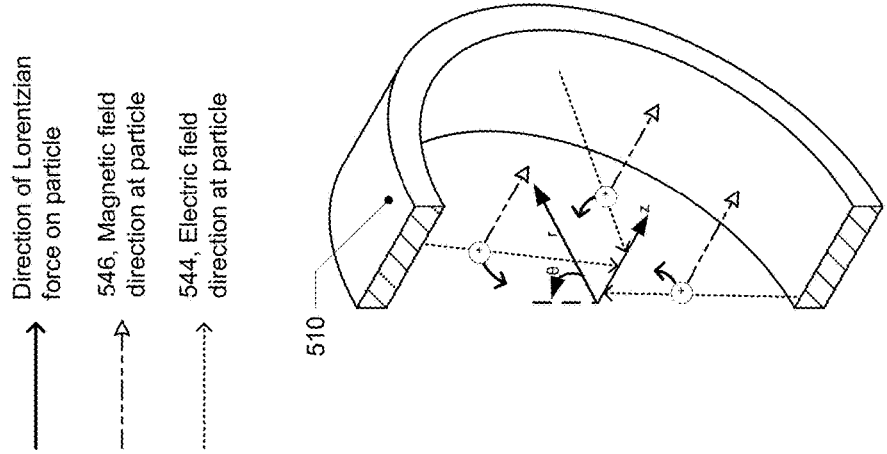
Figure 5B:
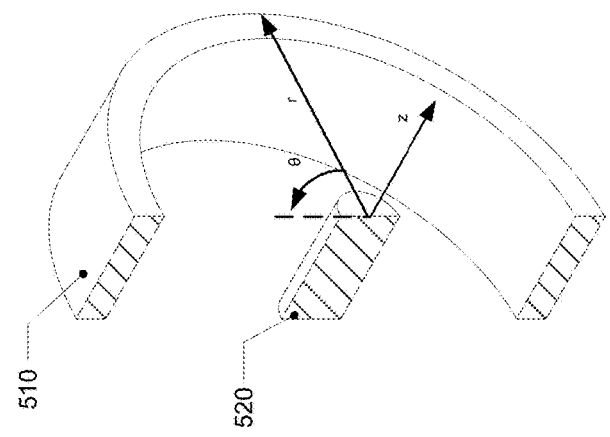

FIGS. 5a-d depict another embodiment in which a reactor may utilize a Lorentzian force to drive ions and neutrals, through ion-neutral coupling, into rotation. Reactors configured for reverse electrical polarity differ from the reactors depicted in FIGS. 1a-c in that the electric field, and the flow of current (by convention in the direction of positive charge movement), is substantially in the negative r-direction. FIG. 5a is a cross-section view of a reactor, while FIG. 5b provides an isometric cutout view of the same reactor along of section A-A from FIG. 5a. A reverse electrical polarity rotor has outer electrode 510 and concentric inner electrode 520 that is separated from the outer electrode by annular space 540, sometimes referred to herein as a confinement region. A radial electric field directed towards the inner electrode may be formed in the annular space by applying an electric potential to the inner electrode and/or the outer electrode. When a sufficient electric potential is applied between the electrodes, a portion of the gas in the annular space is ionized, and a radial plasma current across the annular space is generated.

Figure 5C:
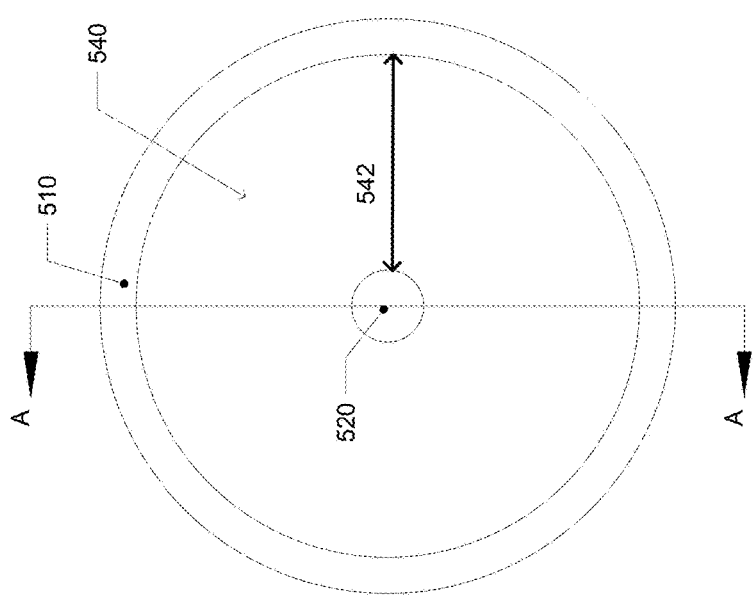

FIG. 5c depicts how the Lorentzian force is used to drive charged particles azimuthally within the reactor. In FIG. 5c, the inner electrode has been removed from view, and the depicted axis has been translated in the z-direction to improve clarity. While not shown, a magnet such as a permanent magnet or a superconducting magnet is used to generate an applied magnetic field that is substantially parallel to the z-axis (i.e., in a substantially axial direction) within the annular space. The magnetic field is substantially perpendicular to the direction of the electrical current causing the moving charged particles, charged species, and ions to experience a Lorentz force in the azimuthal (or $\Theta$) direction. For example, consider the case in which the inner electrode has an applied negative potential while the outer electrode is grounded (or held at a positive potential) producing an electric field in the negative r-direction (544). In this configuration, positively charged ions will move in the negative r-direction towards the inner electrode through the annular space 540. If a magnetic field concurrently points in the z-direction (546), the ions will experience a Lorentz force in the +$\Theta$ direction or counterclockwise direction as viewed from the perspective shown in FIGS. 5b and 5c. In some cases, the electric field and magnetic field may be at an angle that differs from the perpendicular yet is not parallel, such that perpendicular components, to a lesser or greater extent, are present in sufficient strength to create a sufficiently strong azimuthal Lorentz force. This azimuthal force acts on charged particles, charged species, and ions, which in turn couple with neutrals such that neutrals in the annular space are also made to move at high rotational velocity. The lack of any moving mechanical parts means that there is little limitation to the speed at which rotation can occur, thus providing rotation rates of neutrals and charged particles that are in excess of, for example, 100,000 RPS.

Reverse Fields Embodiment

Figure 6B:
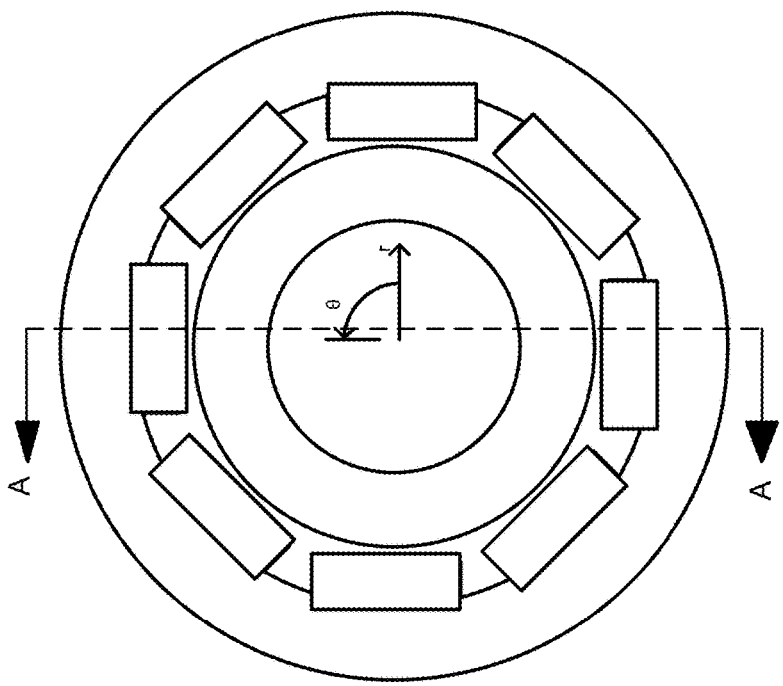
FIGS. 6a-f depict a hybrid reactor.
Figure 6A:
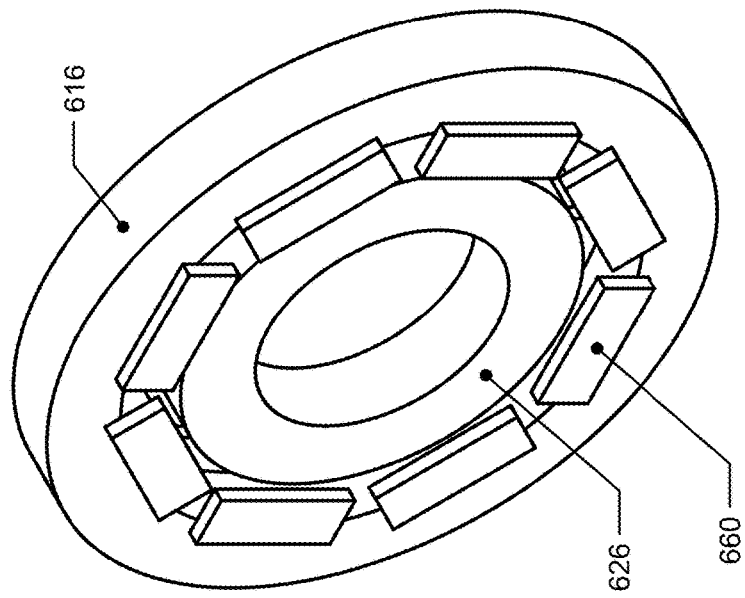
Figure 6D:
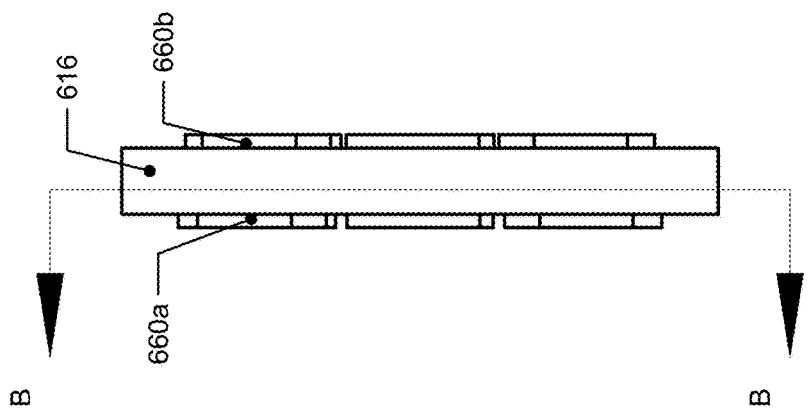
Figure 6C:
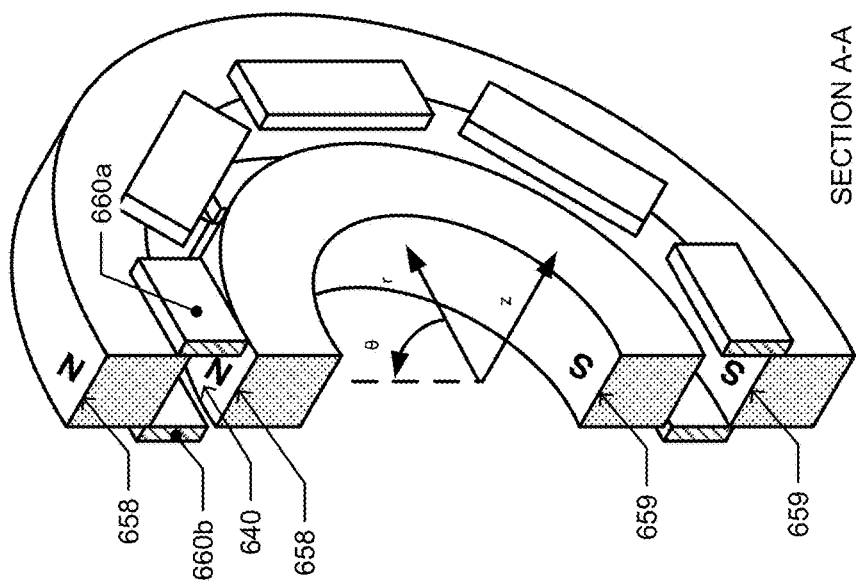

FIGS. 6a-d depict multiple views of another reactor embodiment that utilizes a Lorentzian force to drive ions and neutrals, through ion-neutral coupling, into rotation. The reactor of this embodiment operates using a reverse fields configuration. Reactors having this configuration differ from the reactors depicted in FIGS. 1a-c and FIGS. 5a-d in that the orientation of the electric field and the magnetic field within the confinement region are reversed. In this configuration, the magnetic field, instead of being substantially parallel to the z-axis, is directed radially in the positive or negative r-direction. Similarly, the electric field, rather than being directed radially, is substantially parallel to the z-axis. FIG. 6a is an isometric view of the reactor, FIG. 6b is a view of the reactor in the z-direction, FIG. 6c is an isometric section view of the reactor (corresponding to line A-A in FIG. 6b), and FIG. 6d provides a side view of the reactor. The depicted embodiment includes an inner ring magnet 626 and a concentric outer ring magnet 616 that also serves as the confining wall. The ring magnets have their poles oriented in the same direction, such that corresponding surfaces of the inner and outer ring magnets are the same. In this case, the exterior surface is a north pole 658, and the interior surface is a south pole 659. In some embodiments, there may be one or more additional layers of material on the interior surface of magnet 658 such that the confining surface material is different from the magnetic material. The region between concentric magnets forms the annular space 640 which is bound in the z-direction by electrodes on one end of the confinement region 660a and electrodes on the other end of the confinement region 660b. Generally, all the electrodes on either side of the confinement region (corresponding to electrodes 660a or to electrodes 660b) are given a similar electric potential. Unlike in the depicted hybrid reactor, electrodes 660a (or to electrodes 660b) may be a single contiguous electrode forming, for example, a ring or a disk shape. If electrodes 660a are grounded and electrodes on the other side of the annular space 660b are given a positive potential then an electric field is applied through the confinement region in the positive z-direction. If the magnetic field points in the r-direction (as depicted) the orthogonal electric and magnetic fields cause ions to rotate azimuthally in the $\Theta$ direction (see, e.g., FIG. 6c). Alternatively, if an electric field was pointed in the negative z-direction by applying a positive potential to electrodes 660a while grounding electrodes 660b, ions would rotate in the $-\Theta$ direction.

Wave-Particle Embodiments

Figure 7B:
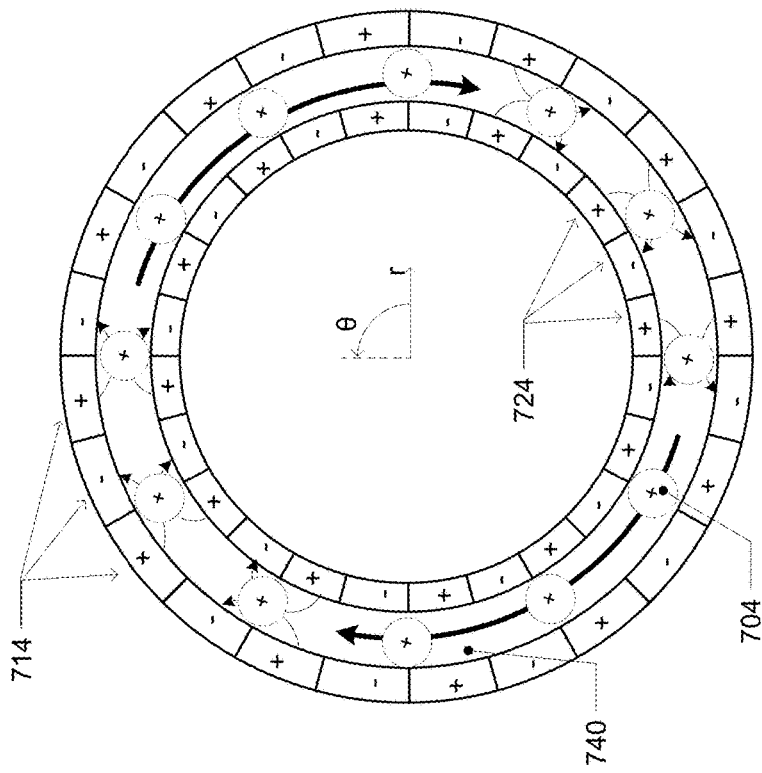
FIGS. 7a-b depict a wave-particle reactor.
Figure 7A:
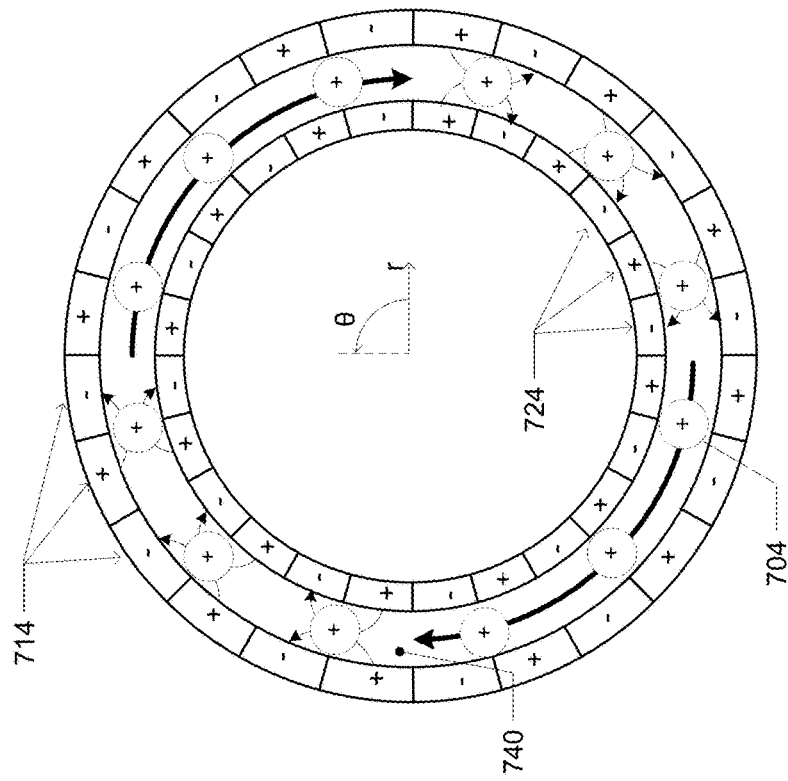

A second embodiment of a controlled fusion device is shown in FIGS. 7a and 7b in which ions rotate as a result of oscillating electrostatic fields. In this embodiment ions are accelerated azimuthally by electric fields produced from multiple discrete wall electrodes 714 located on, or forming, an outer ring, optionally in combination with interior electrodes 724 located on, or forming, an inner ring to generate localized, azimuthally-varying electric fields within an annular space 740. In some cases, the wall electrodes collectively form the confining wall, and in some cases, the wall electrodes may be disposed on or within a portion of a confining wall or scaffold. The electric field advances azimuthally in a controlled sequence such that the electrostatic force applied to ions proceeds sequentially in a substantially azimuthal direction (in the $\Theta$ or $-\Theta$ direction). In this way, charged species are accelerated akin to a Maglev train that is propelled by oscillating magnetic fields along a train track. An oscillatory potential may be applied to the electrodes. The oscillations may vary in phase or other parameter from one electrode to the next to induce or maintain rotational movement of ions.

Ions present in the annular space experience an electrostatic force as a result of electric fields, and only a relatively small number or percentage of ions are needed to drive large numbers or percentages of neutrals through the principle of ion-neutral coupling. Ions used to drive the neutrals into rotation may be generated by any suitable mechanism such as inductive or capacitive coupling. In some embodiments, ions are generated when an RF charge sequence is applied to the wall and/or interior electrodes. In some embodiments the wall and/or interior electrodes may first undergo an initial charge sequence to ionize some of the neutral gas in the annular space and then transition to a different charge sequence that drives the rotation of ions. For example, a charge profile used to ionize a gas might simply involve grounding the confining wall electrodes 714 while applying a high potential to the interior electrodes 724. In some embodiments, a gas that is already partially ionized may be introduced into the annular space 740.

While FIGS. 7a and 7b depict two binary charge profiles that may be used to drive ion rotation in the annular space, many alternative charge sequences are possible. In some charge sequences, an electrode may be, for instance, held at a ground potential for a duration of time or may have a charge sequence that is asymmetrical (e.g., a positive potential is held for twice the duration of a negative potential).

In certain embodiments, this system does not require a magnetic field such as an axial static magnetic field. FIG. 7a depicts an example of this embodiment taken at a first point in in time when the electrodes are provided with a first potential profile such that ions (e.g., a cloud or a grouping of ions) 704 experiences a force in the $-\Theta^{\wedge}$ direction. FIG. 7b depicts the embodiment of FIG. 7a at a later point in time when the electrodes are provided with a different potential profile such that ions 704 continue to experience an azimuthal force in the $-\Theta$ direction.

Hybrid Embodiments

Figure 6F:
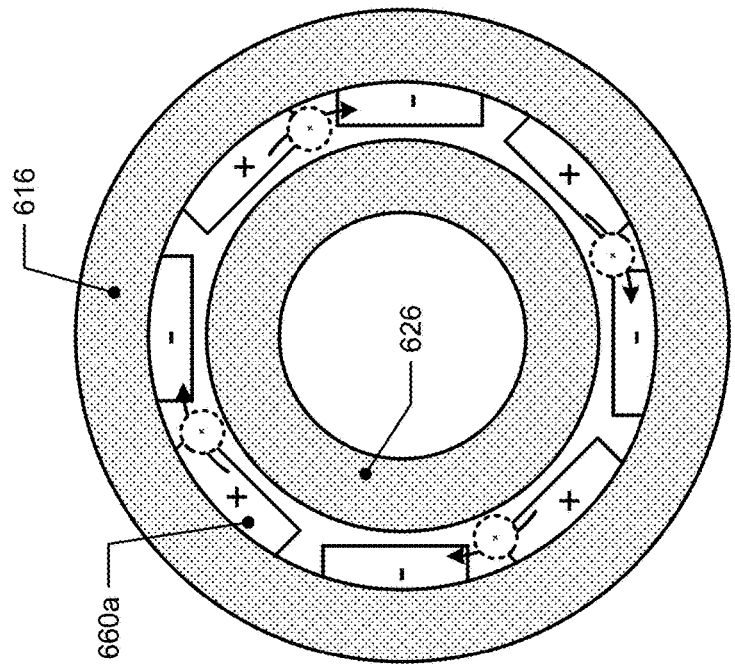
Figure 6E:
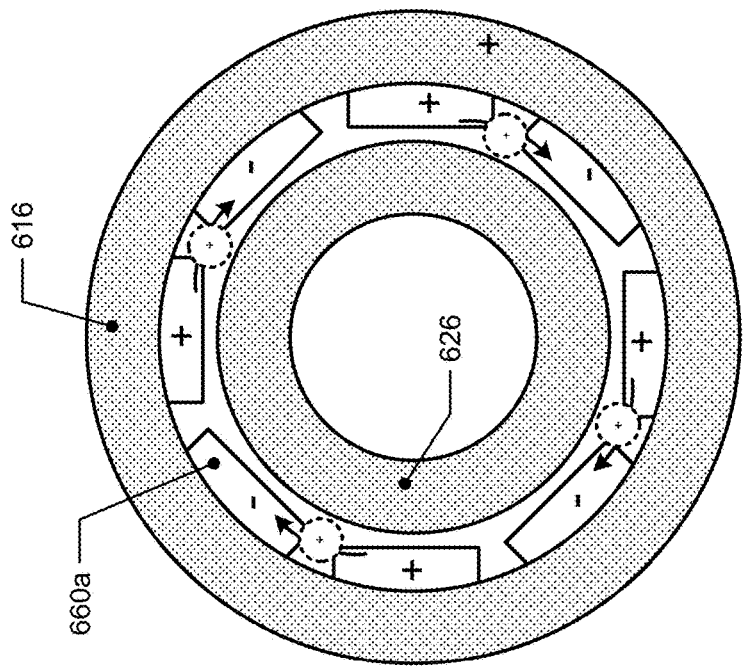

In certain embodiments a reactor includes features for producing both Lorentzian force and an oscillating electrostatic field to drive ions and neutrals, through ion-neutral coupling, into rotation. At any stage of operation, the reactor may use one or both of these mechanisms. FIGS. 6a-f depict an example reactor suitable for such operation. FIG. 6a is an isometric view of the reactor, FIG. 6b is a view of the reactor in the z-direction, FIG. 6c is an isometric section view of the reactor (corresponding to line A-A in FIG. 6b), FIG. 6d provides a side view of the reactor, and FIGS. 6e and 6f are section views (corresponding to line B-B in FIG. 6d) at different points in time. The depicted embodiment includes an inner ring magnet 626 and a concentric outer ring magnet 616 that also serves as the confining wall. The ring magnets have their poles oriented in the same direction, such that corresponding surfaces of the inner and outer ring magnets are the same. In this case, the exterior surface is a north pole 658, and the interior surface is a south pole 659. In some embodiments, there may be one or more additional layers of material on the interior surface of magnet 658 such that the confining surface material is different from the magnetic material. The region between concentric magnets forms the annular space 640 which is bound in the z-direction by one or more pairs of electrodes 660a and 660b. When electrode pairs 660a and 660b are given different potentials, an electric field substantially parallel to the z-direction is generated in the annular space, for example, by applying a positive potential to electrodes 660a while grounding electrodes 660b. When ions are generated in the annular space, the orthogonal electric and magnetic fields cause them to rotate azimuthally in the $-\Theta$ direction (see, e.g., FIG. 6c). If a positive potential were applied to electrodes 660b while electrodes 660a were grounded, ions would rotate in the $\Theta$ direction.

In some embodiments, as depicted in FIGS. 6a-e, a plurality of electrodes 660a and 660b are distributed radially along the annular space. In such cases, the reactor may be driven in a fashion similar to that of the reactor in FIGS. 7a and 7b. During operation, each electrode pair is driven with a substantially similar electric potential that differs from the potential of an adjacent electrode pair such that a localized electric field is generated in the $\Theta$ direction. As depicted in FIGS. 6d and 6e, the voltages applied to electrode pairs can be modulated in a controlled sequence so that the electrostatic force applied to ions presents a substantially continuous azimuthally (in the $\Theta$ or $-\Theta$ direction) varying component. In some configurations, a reactor may be configured to operate in a manner that initially drives ions and neutrals by a Lorentzian force and then transitions to driving ions and neutrals using the just described alternating electrostatic fields. 6.

Reactor Types (Sizes)

In one aspect, reactors may be classified into groups by the power output they provide. In this manner reactors of the present disclosure are, for purposes of this discussion, divided into small, medium and large scale reactors. Small scale reactors are typically capable of generating between about 1-10 kW of power. In some embodiments, these reactors are used for personal applications such as powering automobiles or providing power to a household. The next classification is medium scale reactors which typically deliver between about 10 kW-50 MW of power. Medium scale reactors may be used for larger applications such as server farms, and large vehicles such as trains, and submarines. Large scale reactors are reactors that are designed to output between about 50 MW-10 GW of power and may be used for large operations such as powering portions of a power grid and/or industrial power plants. While these three general classifications provide practical categories to which the present disclosure may relate, reactors disclosed herein are not tied to any of these categories.

The surface area (product of the perimeter and axial direction) of a shroud or confining wall typically limits the maximum power that may be generated by a reactor. A shroud having a large surface area supports fusion reactions over the large area of an interior surface (e.g., 122 in FIG. 1a). For small scale reactors, the radius of the interior surface of the shroud is typically about 1 centimeter to about 2 meters and the surface area of the interior surface is typically between about 5 cm$^3$ and 20 cm$^3$. For a medium scale reactor, the radius of the interior surface of the shroud is typically about 2 m to about 10 m and the surface area of the interior surface is typically between about 25 m$^3$ and 150 m$^3$. For a large scale reactor, the radius of the interior surface of the shroud is typically about 10 meters to about 50 meters and the surface area of the interior surface is typically between about 125 m$^3$ and 628 m$^3$. In some cases the radius of the interior surface may be on the order of kilometers, having a similar footprint to the Large Hadron Collider (LHC) run the CERN laboratory in Switzerland. Each of the above values assumes a single reactor that stands alone or is part of a contiguous stack of reactors (described below).

First Embodiment

FIGS. 1a-c depict the structure of a reactor having concentric electrodes that utilizes a Lorentzian rotor to drive charged particles and fusion reactants into rotation. This embodiment has an inner electrode 120, an outer electrode 110, and an annular space 140 between the two electrodes. During operation, an applied potential between these electrodes creates an electric field 144 that is substantially in the r-direction. While not shown, this embodiment also includes permanent magnets or an electromagnet (e.g., a superconducting magnet) that generates a magnetic field 146 in the z-direction between the inner and outer electrodes. As depicted in FIG. 1c, charged particles moving between the electrodes experience an azimuthally directed force, or a Lorentzian force, as a result of the radial electric field and the axial magnetic field.

As shown, the reactor depicted in FIG. 1a has a gap 142 that radially separates the outer surface of the inner electrode 112 and the interior surface of the outer electrode 122. While the surface areas of the facing surfaces of the inner and outer electrodes may dictate the scale of a reactor, the radial gap may remain relatively constant across a wide range of applications. In some cases, the upper limit of a gap may be limited by the power available to ionize gas in the annular space and generate a plasma current, while the lower limit of the gap may be limited to manufacturing tolerances. When a gap is very small, e.g. less than 0.1 mm, any misalignment between the electrodes may cause the electrodes to touch creating a short circuit. Of course, as manufacturing tolerances allow greater precision, smaller gaps may be feasible. In some embodiments, the gap may be between about 1 mm and about 50 cm, and in some embodiments, the gap may be between about 5 cm and about 20 cm. In some cases, the gap may vary along the r-direction and/or the z-direction of a reactor. For example, the radius of the inner electrode may vary as a function of position along the z-axis while the radius of the inner surface of the outer electrode is constant.

The length in the z-direction of the confining wall created by the outer electrode may be determined by the radial dimensions and the power generation requirements of the reactor. In some embodiments, the length of the outer electrode in the z-direction may be limited by the type and configuration of magnets used to create the magnetic field. For example, if permanent magnets are placed on either end of the annular space along the z-direction (as depicted in FIG. 11), the outer electrode may be limited to about 5 or about 10 cm in the z-direction. If, however, the magnetic field is generated using multiple permanent ring magnets, as shown in FIGS. 16 and 17, or an electromagnet or a superconducting magnet, as shown in FIG. 10, the length of the outer electrode in the z-direction may be much longer. For example, the outer electrode may be between about 1 meter and about 10 meters. Generally, the outer electrode 110 is of a similar length to the inner electrode 120, however, this need not always be the case. In some embodiments, the inner electrode may extend beyond the outer electrode in one or both directions. In some embodiments, the length of the outer electrode may exceed the length of the inner electrode such that the outer electrode extends beyond the inner electrode in one or both directions.

While FIGS. 1a-1b depict one configuration in which a solid, circular inner electrode is used in conjunction with circular outer electrodes, there are many permutations of electrode shapes that may be used in this configuration. Several non-limiting examples of alternate embodiments will be apparent to those of skill in the art and are discussed with reference to FIGS. 8a-b and FIGS. 9a-c. While several illustrative examples are provided, one can easily understand how many additional electrode shapes are feasible.

Figure 8B:
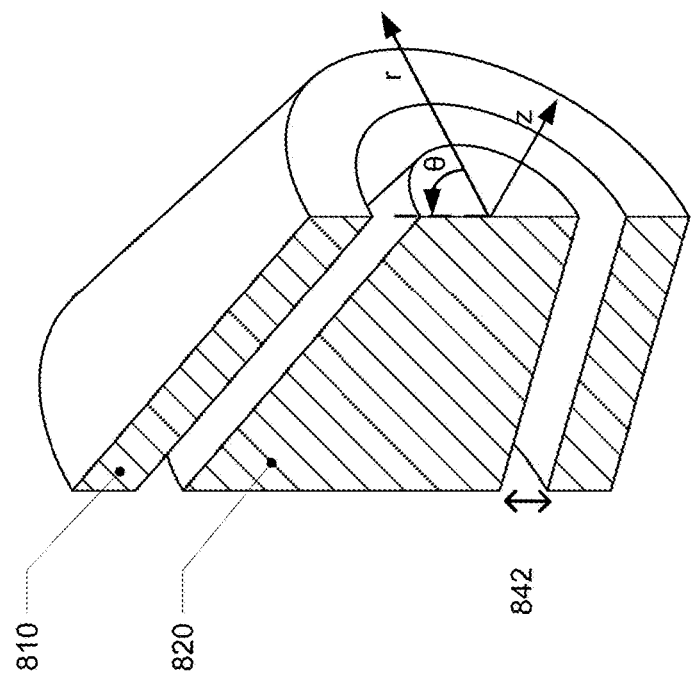
FIGS. 8a-b depict various electrode configurations of a first embodiment reactor.
Figure 8A:
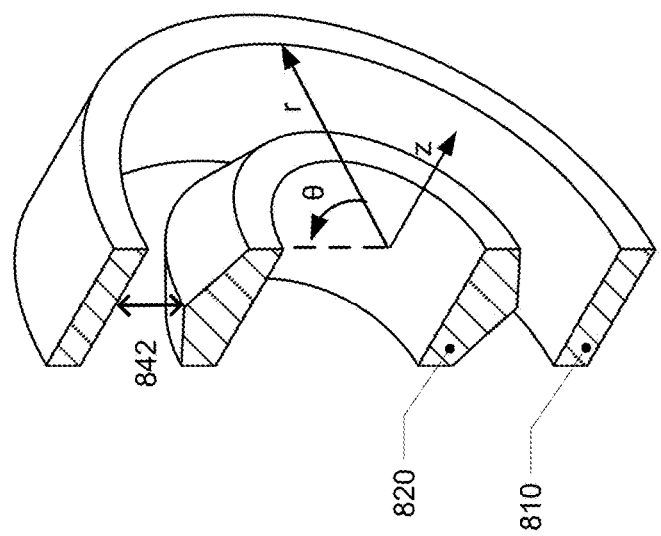

As depicted in FIG. 8a, in some embodiments the inner electrode 820 may be a ring-like structure that is not solid all the way through. Providing a cavity or an open space within the inner electrode may be useful for heat dissipation, the use of internal magnets such shown in FIGS. 17a-c, or the use of other components within the reactor. In some cases, the radius of the inner and outer electrodes may vary along the z-direction of a reactor. For example, as shown in FIG. 8a, an inner electrode 820 may have a larger circumference at some locations along the z-direction, reducing the gap 842 at those locations. Conversely, a uniform inner electrode may be used with an outer electrode having an inner radius that changes or even fluctuates along the z-direction. In some instances, such as the embodiment depicted in FIG. 8b, both the radius of the inner electrode 820 and the radius on the inner surface of the outer electrode 810 vary in the z-direction such that the gap 842 is maintained along the z-direction of the reactor.

Figure 9C:
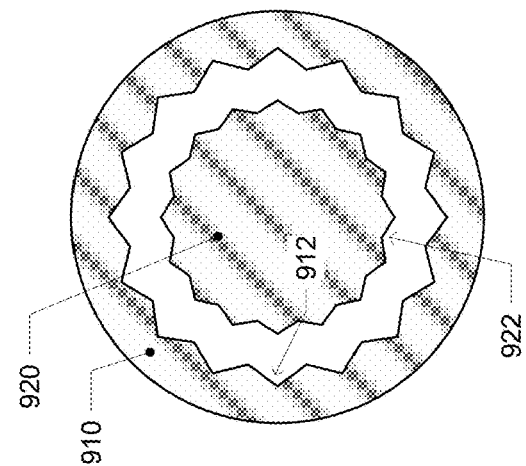
FIGS. 9a-c depict various cross sections of a first embodiment reactor.
Figure 9B:
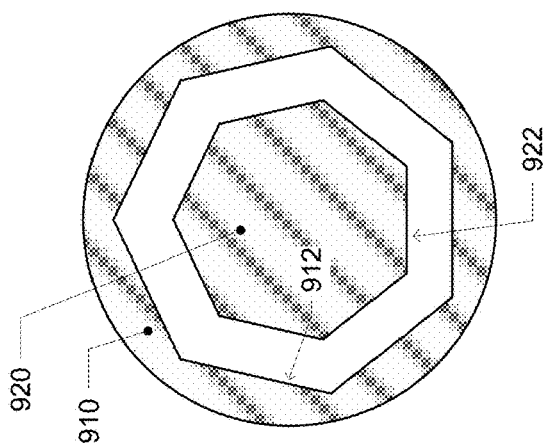
Figure 9A:
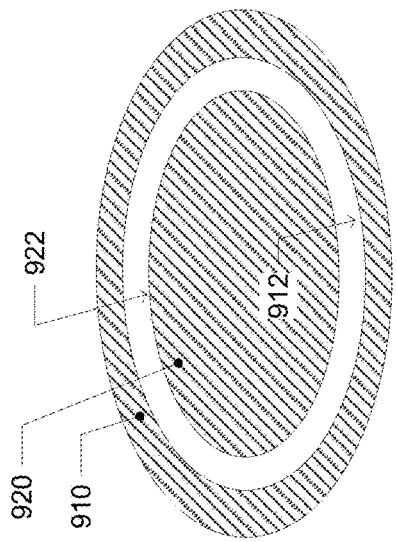

FIGS. 9a-c depict cross sections of reactors that have non-circular cross sections. As depicted, in some embodiments, the inner electrode 920, and the outer electrode 910 may have a radius that varies azimuthally, i.e., in the $\eta$ direction. In some cases, the surfaces of the inner and outer electrodes (912 and 922) may have an elliptical cross section as shown in FIG. 9a. In some cases, the major and minor axis of an ellipse-shaped cross section electrode may only be off by a small percentage, for example, less than 1%. In some embodiments surface 912 and/or 922 may form a polygonal cross section, such as the reactor shown in FIG. 9b having a cross section that forms a heptagon. In some embodiments surfaces 912 and 922 may have 4 or more sides; in some embodiments more than 8 sides, and in some embodiments more than 16 sides. Having corners on surface 912 may be advantageous in certain situations; for example, rotating particles may have an increased rate of collisions with target materials at corner locations resulting in an increased rate of fusion. In some embodiments, such as in the reactor configuration depicted in FIG. 9c, the radius of the inner or outer electrodes, defined by surfaces 912 and 922, may vary in the $\Theta$ direction such that the cross section of either surface has a patterned edge; e.g., an edge that is sinusoidal, saw-tooth shaped, or square-wave shaped. While the inner and outer electrodes in the depicted embodiments are co-axial, in some embodiments the axes of the inner and outer electrodes are offset, e.g., the annular space is eccentric, such that the inner and outer electrodes have z-direction axes that are substantially parallel but not collinear.

Materials for inner and outer electrodes may depend on the reactor size, selected fusion reactants, and other parameters that govern the operation of a fusion reactor. In general, there are many trade-offs such as ranges in cost, thermal properties, and electrical properties that determine which materials are selected for reactors. Refractory metals (e.g., tungsten and tantalum) may be chosen for small scale reactors because of their extremely high melting points and relatively high electrical conductivity at high temperatures; however using these materials in a large scale reactor may significantly increase the cost of a reactor.

In certain embodiments, the electrode materials have a sufficiently high melting temperature to withstand the thermal energy released during operation of the reactor. For the outer electrode, forming the confining wall on which fusion reactions may occur, the thermal energy release is often great. To withstand regular use, the material of the outer electrode should have a melting temperature that is in excess of temperatures reached by the electrodes during operation of the reactor. In some cases the material chosen for an electrode is greater than about 800° C., in some cases the melting temperature of an electrode is greater than about 1500 C, and in other cases the melting temperature is greater than about 2000° C.

In many embodiments, it is beneficial for the electrode material to have a high thermal conductivity. If heat can be extracted from an electrode (e.g., using a heat exchanger) at an equivalent rate to which heat is introduced to the electrode during steady state conditions, then a reactor may be suitable for continuous operation. When an electrode material has a high thermal conductivity, the rate at which heat be extracted may be improved and concerns of overheating are reduced. In some cases the thermal conductivity is greater than about $$10 \frac{W}{m°K},$$

in some cases the thermal conductivity is greater than about $$100 \frac{W}{m°K},$$

and in some cases the thermal conductivity is greater than about $$200 \frac{W}{m°K}.$$

In certain cases, such as when a reactor is configured for pulsed operation, it may be beneficial for the electrode material to have a high heat capacity. By having a high heat capacity, an electrode increases in temperature at a slower rate during operation of the reactor. When used in a pulsed operation, the generated thermal energy may continue to be dissipated through the electrodes between pulses, preventing the electrodes from reaching their melting temperature. In some cases the specific heat of the electrode should be higher than about 0.25 J/g/° C., in some cases, the specific heat should be greater than about 0.37 J/g/° C., in other cases, the specific heat should be higher than about 0.45 J/g/° C.

In certain embodiments, the electrode material has a relatively small coefficient of thermal expansion. In some cases, by having a low coefficient of thermal expansion a reactor may have improved performance over a greater range of temperatures. For example, if a reactor has a gap that is about 1 millimeter at room temperature, the gap may be proportionally much smaller during steady state operation due to the expansion of the inner and/or outer electrodes. If a thermal coefficient is too high, the outer and inner electrodes may touch causing a short circuit. Alternatively, if a reactor is designed to have a certain gap at operating temperatures, the gap may be larger than desired when a reactor is first turned on. In some cases the linear coefficient of thermal expansion of an electrode material is less than about $4.3 \times 10^{-6 \circ}$ C.$^{-1}$, in some cases the linear coefficient of thermal expansion of an electrode material is less than about $6.5 \times 10^{\circ}$ C.$^{-1}$, and in other cases the linear coefficient of thermal expansion of an electrode material is less than about $17.3 \times 10^{-6 \circ}$ C.$^{-1}$.

To facilitate reactor operation, the electrodes may be designed to have mechanical properties such as resistance to degradation during thermal cycling. Under certain conditions, some materials, e.g. stainless steels, become brittle and eventually experience fatigue as a result of thermal cycling. If a reactor operates in pulsed operation and an electrode is rapidly heated and cooled, internal stress may develop. In some cases, the effects of thermal loading cycles may be reduced by using an electrode having a single bulk material, or by using two or more materials having similar coefficients of expansion. Certain materials may experience deformation due to creep at high temperatures. Thus electrode materials may be chosen to maintain their strength at elevated temperatures.

Electrode materials may be chemically inert and not significantly affected by oxidation, corrosion, or other chemical degradation over the lifetime of a reactor. Another consideration for electrode materials is whether or not they are ferromagnetic. In some cases, if ferromagnetic materials are used, internal localized magnetic fields are created that may interfere with establishment or maintenance of the intended magnetic field within the annular space.

In a Lorentzian driven reactor having concentric electrodes, the inner and outer electrodes may be made from a material that is sufficiently conductive such that, during operation, an electric potential is evenly applied over the surfaces of the electrodes. In certain embodiments, at room temperature, the resistivity of the inner or outer electrode material is less than about $7 \times 10^{-7}$ Ωm, and in some cases less than about $1.68 \times 10^{-8}$ Ωm. In addition to being conductive at room temperate, when a reactor is not in operation, the inner and outer electrodes may be conductive at higher operating temperatures. During operation the inner or outer electrode may reach temperatures of between about 600° C. to about 2000° C. During operation, the resistivity of the outer electrode material should be no greater than about 1.7E-8 Ωm, and in some cases no greater than about 1E-6 Ωm.

In cases where reactants or by-products include hydrogen or helium, consideration may be given to a material's resistance to hydrogen embrittlement. Hydrogen embrittlement is a process by which metals such as stainless steel become brittle and in some cases fracture due to the introduction and subsequent diffusion of hydrogen atoms or molecules into the metal. Since the solubility of hydrogen increases at higher temperatures, the diffusion of hydrogen into the electrode material may increase during operation of the reactor. When assisted by a concentration gradient in which there is significantly more hydrogen outside the metal than inside, e.g., caused by the centrifugal densification of hydrogen atoms that impinge on the confining wall, the diffusion rates may be increased further. Individual hydrogen atoms within the metal gradually recombine to form hydrogen molecules, creating an internal pressure in the metal. Additionally, or alternatively, entrained hydrogen molecules themselves create internal pressure. This pressure can increase to levels where the metal has reduced ductility, toughness, and tensile strength, up to the point where cracks form and the electrode fails. In some cases, in which a metal contains carbon (e.g. carbonized steel) an electrode may be susceptible to a process known as hydrogen attack in which hydrogen atoms diffuse into the into the steel and recombine with carbon to form methane gas. As methane gas collects within the metal, it generates internal pressure that may lead to mechanical failure of the device. While methods for reducing the effects of the hydrogen embrittlement are described elsewhere herein, in general, a material's susceptibility to embrittlement is considered when designing electrodes. In some cases, electrodes may include platinum, platinum alloys, and ceramics such as boron nitride, each of which resist hydrogen embrittlement. In some cases, the metallurgical structure may be modified so that the effect of hydrogen in the lattice of a metal is less detrimental. For example, in some cases a metal or metal alloy may undergo a heat treatment to achieve a desired metallurgical structure.

In various embodiments, the inner and outer electrodes are primarily constructed of metals and metal alloys. In some embodiments, the inner and/or outer electrode is made at least in part from a refractory metal having a high melting temperature. Refractory metals are known for being chemically inert, suitable for fabrication using powder metallurgy, and are stable against creep at very high temperatures. Examples of suitable refractory metals include niobium, molybdenum, tantalum, tungsten, rhenium, titanium, vanadium, chromium, zirconium, hafnium, ruthenium, rhodium, osmium and iridium. In one example, at least the outer electrode includes tantalum.

In some embodiments, one or both electrodes are made using stainless steel. Benefits of stainless steel include its machinability and resistance to corrosion. In some cases, electrodes are made at least in part from a non-carbon based stainless steel, such as Incoloy, which may be more resistant than carbonized stainless steels to hydrogen embrittlement. In some cases, an electrode may be made at least in part of a nickel alloy that maintains its strength at very high temperatures such as Inconel, Monel, Hastelloys, and Nimonic. In some cases, electrodes are made at least in part from copper or a copper alloy. In some cases, an electrode is configured with one or more channels for internal cooling to extract heat, such that materials with lower resistance to extreme temperatures may be used.

While absorption of a small atom fusion reactant such as hydrogen, deuterium, or helium may lead to a mechanical failure of an electrode, under some operating conditions, deleterious embrittlement effects may be reduced or eliminated for certain materials. For example, under some conditions hydrogen absorbing materials such as palladium-silver alloys appear to be impervious to hydrogen embrittlement (Jimenez, Gilberto, et al. "A comparative assessment of hydrogen embrittlement: palladium and palladium-silver (25 weight % silver) subjected to hydrogen absorption/desorption cycling" (2016), which is incorporated herein by reference in its entirety). In such cases, absorption of a fusion reactant may increase the rate of a fusion reaction, for example, a rotating gas reactant such as hydrogen may collide with a fixed hydrogen atom fixed on the outer electrode (or the confining wall). In some cases, reactants are provided to the reactor by diffusing reactants through the inner and/or the outer electrode. In some cases, an electrode may include titanium, palladium, or a palladium alloy for the purpose of delivering fusion reactants or increasing the rate of collisions between fusion reactants.

In some cases, as discussed elsewhere herein, an outer or inner electrode may include an electron emitting material having a high electron emissivity. In some cases, an outer electrode may include a target material that includes a fusion reactant. In some cases, the target material is consumed during operation as a result of a fusion reaction. For example, in some cases, lanthanum hexaboride is used as a target material, and boron-11 atoms are consumed during a proton-boron reaction.

First Embodiment—Electrodes

In some embodiments the outer electrode is monolithic, being made from a single material, and in other embodiments, the outer electrode has a layered or segmented structure including two or more materials. In some embodiments, the interior surface of the outer electrode, the confining wall, includes a target material (a material containing a fusion reactant), or an electron emitting material. In some cases, a target material or an electron emitter may cover the entire surface area of the confinement wall, and in some cases, a target material or electron emitter is located at one or more discrete locations along the confinement wall (e.g., as depicted by the electron emitters in FIGS. 21a-b).

In some cases, an inner layer of the outer electrode provides one property while a more exterior layer provides a different property. For example, an interior layer that forms the surface of the confinement wall may have a high melting temperature, while an exterior layer may have a superior thermal conductivity or electrical conductivity.

In some cases, an electrode may include a layer of material forming the confinement wall that has a higher resistance to hydrogen embrittlement than the rest of the electrode. In some cases, an electrode includes a ceramic coating that can prevent hydrogen atoms from penetrating into the lattice of the outer electrode or provide thermal insulation of the bulk electrode material. In some embodiments, an outer electrode may have a layer of aluminum nitride, aluminum oxide, or boron nitride. Some materials that have a low electrical conductivity at room temperature (e.g. boron nitride) may be heat treated to improve their electrical conductivity. In some cases, an electrode may undergo a surface treatment that adds material to the electrode surface and reduces hydrogen embrittlement. For example, when an electrode is made out of a material that is susceptible to hydrogen embrittlement (e.g., tantalum), embrittlement may be reduced by adding minor amounts of a noble metal to the electrode surface. In some cases, the noble metal may only cover a small portion of the electrode surface. For example, the noble metal may cover less than about 50%, less than about 30%, or less than 10% of the electrode surface while providing a significant reduction of hydrogen embrittlement to the electrode. In some cases, small amounts of platinum, palladium, gold, iridium, rhodium, osmium, rhenium, and ruthenium may be added to an electrode surface to reduce hydrogen embrittlement. In some cases, small spots (e.g., about 0.5 inches in diameter) of noble metal may be riveted or welded to the electrode surface. In some cases, a noble metal powder may be added to a reactor, and during normal operation, the powder is sputtered onto the electrode surface. In some cases, a nobel metal may be periodically added to the surfaces of electrodes, e.g., after reactor has operated for a predetermined amount of time.

In some cases, a sleeve is attached to the interior surface of the outer electrode, such that the interior surface of the sleeve forms the confinement wall. In some cases, a sleeve may be used to, e.g., provide a target material, provide an electron emitter, provide a barrier for hydrogen penetration into the outer electrode, and/or provide thermal protection to the outer electrode. In some cases, a sleeve is consumable and/or replaceable. For example, if the sleeve contains a target material that is consumed, the sleeve may eventually be replaced. In other cases, a sleeve acts as a sacrificial layer that protects the outer electrode from hydrogen embrittlement. In situations where the sleeve itself fails due to hydrogen embrittlement, it may be replaced at a much lower cost than the entire outer electrode.

In some embodiments, the outer electrode may have a porous or mesh-like structure that allows high energy charged particles to pass through the electrode while still confining rotating neutrals within the annular space. Charged particles that pass through the outer electrode may be guided by magnetic fields of an exterior magnet. In some cases, escaping alpha particles are redirected towards hardware (discussed elsewhere herein) capable of converting the kinetic energy of alpha particles into electrical energy. In some cases, the pore size in and our electrode may be less than about 100 microns, in some cases, and in some cases, less than about 1 micron. In general, the construction of the inner electrode may be similar to that of the outer electrode. As with the outer electrode, the inner electrode may be made of a single material, or it may have a layered or segmented structure being made of two or more materials. In some embodiments, the inner electrode may be a solid body, and in other embodiments, the inner electrode has an interior space. In some cases, the inner electrode may include one or more pathways for internal cooling. In various embodiments, the inner electrode is connected to a power supply that provides a current that passes from the inner electrode out to a grounded outer electrode. Materials for the outer electrode are generally also suitable for the inner electrode, although, in certain embodiments, an inner electrode does not include target materials or electron emitting materials.

First Embodiment—Magnets

Figure 10C:
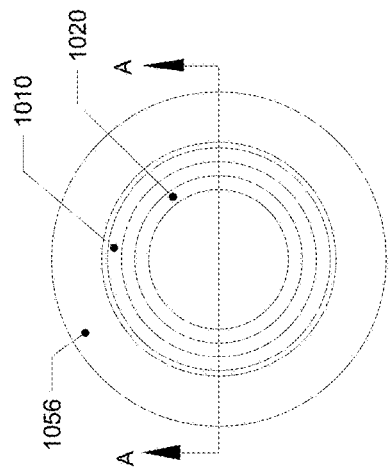
FIGS. 10a-d depict a first embodiment reactor in which an axial magnetic field is applied by a superconducting magnet.
Figure 10D:
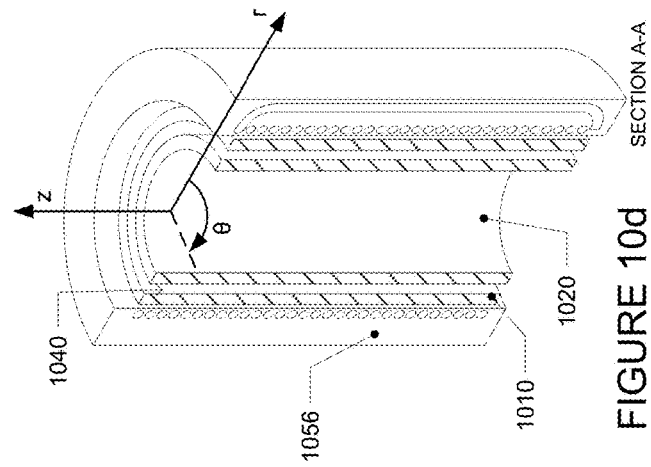
Figure 10A:
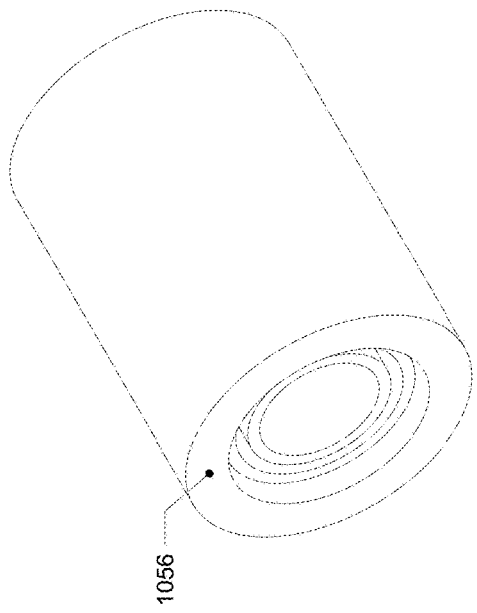
Figure 10B:
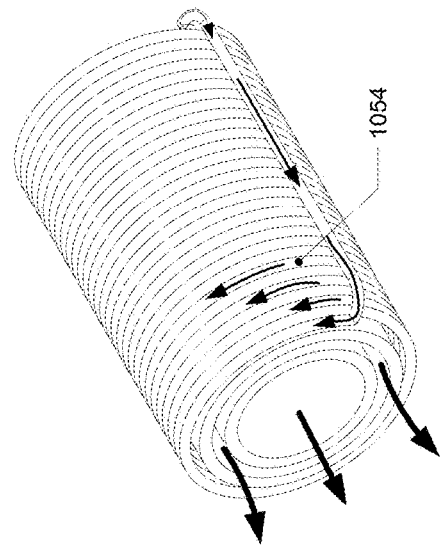

FIGS. 10a-d depict a first embodiment in which an axial magnetic field is applied by an electromagnet such as a superconducting magnet. FIG. 10a shows an isometric view of a superconducting magnet that surrounds the outer electrode of the reactor. As depicted, the magnet includes an enclosure 1056. FIG. 10b provides the same perspective as FIG. 10a, with the enclosure 1056 of the superconducting magnet removed revealing the superconductive coil windings 1054. FIG. 10c provides a perspective of the reactor as viewed along the z-axis and FIG. 10d is an isometric section view corresponding to the section lines, A-A, shown in FIG. 10c. As shown, the reactor has outer electrode 1010, inner electrode 1020, and a gap 10 that defines the annular space 1040 between the two electrodes. An electrical current (as depicted by arrows in FIG. 10a) passes through superconductive coil windings 1054 that wrap around the reactor, creating an applied magnetic field that is substantially in the z-direction through the annular space. In some embodiment, a superconducting magnet is used to generate an applied magnetic field that passes through the annular space that is between about 1-20 Tesla. In some cases, the applied magnetic field is between 1-5 Tesla. Coil windings are placed in an insulated enclosure 1056 positioned around the reactor that is kept at low-temperature (e.g., less than −180° C.) and low-pressure. The enclosure 1056 may be cooled by, for example, adiabatic expansion of gas (e.g., He), or a cryogenic liquid such that the temperature of the superconductive coil is kept below its critical temperature. In some cases, the enclosure may be cooled mechanically, avoiding any need for liquid cryogens. The coil windings may be made from superconducting materials such as niobium-titanium, or niobium-tin, Bismuth strontium calcium copper oxide (BSCC), or Yttrium barium copper oxide (YBCO). Coil windings may take the form of a wire or a tape that may be wrapped in an insulating material. In some cases, the coil windings include any of the aforementioned superconducting materials placed in a copper matrix to provide mechanical stability. In some embodiments, commercially sold superconducting magnets may be from vendors such as Cryomagnetics, Inc., or manufacturers of Magnetic Resonance Imaging devices. In some cases, a superconducting magnet such as or similar to the AMS-02 superconducting magnet used for the Alpha Magnetic Spectrometer Experiment may be used. When a superconducting magnet is used to provide the axial magnetic field, the radius of the confining wall is typically smaller than the radius of the superconducting magnet, for example, in some cases, the radius may be limited to about 20 meters.

When an electromagnet or superconducting magnet is placed around the outer electrode, there may be spacing between the outer electrode 1010 and the enclosure of the magnet 1056. This spacing may be used reduce heat transfer to the magnet. In some cases, a heat exchanger may be placed between the outer electrode 1010 and a magnetic enclosure. When the outer electrode has a porous or mesh-like structure, there may be a spacing between the outer electrode and the enclosure of a magnet that allows for charged particles that pass through the outer electrode. Charged particles, e.g., alpha particles, passing through the outer electrode may be constrained in the r-direction by ion cyclotron motion so that they do not collide with the enclosure 1056. In some cases, the spacing between the outer electrodes is between about 3 cm to about 6 cm, and in some cases, between about 6 cm and about 10 cm. Charged particles may then travel in the z-direction towards energy conversion means for generating electrical energy as described elsewhere herein. FIGS. 11a-b depict a reactor in which permanent disk-shaped magnets 1150 are placed on either end of the annular space 1140 to generate an applied magnetic field that is substantially axially directed, i.e., it points in the z-direction. FIG. 11a provides a perspective viewed along the z-direction, while FIG. 11b provides an isometric section view that corresponds to the indicated section lines in FIG. 11a. As depicted in FIG. 11b, the reactor has an inner electrode 1120, an outer electrode 1110 forming the confinement wall 1112, and an annular space between the inner and outer electrodes. Magnets 1150 are placed on either side of the annular space and have the same magnetic orientation. For example, both magnets may have a north pole facing in the positive z-direction, or both magnets may have a north pole facing in the negative z-direction. While not depicted, in some embodiments the magnets 1150 may be ring-shaped such that the magnet is in proximity to the annular space 1140 and provides a substantially uniform magnetic region along the inner surface of the outer electrode 1112. The ring-shaped magnets have the same pole orientation as the disk-shaped magnets depicted in FIG. 11.

Figure 12B:
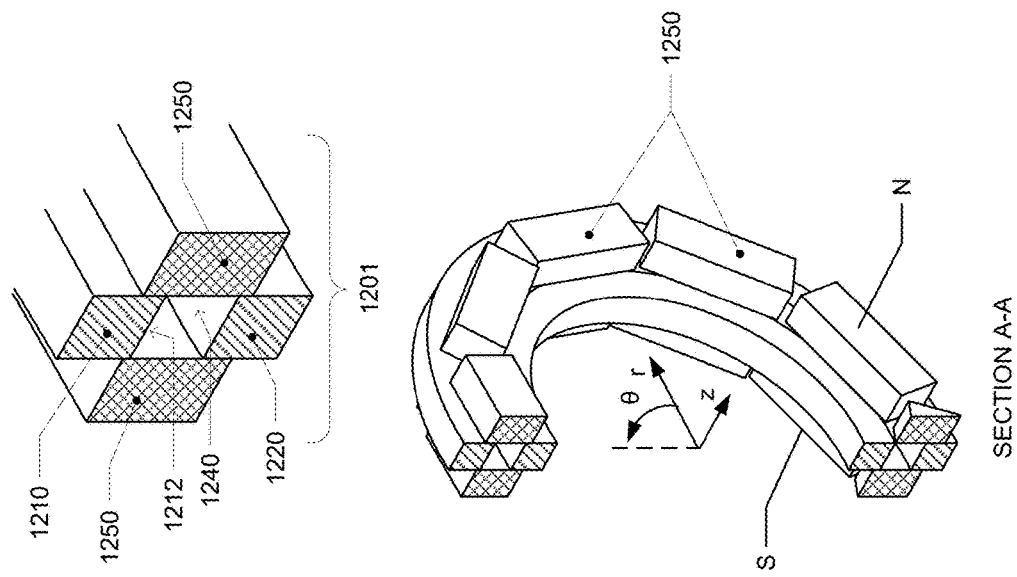
FIGS. 12a-b depict a first embodiment reactor in which the applied magnetic field in the confinement region is applied using permanent magnets.
Figure 12A:
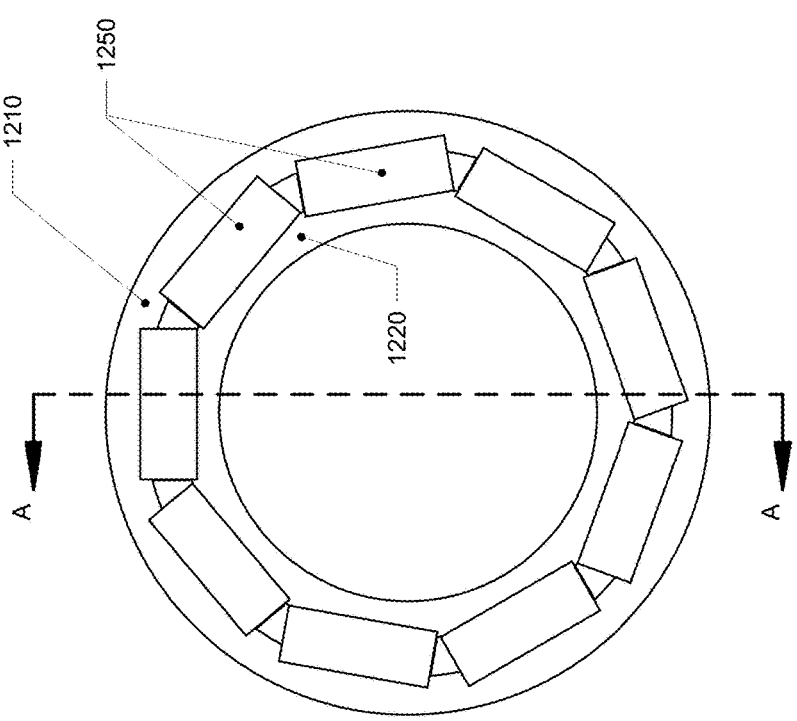

FIGS. 12a-b depict another embodiment in which a plurality permanent magnets 1250 having the same polarity in the z-direction (e.g., the same orientation as the disk-shaped magnets depicted in FIG. 11), are placed on either side of the annular space 1240 to generate an applied magnetic field in the z-direction along the inner surface of the outer electrode 1212. FIG. 12a provides a perspective in the z-direction, while FIG. 12b provides an isometric section view that corresponds to the indicated section lines, A-A, in FIG. 12a. Some features are labeled in an enlarged view 1201, which depicts how the annular space is bound by the inner electrode 1220, the outer electrode 1210, and permanent magnets 1250. Using a plurality of smaller magnets may be useful to reduce costs and physical constraints associated with larger monolithic magnets for large-scale reactors. The arrangement of magnets 1250 shown in FIGS. 12a and 12b may be viewed as effectively creating two facing ring magnets. While not shown, in some embodiments a combination of different magnet shapes is used to generate the axial magnetic field. For example, a ring magnet may be used on one side of the annular space while a plurality of bar magnets may be used on the other.

FIGS. 13a-c depict an embodiment in which a reactor 1300 with a single inner electrode 1320 has multiple annular spaces 1340 separated by permanent magnets 1350 that are arrayed along the z-direction. As depicted, the reactor has inner electrode 1320, a plurality of outer electrodes 1310 that form the confinement wall 1312, which is a combination of wall segments, and an annular space 1340 between each outer electrode and the inner electrode. FIG. 13a provides a perspective viewed along the z-direction, while FIGS. 13b and 13c provide a section view and an isometric section view, respectively, that correspond to the indicated section lines in FIG. 13a. When permanent magnets are placed on either end of the annular space, the length of the annular space in the z-direction may be limited by the strength of the magnetic field that can be generated by permanent magnets. In some cases, the annular space may be limited to, for example, about 5 or 10 cm. By arraying magnets 1350 in the z-direction between a plurality of annular spaces 1340, the total surface area on the confinement wall 1312 of the outer electrode 1310 may be increased. As with previous embodiments, each magnet 1350 has the same orientation along the z-axis. This design efficiently uses the permanent magnets between the annular spaces, as each magnetic pole contributes to shaping the magnetic field that is applied to a bordering annular space. While the depicted embodiment is shown using ring-shaped magnets, many other shapes may be used; for example, each magnet bordering an annular space may be made of many smaller magnets that collectively form a ring-like structure (see FIGS. 12a-b). In some embodiments, the outer electrode 1310 may be segmented into physically distinct parts that are electrically isolated. In some embodiments, the outer electrode may be monolithic or otherwise electrically connected, for example, such that each outer electrode segment corresponding to each annular space 1340 is grounded.

Figure 14A:
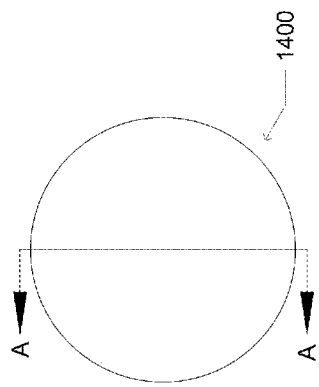
FIGS. 14a-c depict a configuration of a first embodiment reactor.
Figure 14C:
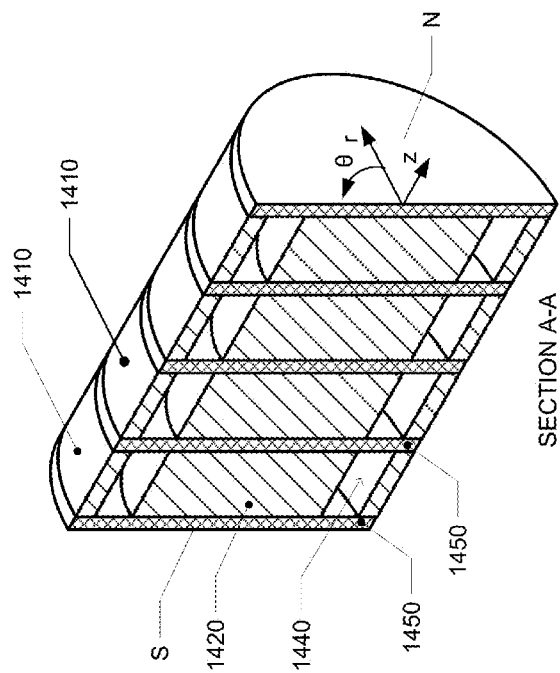
Figure 14B:
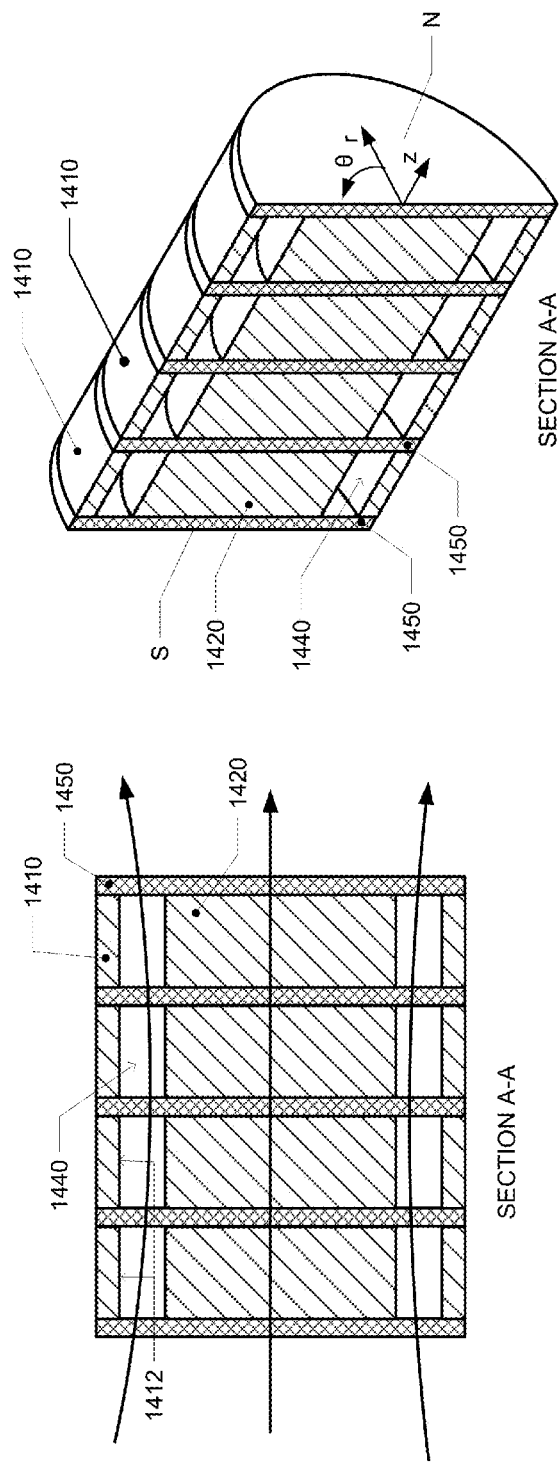

FIGS. 14a-c depict an embodiment in which a single reactor structure 1400 has multiple annular spaces 1440 separated by permanent magnets 1450 that are arrayed along the z-direction. As depicted, the reactor has a plurality of inner electrodes 1420 and a plurality of outer electrodes 1410 forming the confinement wall 1412 for the annular space 1440 between each set of electrodes. FIG. 14a provides a perspective in the z-direction, while FIGS. 14b and 14c provide a section view and an isometric section view that correspond to the indicated section lines in FIG. 14a. Rather than employing ring-shaped magnets and a single inner electrode, as depicted in the embodiments of FIGS. 13a-c, the embodiments of FIGS. 14a-c employ disc-shaped magnets and multiple inner electrode segments. The description of corresponding features from FIGS. 13a-c pertains to the embodiment of FIG. 14a-c. In some embodiments, a reactor as shown may operate using only a subset of the available annular spaces depending on energy demands. For example, in some embodiments fusion reactants are only introduced into one annular space and a voltage potential is only applied to the inner electrode adjacent to that annular space. In this manner, the energy output of a reactor may be controlled to meet energy demands, even in real time if necessary. Therefore, in some embodiments, individual inner electrodes 1420 and/or outer electrodes 1410 are independently controllable.

FIGS. 15a-15c illustrate the magnetic field generated by a series of ring that magnets 1550 are that substantially coaxial and have the same orientation. FIG. 15a is an isometric view of three magnets, FIG. 15b depicts a view along the magnet's shared axis, and FIG. 15c is a section view corresponding to the line A-A in FIG. 15b. While previous embodiments have made use of magnets that are offset from the annular space in the z-direction, magnets may also be offset from the annular space radially in r-direction. As illustrated by the dashed lines in FIG. 15c, each ring magnet, when considered individually, generates a magnetic field 1545 originating at its north pole and ending at its south pole. When multiple ring magnets are placed next to each other, the net effect can be a combined magnetic field that is a superposition of the individual magnet fields and substantially pointed along the shared axis as indicated by the solid magnetic field lines 1546. This magnet configuration may be used to extend the feasible length of an annular space of a reactor while using permanent magnets.

FIGS. 16a-16c illustrate an embodiment using radially offset ring magnets 1650 to generate an axial magnetic field through the annular space. As depicted, the reactor has a single inner electrode 1620 and a single outer electrode 1610 that forms the confinement wall 1612 for the annular space 1640 between the electrodes. FIG. 16a provides a perspective of the reactor as viewed along the z-direction, while FIGS. 16b and 16c provide a section view and an isometric section view that correspond to the indicated section line in FIG. 16a. Each of the magnets 1650 has the same polarity along the z-direction. For example, as depicted, each of the magnets 1650 has its south pole facing in the positive z-direction. This embodiment allows for an extended annular space in the z-direction, creating a larger surface area on the confining wall 1610 and allowing for a greater power output potential. Overlapping features from corresponding embodiments of FIGS. 13 and 14 may apply to the embodiments of FIGS. 16a-c.

Figure 17A:
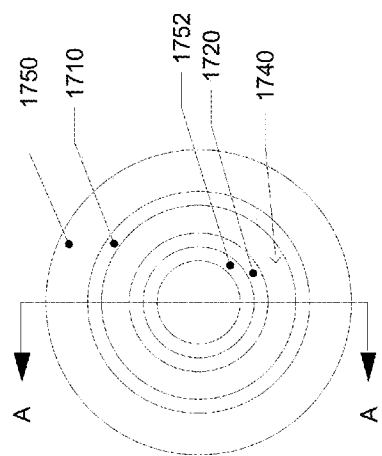
FIGS. 17a-c depict a first embodiment reactor in which the applied magnetic field in the confinement region is applied using radially offset magnets.
Figure 17C:
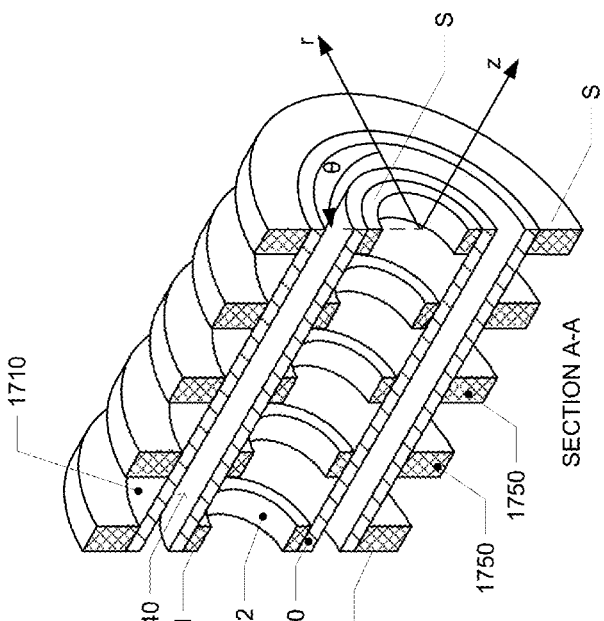
Figure 17B:
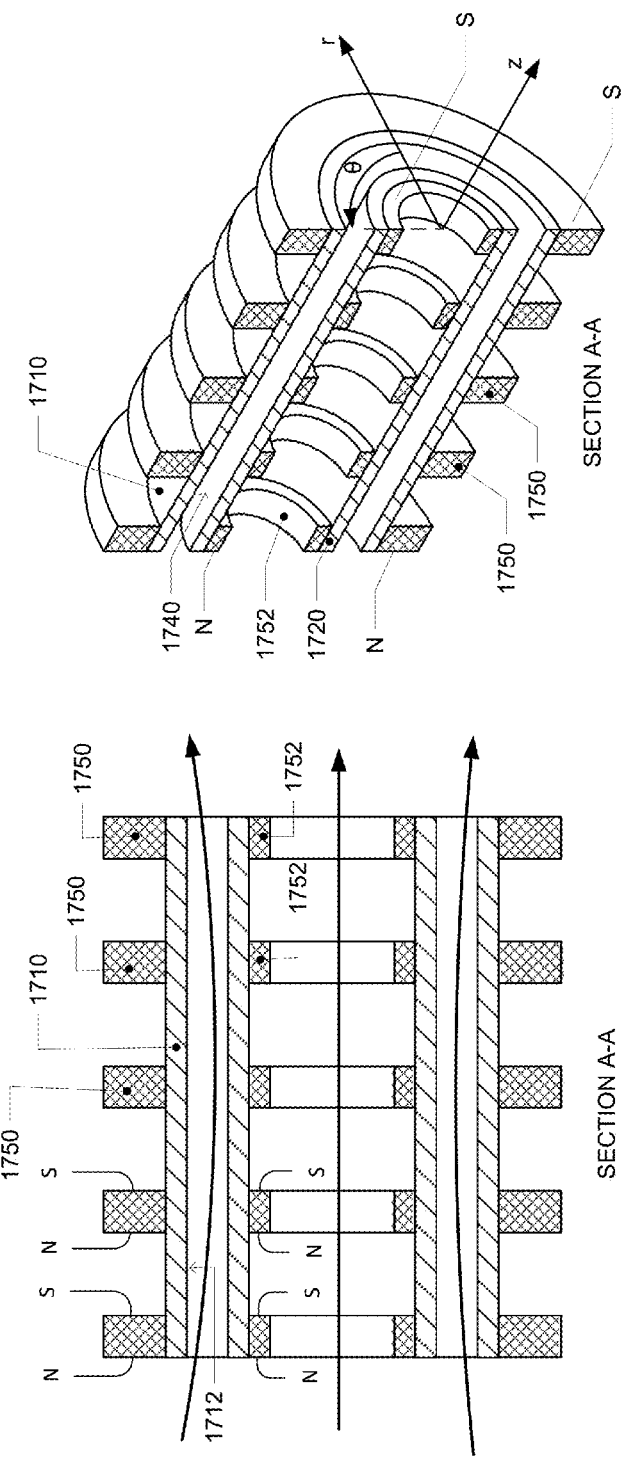

FIGS. 17a-17c illustrate an embodiment using radially offset magnets (1750, 1752) to generate an axial magnetic field through a single annular space. As depicted, the reactor has a single inner electrode 1720 and a single outer electrode 1710 that forms the confinement wall 1712 for the single annular space 1740 between the electrodes. FIG. 17a provides a perspective of the reactor as viewed in the z-direction, while FIGS. 17b and 17c provide a section view and an isometric section view that correspond to the indicated section line in FIG. 17a. The embodiment of FIGS. 17a-c goes beyond the embodiment described with relation to FIGS. 16a-c in that additional magnets 1752 are placed in the interior region of the inner electrode 1620. As depicted, the additional magnets 1752 have the same orientation along the z-direction as the exterior magnets 1750. In some embodiments, as depicted in FIGS. 17b and 17c, the inner ring magnets 1752 are aligned with the outer ring magnets 1750 in the z-direction. In some embodiments, the inner ring magnets may be offset from the outer ring magnets, or the spacing between magnets may differ from the spacing of the outer magnets. In some embodiments, the interior magnets may take a different shape than the exterior magnets, e.g. the interior magnets may be bar magnets.

In some embodiments, permanent magnets are made from rare earth elements or alloys of rare earth elements. Examples of suitable magnets include samarium-cobalt magnets and neodymium magnets. Other strong magnets known now or later developed may be suitable for use. In some embodiments permanent magnets may be used to generate a field that that is between about 0.1 and 1.5 about Tesla in the annular space; in some embodiments, permanent magnets may generate a magnetic field between about 0.1 and about 0.5 Tesla in the annular space.

Figure 18B:
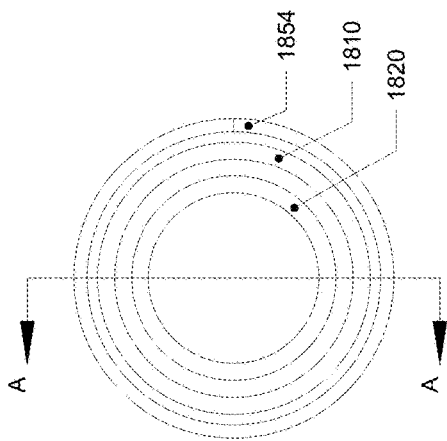
FIGS. 18a-d depict a first embodiment reactor in which the applied magnetic field in the confinement region is applied using an electromagnet.
Figure 18D:
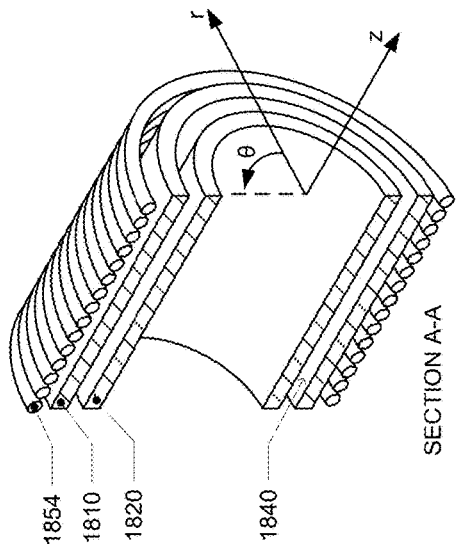
Figure 18A:
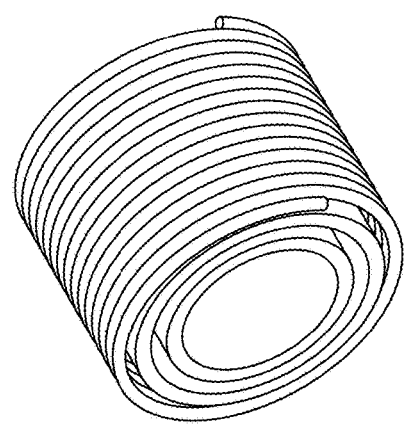
Figure 18C:
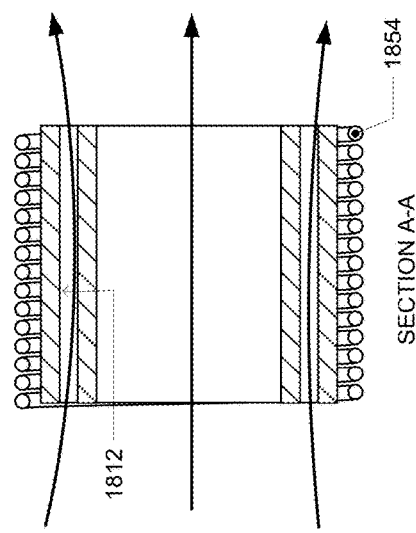

Not all reactors require permanent magnets. Some employ electromagnets or superconducting magnets as explained with reference to FIGS. 10a-d. Some reactors employ a combination of two or more of a permanent magnet and an electromagnet. FIGS. 18a-d depict a first embodiment in which an axial magnetic field is applied by an electromagnet. As depicted, the reactor has an inner electrode 1820 and an outer electrode 1810 that forms the confinement wall 1812 for the annular space 1840 between the electrodes. FIG. 18a shows an isometric view of an electromagnet that is placed over the reactor. FIG. 18b provides a perspective of the reactor as along the z-axis and FIGS. 18c and 18d depict a section view and an isometric section view corresponding to the section lines shown in FIG. 18b. An electrical current is passed through coil windings 1854 that wrap around reactor in the z-direction to create an applied magnetic field that is substantially in the z-direction through the reactor as depicted by the magnetic field lines in FIG. 18c. The electrical current through the electroconductive coil may be provided by an AC or a DC power supply. In cases where the electroconductive coil is driven by an AC power supply, the inner electrode and/or outer electrode may also be driven by an AC power supply at the same frequency. This is done such that the rotation of charged particles is maintained in the same direction, rather than in alternating directions as would occur if the alternating polarity of the magnetic field was not synchronized with the electric field. The coil may be made from a conductive material such as copper, aluminum, gold, or silver. In some embodiments, the coil takes the form of a wire that is wrapped around the outer electrode, in some embodiments the coil is placed in a separate enclosure that may be placed around the outer electrode.

Reverse Electrical Polarity Embodiment

A reverse electrical polarity rotor was previously described in FIGS. 5a to 5c. Generally, unless stated otherwise, the structure of electrodes corresponding to the first embodiment are also descriptive of a reverse electrical polarity rotor. For example, materials for inner and outer electrodes, the gap between electrodes (542 in FIG. 5a), and the configurations of magnets used to produce a magnetic field in the z-direction may be the same as described for the concentric electrode reactors. However, as explained below, some embodiments employ different structural configurations and/or different materials (e.g., different materials on the inner electrode).

FIG. 5d depicts a cross selection of a reverse electrical polarity rotor. An electric field may be applied in the negative r-direction by applying a negative voltage to the inner electrode and grounding the outer electrode, by grounding the inner electrode and applying a positive potential to the outer electrode, or by applying a more negative potential to the inner electrode than is applied to the outer electrode. When an electric field is generated by applying an electric potential to the inner and/or outer electrode, positively charged particles in the annular space 540 are drawn towards the inner electrode 520. As the charged particles move inward, a Lorentz force azimuthally accelerates the particles which may result in a spiraled trajectory as illustrated by path 503. Through ion-neutral coupling, neutrals in the annular space are co-rotated along with the positively charged particles. Due to the potential difference between the inner and outer electrodes, a surplus of electrons on the inner electrode forms an electron-rich region 532 proximate to the electrode surface that rotates in the same direction as the positively charged particles due to the Lorenz force. As discussed elsewhere, this electron-rich region may reduce the Coulombic barrier between fusing nuclei. In some cases, this electron-rich region may extend out about 100 um to about 3 mm from the surface of the inner electrode.

In some cases, when positively charged particles move inward, recombination of charged species occurs when a positively charged particle contacts the inner electrode or when a positively charged particle encounters a free electron in the electron-rich region. In some cases, a positively charged particle may orbit the inner electrode at a Larmor radius 502. In some embodiments, the concentration of positively charged particles may vary in the radial direction. For example, there may be a higher concentration of positively charged particles circling the annular space at a Larmor radius, than near the outer electrode. This gradient of charged particles may result in a velocity distribution within the annular space with particles tending to move more slowly near the outer wall where there is a higher concentration of neutrals due to a centrifugal force and fewer positively charged particles to drive the neutrals into motion.

In some configurations, an inner electrode is constructed from a single material such as tantalum, tungsten, copper, carbon, or lanthanum hexaboride. In some cases, an inner electrode has a conductive core 520a that is coated with an electron emitting and/or target material 520b. For example, the inner electrode may have a core made from a conductive and heat resistant material, e.g., tungsten, which is coated with lanthanum hexaboride, boron nitride, or another boron-containing material. In some cases, the inner electrode has a diameter that is between about 1 cm and about 3 cm, and in some cases, between about 4 cm and about 6 cm. In some cases, the inner electrode has a tiny cross-section, for example, it may be a filament or wire. In such embodiments, the inner electrode may have a diameter less than about 0.5 mm, less than about 0.1 mm, or less than about 0.05 mm. In some cases, the inner electrode may extend between about 3 cm and about 10 cm in length in the z-direction. In some cases, the inner electrode may be small in the z-direction, e.g., less than about 3 cm, or less than about 1 cm. In some embodiments, the inner electrode may be much longer in the z-direction, e.g., longer than about 20 cm. In some cases, the confinement region in the z-direction for a reverse electrical polarity reactor (the length that the inner and outer electrodes overlap) may be limited by the power source that applies a charge to the inner and/or outer electrode. In some cases, the length in z-direction may depend on the gas pressure within the confinement region. In some cases, the power needed to generate a plasma within the annular space may be reduced if the gas pressure is reduced to a very low pressure allowing for an increased length in the z-direction.

Figure 19B:
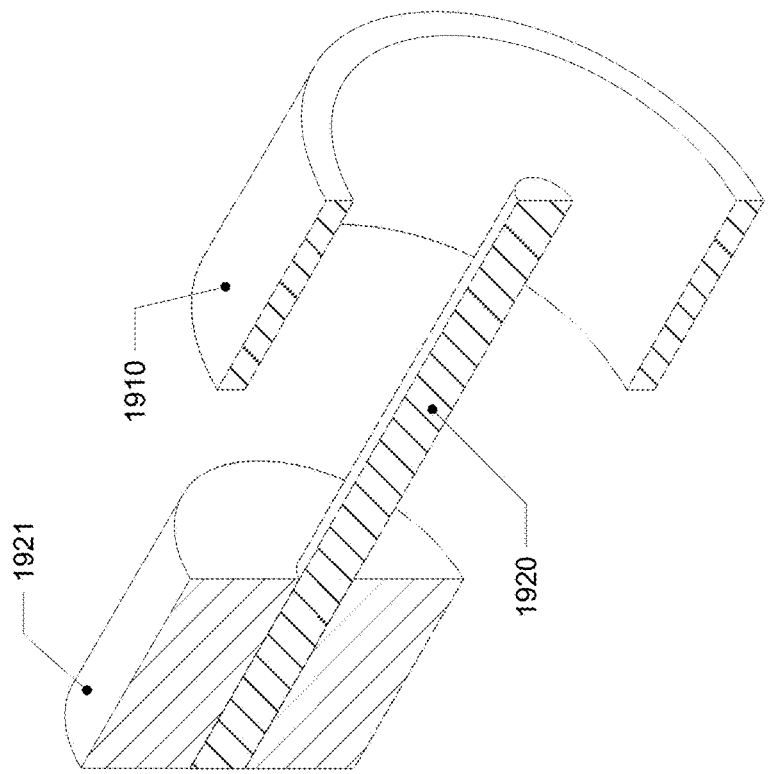
FIGS. 19a-b depict various embodiments of a reverse electrical polarity reactor.
Figure 19A:
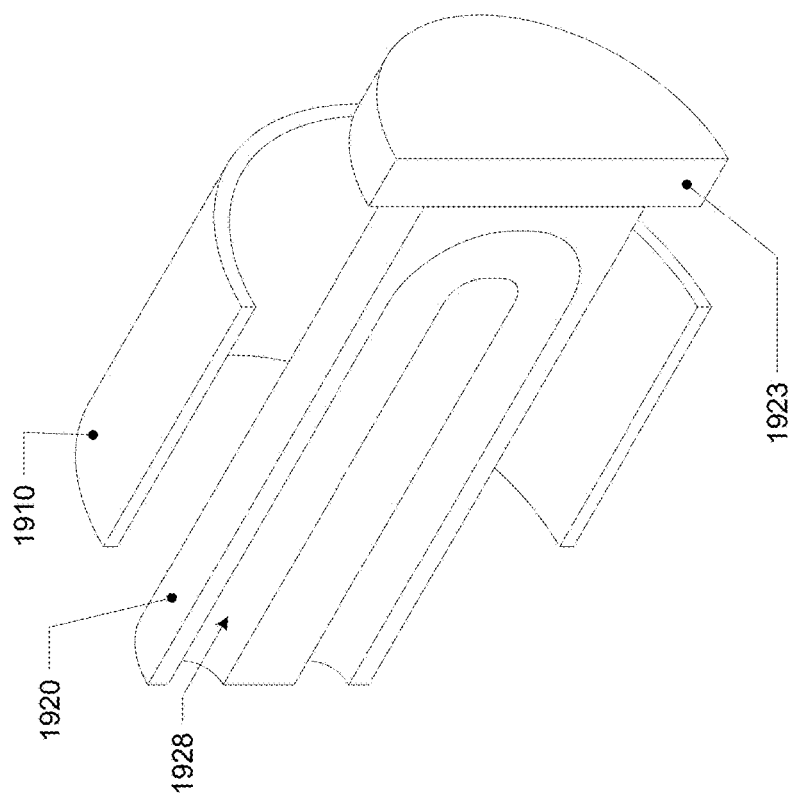

FIG. 19a depicts several methods by which the inner electrode may be actively cooled. In some cases, inner electrode 1910 has an internal pathway 1928 through which a passing fluid removes heat. For example, water may be pumped through the internal pathways to remove heat from the inner electrode. In some cases, an inner electrode may be joined to a ceramic block 1923 that is thermally conductive and electrically insulating. A ceramic block may be made of materials such as aluminum oxide. Heat is dissipated through the ceramic block, removing heat from the end of the inner electrode to which it is connected. In some cases, a ceramic block contains an opening or hole to support the inner electrode. In some cases, an inner electrode is fixed to the ceramic using a set screw. In some cases, the heat conducted through the ceramic block is used to generate electrical power, e.g., via thermoelectric generators or heat exchangers that are coupled to the ceramic block.

In some cases, the inner electrode may be replaced if the target material is consumed or if the electrode is damaged. For example, a boron coated filament that is used as an inner electrode may be replaced when the boron coating is consumed or when the filament breaks.

In certain embodiments, the length of the inner electrode extends beyond the annular space (as defined by the z-direction edges of the outer electrode). In some cases, the position of the inner electrode is adjusted in the z-direction, e.g., via a linear actuator. For example, if the inner electrode is a wire, the wire may be drawn through the annular space during operation of the reactor to prevent the inner electrode from melting, or to replace a section of the wire where a target material (e.g., a boron coating) has been consumed.

In some cases, the width of the inner electrode may vary in the z-direction. FIG. 19b depicts a configuration in which the inner electrode 1920 extends beyond the outer electrode 1910 and is held in place by a sleeve 1921 that may act as an extension of the inner electrode. Sleeve 1921 may be made from conductive materials such as copper, stainless steel, and tantalum. In some cases, a potential may be applied to the inner electrode through the sleeve; this may reduce resistive heating to inner electrodes that have a small diameter. In some cases, the diameter of the sleeve may be much greater than that of the inner electrode. For example, the diameter of the sleeve may be greater than about 10 cm while the diameter of the inner electrode is less than about 0.5 mm. In some configurations, the inner electrode may be fixed to the sleeve using set screws. In some embodiments, the sleeve may be threaded directly into the sleeve. These and other attachment mechanisms may allow the inner electrode 1920 to be replaceable, while the sleeve 1921 is permanent. In some cases, the sleeve may be coated with a target material such as boron. In some cases, a sleeve may be internally cooled as discussed in FIG. 19a.

As with the reactors of the first embodiment, the gap between the inner and outer electrode may be limited by a power supply's ability to generate a plasma in the confinement region. In some cases, the outer electrode may be similar in construction to the outer electrode described for the first embodiment. In some cases, the outer electrode may have an exterior insulating layer. This may be useful, e.g., if an alternating signal is applied the electrodes of a reactor, or if the reverse electrical polarity reactor is part of a modular unit consisting of additional reactors that need to be electrically isolated from one another. In general, the supporting structure of both the inner and outer electrode may include electrically insulating materials insulate the electrodes from the housing of the reactor, and prevent alternative current paths between the electrodes. In some cases, the outer electrode is a metallic sheet (e.g., a copper sheet) that is confined to a cylindrical shape by being placed within a quartz tube. In some cases, an outer electrode is a solid tubular structure that is placed within an insulating structure. In another embodiment, the electrode is made by coating the interior surface of a quartz tube with a metallic conductive coating.

As discussed elsewhere, only a small number of ions or positively charged particles are needed to drive many neutral particles into rotation. Due to the confining wall associated with the outer electrode, the concentration of neutrals increases in the radial direction. Rotating neutrals, however, are unaffected by the radial electric field or the axial magnetic field. Due to randomized collisions with the outer wall and other particles, neutrals may be deflected into the electron-rich region, and in some cases, neutrals may impact a target material on the inner electrode resulting in fusion events. Likewise, in some cases, positively charged particles may also be deflected into the inner electrode producing a fusion reaction, e.g., a proton-boron[11] fusion reaction.

In some cases, a reverse electrical polarity reactor is operated at a constant voltage. For example, a voltage supply may apply a potential to the inner electrode and/or outer electrode so that a constant or substantially constant potential difference between the electrodes is maintained during operation of the reactor. In another mode of operation, a reverse electrical polarity reactor is operated at a constant current. Operating at constant current may be beneficial when the inner electrode is small and susceptible to failure due to resistive heating. In some cases, a reactor is initially operated using constant voltage and then transitioned to a constant current mode of operation.

In some configurations, an energy storage device such as a capacitor or a battery is used to apply a potential to the inner electrode and/or outer electrode to initiate a fusion reaction. In some cases, circuitry regulates the current and/or voltage supplied by the energy storage device. In some cases, an energy device (e.g., a capacitor) is connected to the inner electrode and/or outer electrode and discharged until the energy storage device is no longer capable generating an electric field strong enough to support a fusion reaction. In some cases, a reactor is configured with an additional energy storage device that is charged by electrical energy generated from the fusion reaction while the first energy storage device is discharged. A controller may then operate a switch that that alternates the energy storage devices between charging and discharging modes, so that a fusion reaction may be maintained.

In some cases, a power supply is disconnected from either the inner and/or outer electrode, and a fusion reaction may continue to occur for a period (e.g., about 10 seconds) before the potential difference between the electrodes is no longer sufficient to sustain the fusion reaction. When the electric field becomes too small to sustain fusion, the voltage or current source may again be reconnected to apply a negative potential to the inner electrode.

Before the operation of a reverse polarity reactor, the gas in the annular space may be at be at a pressure of about 1 atm or higher. In some cases, such as when the inner electrode is long in the z-direction, an inner electrode may have a low pressure to reduce the power needed to initiate a fusion reaction. In some cases, the pressure within the annular space may be reduced to less than about 1 Torr or less than about 10 mTorr before operating the reactor. In some cases, the pressure within the annular space may be adjusted through inlet and outlet valves to control the rate of a fusion reaction.

For a reverse electrical polarity reactor, the magnetic field in the confinement region is sometimes greater than about 0.5 Tesla, and sometimes greater than about 1 Tesla, and sometimes greater than about 3 Tesla. In some embodiments of a reverse electrical polarity reactor, the magnetic field is not substantially perpendicular to the electric field between the inner and outer electrodes. In some embodiments, the magnetic field is not uniform through the confinement region. The magnetic field in the confinement region may be tuned by adjusting the placement and orientation of magnets and/or electrodes. In some cases, a non-uniform magnetic field may increase the rate at which ions and neutrals collide with the inner electrode. In general, the applied magnetic field and/or the potential applied to electrodes may vary depending on the geometry of a reactor, the reactant gas composition, and the reactant gas pressure.

During operation, the concentration of particles, particularly higher mass particles, is greater near the outer wall due to the centrifugal force. This may be helpful in extracting fusion products, which have a higher mass than the rotating reactants, from the annular space. For example, when alpha particles are produced by a fusion reaction involving a rotating hydrogen species, alpha particles may be concentrated near the outer wall where they may then be removed through an outlet valve. In some cases, fusion products may be pumped into another reactor in which the fusion products are used as reactants. For example, alpha particles or helium atoms produced in a reverse electrical polarity reactor may be moved to another reactor configured to support a helium-helium fusion reaction.

Reverse Fields Reactor Embodiments

Another reactor embodiment has a reverse fields configuration was described previously with relation to FIGS. 6a-d. This configuration employs a Lorentzian rotor to impart and maintain rotational movement of particles in an annular space. Generally, many of the reactors described herein may be reconfigured to apply reverse fields, albeit with the orientation of the magnetic field and electric field transposed.

A magnetic field in the radial direction may be applied using permanent magnets (616, and 626) made from a magnetic material such as those described in relation to the first embodiment. In some cases, permanent magnets may be replaced with a plurality of azimuthally offset electromagnets having radially orientated axes, such that a magnetic field, oriented substantially in the r-direction, is applied throughout the annular space. In some cases, the surface of the confining wall may include one or more layers that protect a magnetic material. For example, a layer of aluminum or tantalum may provide protection to either an exterior or interior magnet. In some cases, a protective layer may include a target material containing a fusion reactant or an electron emitter. In some cases, a confining wall may have an internal cooling system to keep material below its melting temperature and prevent magnets from demagnetizing.

In concentric electrode embodiments, the gap between the inner electrode and the outer electrode is sometimes constrained by the available power to ionize gas in the annular space. Similarly, in a reverse fields configuration the confinement region in the z-direction that separates electrodes 660a and 660b may be constrained. For example, in some cases, the spacing between electrodes is in the range of about 1 mm to about 50 cm, and in some cases, the spacing is between electrodes is in the range of about 5 cm to about 20 cm.

In concentric electrode embodiments, the length of the annular space in the z-direction may sometimes be limited by the strength of permanent magnets. Similarly, in a reverse fields configuration, the gap in the r-direction may sometimes be limited by the need to create a strong magnetic field near the surface of the confinement wall. In some cases, the radial gap may be limited to, for example, about 10 cm or less, or about 5 cm or less. In some cases, as when magnet 616 provides sufficiently strong magnetic field near the confinement surface by itself, the gap may be larger; for example, in some cases, the gap may be larger than about 10 cm. In some cases, the interior magnet may not be necessary.

Wave-Particle Reactor Embodiments

An alternative reactor configuration, sometimes referred to as the wave-particle embodiment, was briefly described previously and is depicted in FIGS. 7a and 7b. In a wave-particle embodiment, charged particles are driven into rotation by oscillating electrostatic fields. The neutral species are pushed along by the charged particles. Electric fields are created by applying charge to azimuthally separated electrodes located on the confinement wall, an interior wall, or another structure in communication with the confinement region. Since this embodiment does not require a magnetic field, the structural limitations imposed by using magnets do not apply. For example, the radius of the reactor may be larger than what is feasible for ring or disk-shaped magnets. Further, because the embodiment does not require current flow between an inner and an outer electrode, structural limitations imposed by concentric electrodes do not apply. In some embodiments of a wave-particle design, the radius of a confinement wall may be greater than about 2 meters, in some cases greater than about 10 meters, and in some cases greater than about 50 meters. In contrast to some implementations of a Lorentzian rotor, the length of a reactor in the z-direction is not limited by the strength of permanent magnets as may sometimes be the case in concentric electrode embodiments. In some embodiments, a confinement region (e.g., an annular region) may have a length in the z-direction that is greater than about 1 meter, in some cases, greater than about 10 meters, and in some cases greater than about 100 meters. In one embodiment there is a curvature in the z-direction of a reactor so that that the confinement wall forms a torus or torus-like shape. In general, the size limitations of a reactor may be governed energy demands of the reactor and costs associated with production. In a wave-particle embodiment, a degree of control over the rotating species may be set by defining the number and size of the azimuthally offset electrodes impacting the confinement region. A relatively greater number of electrodes along the confinement wall allows the electric field lines to be more finely modulated, which can improve the efficiency at which the electric field is used to move charged particles. In some cases this is because the dynamically changing electric field drives particles points primarily in the azimuthal direction rather than the radial direction. Generally, a reactor will have at least three azimuthally separated electrodes. Some reactors may have at least five azimuthally spaced electrodes, some reactors may have more than about 50 azimuthally spaced electrodes. In some designs, the number of electrodes scales with a size of a reactor. For example, a reactor having a radius of about 1 meter may have between about 20 and about 40 azimuthally spaced electrodes along the confinement wall while a reactor having a radius of about 2 meters may have about 40 to about 80 azimuthally spaced electrodes. In some cases, the ratio of a reactor's circumference, in meters, to the number of azimuthally spaced inner or outer electrodes is between about 3 and about 150, and in some cases the ratio is between about 20 and 100.

In some cases, the electrodes are separated by an electrically insulating material such as aluminum nitride or boron nitride. The insulating material may be sufficiently thick so that the material does not experience electrical breakdown. The minimum thickness may be determined by the dielectric strength of the insulating material and the voltage applied to electrodes. In some cases, an electrically insulating material contains a target material (fusion reactant such as boron-11) and/or an electron emitter.

In some cases, the width of an electrode in the azimuthal direction is less than about 10 cm, in some cases less than about 5 cm, and in some cases less than about 2 cm. The electrodes may have any of various shapes. For example, they may be circular or polygonal. In some cases, they are rectangular. In some embodiments, a reactor utilizes azimuthally separated electrodes only along the confinement wall. Alternatively, in some embodiments, a reactor utilizes electrodes only along an inner wall, or only electrodes that bound the confinement region in the z-direction (e.g., electrode placement may correspond to electrodes 660a and 660b of the reverse fields embodiment depicted in FIG. 6c). In cases where electrodes do not themselves define the confinement wall, the surface of the confinement wall may be made of another material such as a target material or an electron emitter. For example, the electrodes may be separated from the confinement region by a sleeve that contains coupons made from lanthanum hexaboride.

In some cases, the confinement-wall wall is configured with a thermal management component such as a heat exchanger (e.g., a cooling jacket). A heat exchanger can be used to prevent electrodes from overheating and/or supply to provide heated fluid to a heat engine for generating electrical or heat energy. In some cases, heat may be dissipated from a reactor by passing a fluid such as water through passageways in the confinement wall. For example, insulating material separating azimuthally separated electrodes may have internal passages through which fluid is passed.

In concentric electrode embodiments, the gap between an inner electrode and outer electrode is sometimes constrained due to the limited power available to ionize gas in the confinement region. In a wave-particle configuration, the gap between adjacently located electrically isolated electrodes may also be constrained. For example, in some cases, the spacing between electrodes is, on average, in the range of about 1 mm to about 50 cm, and in some case, the spacing is between electrodes is, on average, in the range of about 5 cm to about 20 cm.

In some cases, a wave-particle reactor has more than one mode of operation. For example, a first phase may be employed to initiate or strike a plasma and a later phase may be used drive ions (and indirectly neutrals) in a rotational direction. For example, an RF electric field may be applied radially between the inner electrodes and the outer electrodes to generate a weakly ionized plasma prepare a reactor for operation. Once the plasma has been generated between the inner and outer electrodes, the reactor may transition to a mode where drive signals are sequentially applied to the azimuthally distributed electrodes to drive charged particles and neutrals into rotation.

Oscillating signals applied to azimuthally distributed electrodes to drive rotation of ions and neutrals may be provided over a wide range of frequencies chosen based on the reactor configuration and the desired rotational velocity. For example, the drive signals may be applied at a frequency in the range of about 60 kHz to 1 THz, and in some cases in the range of about 60 kHz and 1 GHz. In some cases, the frequency of a drive signal may begin low and then increase, gradually or abruptly. For example, the drive signal may start at a relatively low frequency, e.g. 60 kHz and eventually ramp up to a much higher frequency, e.g., 100 Mhz.

In some cases, a drive signal applies charge using a controlled voltage. To avoid arcing between electrodes electrodes, charge is ideally applied a high voltage and low current, rather than high current at low voltage. In some cases, a drive signal applies between about 1 kV and about 100 kV to azimuthally separated electrodes. In some cases, a drive signal may apply more than 100 kV to electrodes.

Using electrostatic forces, a wave-particle embodiment may induce rotational velocities that exceed that typically found in Lorentzian driven reactor having a similar reactor configuration (e.g., a similar confinement radius). In some cases, an electrostatically driven reactor may drive rotation of a gaseous species at a rate of at least about 1000 RPS, or in some cases at least about 100,000 RPS. In a wave-particle embodiment, a control system may be used to direct how charges are applied to the electrodes. In some cases, a control system uses a detected velocity, determined using a high-speed camera or another sensor, as feedback to adjust a charge sequence that is applied to the electrodes. In general, azimuthally separated electrodes may have similar structural considerations and may be made from similar materials to those described in relation to the above embodiments that employ magnetic fields.

Hybrid Reactor Embodiments

Another general reactor configuration, which may be referred to as a hybrid reactor configuration, was briefly described with relation to FIGS. 6a to 6f. This configuration employs both a Lorentzian rotor and a wave-particle driver to impart and maintain rotational movement of particles in an annular space. When operating a Lorentzian rotor in a hybrid reactor, some aspects of the above-description of the reverse fields embodiment may apply. Similarly, when operating using azimuthally spaced electrodes of the hybrid reactor, some aspects of the above-description of the wave-particle embodiment may apply.

As in the reverse fields embodiments, a magnetic field in the radial direction may be applied using permanent magnets (616, and 626) which may be made from magnetic materials such as those described in relation to the first embodiment. In some cases, permanent magnets may be replaced with a plurality of azimuthally offset electromagnets having radially orientated axes, such that a magnetic field, oriented substantially in the r-direction, is applied throughout the confinement region. In some cases, the surface of the confining wall may include one or more layers that protect a magnetic material. For example, a layer of aluminum or tantalum may provide protection to either an exterior or interior magnet. In some cases, a protective layer may include a target material containing a fusion reactant or an electron emitter. In some cases, a confining wall may have an internal cooling system to keep material below its melting temperature and prevent magnets from demagnetizing.

In concentric electrode embodiments, the gap between the inner electrode and the outer electrode is sometimes constrained by the available power to ionize gas in the annular space. Similarly, in a hybrid reactor configuration the confinement region or annular space in the z-direction that separates electrodes 660a and 660b may be constrained. For example, in some cases, the spacing between electrodes is in the range of about 1 mm to about 50 cm, and in some cases, the spacing is between electrodes is in the range of about 5 cm to about 20 cm.

In concentric electrode embodiments, the length of the annular space in the z-direction may sometimes be limited by the strength of permanent magnets. Similarly, in a hybrid configuration, the gap in the r-direction may sometimes be limited by the need to create a strong magnetic field near the surface of the confinement wall. In some cases, the radial gap may be limited to, for example, about 10 cm or less, or about 5 cm or less. In some cases, as when magnet 616 provides sufficiently strong magnetic field near the confinement surface by itself, the gap may be larger; for example, in some cases, the gap may be larger than about 10 cm. In some cases, the interior magnet may not be necessary.

In a hybrid embodiment, a control system may be used to direct how control signals are applied to the azimuthally separated electrodes. In some cases, a control system may receive feedback from sensors to adjust a charge sequence that is applied to the electrodes. In general, electrodes (660a and 660b) may have similar structural considerations and may be made from materials described as being suitable for electrodes in the first embodiment.

In some configurations, a hybrid reactor is configured to transition between operating modes while conducting a fusion reaction or just prior to conducting a fusion reaction. For example, the reactor may operate initially using a Lorentzian rotor before transitioning to a wave-particle driver to maintain particle rotation. Under certain conditions, a Lorentzian driven rotor may be more efficient at initiating rotation of particles in the annular space. Once particles within the annular space have reached a critical state of rotation within the reactor in which the benefit of using a Lorentzian rotor is no longer seen, the reactor may switch to a wave-particle drive mode of operation. In some cases, by transitioning to a wave-particle driving mode of operation, greater particle velocities and thus greater energy production may be achieved. In some cases, by transitioning to a wave-particle driving mode of operation, energy production may be modulated with greater precision by adjusting the sequence of drive signals that are applied to the azimuthally distributed electrodes (660*a* and 660*b*). In some embodiments that use electromagnets to generate an electric field, a current supply used to control the magnetic field may be terminated when the reactor enters a wave-particle mode of operation. This may be useful to prevent a Lorentzian force from acting on charged particles in the z-direction.

Electron Emitters

As described elsewhere herein, a confining wall is sometimes made at least in part of an electron emitting material, referred to herein as an electron emitter. These materials may emit electrons via thermionic emission above a certain temperature. For example, some boron based electron emitters have an emission temperature that is in the range of about 1500 K to about 2500 K. In some cases, an electron emitter may be in the form of a powder that is compacted, sintered, or otherwise converted to a form suitable for placement within the annular space. In some cases, an electron emitting material may be sintered or deposited using physical vapor deposition onto the confining wall of a reactor. In other cases, an electron emitter may be forged into a continuous structure that forms part of the confining wall or is attached to the confining wall.

Some electron emitters are materials having a low work function and are resistant to degradation when exposed to the thermal and other environmental conditions within a reactor. Examples of electron emitters include oxides and borides such as barium oxide, strontium oxide, calcium oxide, aluminum, oxide, thorium oxide, lanthanum hexaboride, cerium hexaboride, calcium hexaboride, strontium hexaboride, barium hexaboride, yttrium hexaboride, gadolinium hexaboride, samarium hexaboride, and thorium hexaboride. In some cases, emitters may be carbides and borides of transition metals, e.g., zirconium carbide, hafnium carbide, tantalum carbide, and hafnium diboride. In some cases, emitters may serve as a reactant of a fusion reaction such as $^6$Li, $^{15}$N, $^3$He, and D. In some cases, an electron emitter may be a compound that includes a fusion reactant. For example, lanthanum hexaboride may act as both an electron emitter and a target material for proton-$^{11}$B fusion. In some cases, a fusion reaction product may serve as an electron emitter. In some cases, an electron emitter may be a composite of two or more materials, where at least one material has a low work function and emits electrons during operation.

Figure 20A:
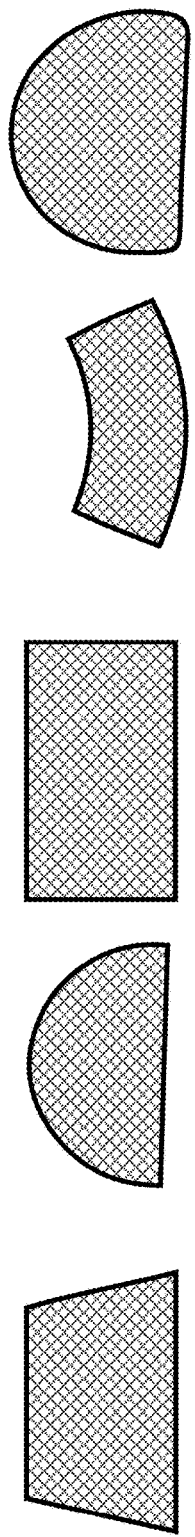
FIGS. 20a-b depict various electron emitters that may be placed on a confinement wall.
Figure 20B:
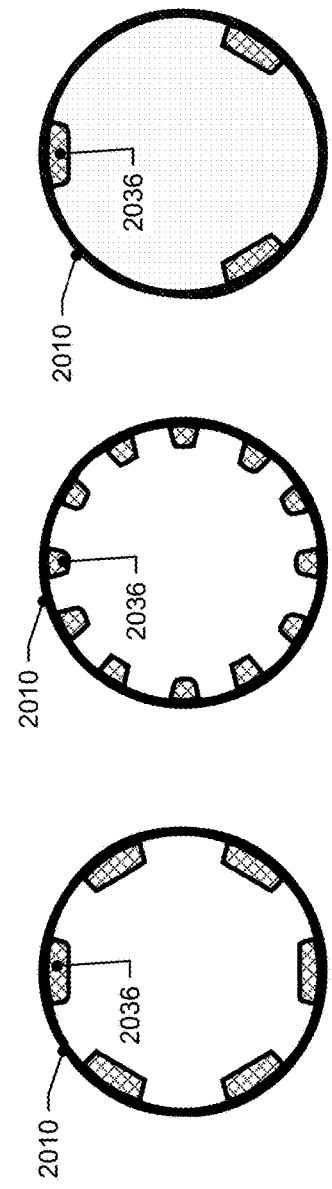

In some cases, an electron emitter is attached as a solid element in the confinement wall of a reactor. In some embodiments, electron emitters, which may be provided in the form of coupons, have a thin or flat structure and are attached to the confining wall without protruding significantly into the annular space. FIG. 20*a* depicts several illustrative cross-sections of electron emitters. In some embodiments, these electron emitters may be attached to the surface of the confining wall using a mechanical fastener such as a clip, or a screw. In some cases, an electron emitter is configured to slide into a slot within the confinement wall and is held in place, at least in part, by friction. For example, a slot may have grooves or a clamping mechanism for holding an electron emitter in place. In some cases, emitters are attached to the confining wall using heat, an adhesive, or another binding process. In some cases, the emitter structures have a thickness that is less than about 1.2 cm, in some cases less than about 6 mm, and in some cases less than about 3 mm. The dimensions of an electron emitter in the azimuthal direction or the z-direction may be limited by the physical dimensions of a reactor. FIG. 20*b* depicts several configurations in which electron emitters 2036 may be distributed symmetrically along the surface of the confining wall 2010, however in some configurations electron emitters may be positioned in only a few select regions.

In certain embodiments when emitters are disposed on the surface of the confining wall, they are heated by frictional and/or plasma heat that is intrinsic to the operation of the reactor. In some cases, an electron emitter is also heated by another method to increase the rate of electron emission. For example, electron emitters can be heated by another method during the initial operation of a reactor to increase electron emission when the reactor is still relatively cool. In some cases, by controlling the energy applied electron emitters (e.g., by Joule heating) the rate of electron emission the rate of a fusion reaction can be controlled.

In some embodiments, an electron emitter on the confining wall is energized using electrical power provided by a power supply. For example, current can pass through a filament within an electron emitting material to provide Joule heating and increase electron emission. In some cases, a filament is a refractory metal such as tungsten. If the confining wall is electrically grounded, the electron emitter may be separated from the confining wall by an electrically insulating material. In some cases, a direct current (DC) is applied to a filament. In some cases, electron emission is further improved or controlled by applying an alternating current (AC), e.g., via an RF or microwave signal, to a filament in contact with an electron emitter.

FIGS. 21*a*-*b* depict an example in which Joule heating is used to control electron emission in a reactor having concentric electrodes. FIG. 21*a* provides a view in the z-direction of the reactor having an inner electrode 2120, an outer electrode 2110 separated from the inner electrode by the confinement region (e.g., an annular space) 2140, and electron-emitting modules 2136 placed along the confining wall 2112 that are powered by a power supply 2135. FIG. 21*b* provides an enlarged view of an electron-emitting module located on the confining wall. An electron-emitting module includes an electron emitter material 2130, such as lanthanum hexaboride, that is heated by a filament 2134. In some cases, the module may include insulating layers, 2137 and 2138, which provide electrical and/or thermal isolation from the outer electrode and/or confining wall. In some cases, one layer (2137 or 2138) is used for electrical insulation, and the other is used for thermal insulation. These insulating layers may be made of ceramic materials such as zirconium oxide, aluminum oxide, zinc nitride, and magnesium oxide. In some embodiments, the position of the electron-emitting modules can be adjusted during operation of the reactor. For example, modules may be moved radially inward into the confinement region, e.g., using an actuator, to increase electron emission caused by frictional heating of the rotating species or may be moved radially outward and out of the confinement region to limit the electrons being released.

In some embodiments, electron emitters may have a sharp point or a cone-shaped structure at one end for improved field electron emission. For example, when an electron emitter is supplied with an electric potential, a strong electric field occurring near the point as a result of the narrowing geometry may cause field electron emission focused at the location of the point.

Figure 22:
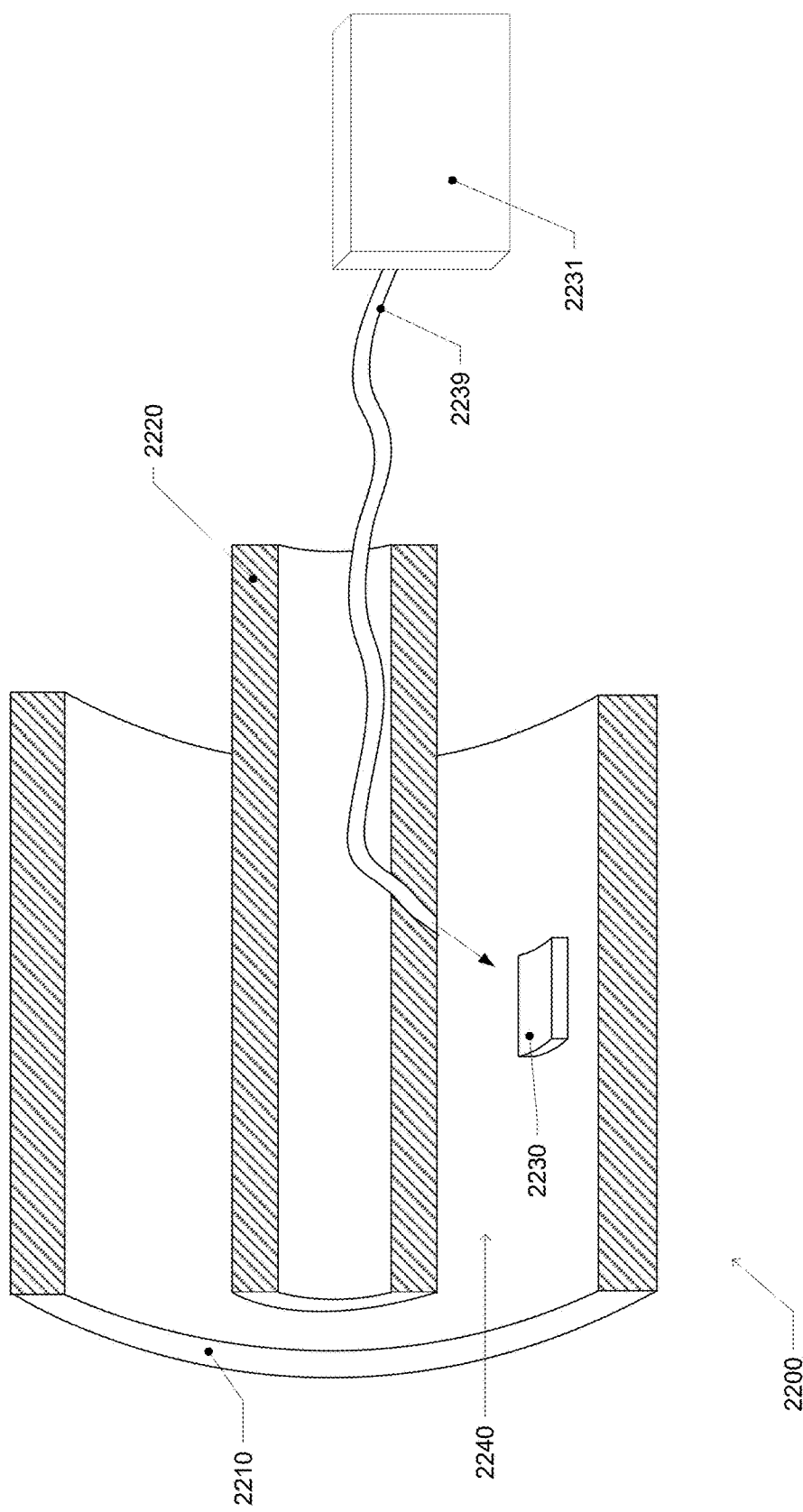
FIG. 22 depicts a reactor configured with a laser increasing or controlling electron emission from an electron emitter.

In some embodiments, one or more lasers are used to increase or otherwise control electron emission from an emitter. As depicted in FIG. 22, a reactor 2200 may be configured with a laser 2231 to direct light within the confinement region 2240 onto an electron emitter 2230. As depicted, light from a laser may be optically directed through or along an inner electrode 2220 via an insulated optical fiber 2239. While lasers may be directed at emitters that are used for thermionic emission, they may also be directed at other materials such as titanium on the confinement wall that exhibit the photoelectric effect. For example, metals and conductors exhibit the photoelectric effect when impinging photons create a charge imbalance that is not neutralized by current flow and can serve to increase electron emission. While FIG. 22 depicts a first embodiment, in a reverse electrical polarity embodiment, a laser may be directed towards the inner, negatively charged electrode, to increase electron emission.

Gas Delivery System

A reactor may have one or more gas valves that for introducing fusion reactants and removing fusion product. In some cases, standardized gas valves may be used. For example, gas valves used for low-pressure deposition and etching chambers may be suitable for the reactor. In some cases, a gas reactant is released into the confinement region at a location interior location; for example, a reactant species may be routed through an inner electrode. In some cases, a gas valve may be located at one end of the confinement region or annular space in the z-direction, and in other cases a gas reactant species is introduced into the confinement region through a valve located within the confining wall. Outlet valves for fusion products may be placed at similar locations to the inlet valves. When fusion products are removed during operation of a reactor, outlet valves may be located on the confinement wall or at a location adjacent to the confinement wall, but offset from the confinement region in the z-direction. In some cases, an inlet and outlet valves may need to be electrically insulated from an electrode so as not to cause an electrical short to ground.

Inlet and outlet valves may also be accompanied with vacuum or pump systems to aid in the transport of gas species into and out of a reactor. In some cases, valves may include flow meter that controls the amount of gas species added into or removed from a reactor. In some cases, a flowmeter may be connected to a control system of the reactor to carefully limit the amount of hydrogen, or reactant species that is put into the chamber. In some cases, a gas inlet introduces neutrals near the confinement region and a gas outlet removes neutrals that have migrated beyond where fusion is occurring in the z-direction of a reactor. In some cases, a pumping system that controls the distribution of neutrals along the z-direction of a reactor is used to remove neutrals that might otherwise reduce the efficiency of converting the kinetic energy of fusion products (e.g., alpha particles) into electrical energy.

While the embodiments discussed describe gas species, in other embodiments fusion reactants are introduced into the confinement region in liquid form. In some cases, rather than filling the confinement region with a fusion reactant in the form of a gas, the confinement region may be filled or partially filled with a liquid fuel. For example, liquids containing available or easily releasable hydrogen such as liquid hydrogen, ammonia, alkanes such as butane or methane, and liquid hydrides may be used in place of gaseous hydrogen. In some cases, a liquid fuel is provided in a manner that quickly vaporizes after entering a chamber. In some cases, adding a liquid fuel to a reactor is used to control the pressure within the reactor. For example, by using temperature differentials and the known volume of the confinement region, the pressure within the confinement region may be back-calculated using the ideal gas law. In some cases, the gas reactant pressure within a reactor may be carefully monitored so that a high neutral density is maintained and yet the structural integrity of the reactor is not compromised.

When a reactor is a Lorentzian rotor, liquid fuel may be added in sufficient quantity or under thermal conditions that the liquid does not immediately evaporate upon entering the confinement region. In such cases, a current may be passed through the liquid fuel by applying a potential between electrodes. In some cases, a liquid seeded with charged particles such as potassium. In the presence of a magnetic field, the Lorentzian force drives the charged and neutral components of the liquid fuel into rotation. As the kinetic energy of the rotating column increases, the liquid near the boundary layer along the confining wall may vaporize, releasing hydrogen gas or another reactant gas that may fuse with a target material on the confining wall. For example, proton-$^{11}$B fusion may occur when hydrogen gas is released from the liquid fuel, and the confining wall contains lanthanum hexaboride. In some cases, the gaseous layer which develops between the rotating liquid and the confining wall may create a slip layer that allows the liquid in the confinement region to rotate even faster by decreasing the drag imposed by the liquid-wall interface. In some cases, a liquid may absorb heat and may reduce concerns of melting the electrodes. Since liquids may have high densities of the fusion reactant compared to gasses, the liquid may be used for extended periods without needing replacement. While not limited to embodiments which use liquid fuel, in some cases a reactor may have a safety valve to release gas from a reactor if the pressure exceeds a threshold value. In some cases, such as in transportation applications, a fusion reactant may be stored in liquid form and delivered to a reactor as a liquid or vaporized prior to delivery. By storing fusion reactants in a liquid form, a fuel supply may be small and compact.

In some cases, a liquid fuel may be supplied to a reactor by pressurized tank. In some cases, a fusion reactant (e.g. hydrogen) may be may be contained in small capsules that are provided to a reactor. For example, hydrogen may be stored in glass capsules that are provided to a reactor through a port in the confinement wall. In some cases, hydrogen may be provided in a pressurized form (e.g., at a pressure of at several atmospheres) and in some cases, hydrogen may be provided in liquid form. In cases where the reactor is already in operation, the temperature within the reactor may melt the capsule container material, allowing the fuel to be released, immediately or over a delayed period (e.g., minutes). In some cases, such as when a reactor is cool from not being in operation, a laser (e.g., as depicted in FIG. 22) may be directed at a fuel capsule to break down the capsule material and release the reactant or fuel. In cases such as automotive applications, storing small amounts of a fusion reactant such as hydrogen in capsules may add convenience by reducing or eliminating hardware (e.g., pressurized tanks) that might otherwise be required to store reactants safely.

In some cases, a fusion reactant such as hydrogen may be introduced into the reactor as a solid compound. For example, polymer fuel pellets made of polyethylene or polypropylene may be provided to a reactor through a port in the confinement wall as hydrogen fuel is consumed in a reactor. Once inside a reactor, high temperatures caused by operation of the reactor or the energy of a laser (e.g., the laser as depicted in FIG. 22), may be sufficient to decompose the polymer and release hydrogen gas. In some embodiments, ammonia borane (also known as borazane) may be used as a hydrogen fuel. When a reactor reaches a temperature greater than about 100° C., the ammonia borane releases molecular hydrogen and gaseous boron-nitrogen compounds. In some cases, ammonia borane or the boron-nitrogen compounds may act as electron emitters, and in some cases, boron atoms from the ammonia borane may undergo a fusion reaction with hydrogen atoms during operation of a reactor. In many applications (e.g., automotive applications), solid fuels may add convenience by reducing or eliminating hardware that might otherwise be required to store gas fuels or liquid fuels safely.

Cooling System

In some cases, to enable sustained operation of the reactor, the reactor must be cooled to prevent electrodes, magnets, and/or other components from overheating. In some embodiments, a reactor may be cooled by full emersion in a liquid bath. In some embodiments, a reactor includes a heat sink that draws heat away from the reactor via conduction and transfers it to a fluid medium such as air or liquid coolant. As an example, a heat exchanger may be used. A fan or a pump may be used to control the flow conditions and aid in carrying away heat that is transferred to the fluid medium. Depending on the monitored temperatures within the reactor, the fluid velocity may be adjusted, such that fluid flow is modulated between laminar and turbulent flow. In some embodiments, fluid is passed through a cooling jacket on the outside of a reactor and in some cases cooling tubes may be used to cool components within the reactor. As described elsewhere herein, a heat sink may be a used to transfer heat to working fluid that is used by a heat engine for producing electrical energy. Examples of liquids that may be used as working fluids for cooling a reactor include water, liquid lead, liquid sodium, liquid bismuth, molten salts, molten metals, and various organic compounds including some alcohols, hydrocarbons, and halocarbons.

Power Supply

Reactors may include one or power supplies that are used to supply electrical current to electrodes, electromagnets, and other electrical components that needed to operate a reactor. The power supply may control current and/or voltage between two terminals (e.g., concentric electrodes). In some embodiments, a power supply is capable of supplying a maximum voltage of about 200 volts to about 1000 volts. For example, in some embodiments, a power supply can provide up to 600 volts to an electrode. In some embodiments, a small scale reactor may be able to provide about 0.1 A to about 100 A of current and/or deliver at least about 1 kW of power. In some medium scale embodiments, a reactor may be able to provide about 1 A to about 1 kA of current and/or deliver at least about 5 kW of power. In some large scale in embodiments, a reactor may be able to provide about 1 A to about 10 kA of current and/or deliver at least hundreds of kilowatts of power.

Depending on the operating mode of the reactor, a power supply may be used to provide direct current or an alternating current. In some embodiments, an alternating current is applied to electrodes to strike a plasma. In some cases, the voltage required to strike a plasma in the confinement region may be reduced by more than about 10% compared to when a direct current is used to strike a plasma. In cases where an AC signal is used to strike a plasma, a power source may deliver an alernating current or votage signal at frequencies greater than about 1 kHz, or in some cases, greater than about 1 Mhz.

In some configurations, such as when an electromagnet is used to provide an axial magnetic field, and alternating current may be applied to both the electromagnet and the electrodes. In some cases, alternating signals may be applied to the electrodes and an electromagnet that have the same frequency but are out of phase. In some cases, a power supply may apply a current or voltage signal to an electrode or an electromagnet that is greater than about 500 Hz, or greater than about 1 kHz. In some cases, an electromagnet is operated as the same frequency that an alternating current is applied to electrodes so that the rotation of particles may be maintained. In some cases, a commercially available power supply may be used to apply a current or voltage signal to the electrodes of a reactor or an electromagnet. Examples of vendors of suitable power supplies include Advanced Energy Industries and TDK-Lambda American Inc.

Sensors

When operating a reactor, a variety of parameters may be monitored to control the rate of energy output, improve efficiency, prevent failure of components, and the like. For example, the temperature of a reactor may be monitored to ensure that the components of the reactor do not exceed defined maximum temperature values. If a permanent magnet gets too hot, it may demagnetize, and if an electrode or any other component gets too hot, it may yield or melt. In some cases, the operation of a reactor requires a relatively high temperature. For example, some electron emitters must acquire a sufficient thermal energy before electrons are released into the confinement region. Temperatures within a reactor may be monitored using sensors such as thermocouples, inferred imagery, and thermistors. In some cases, temperatures at locations within a reactor may be inferred by measuring temperatures at other locations within the reactor. For example, the temperature at the interior surface of an outer electrode may be inferred by monitoring the temperature at the exterior surface of the outer electrode. In some cases, by measuring temperatures indirectly from an exterior location, low-cost temperature sensors, such as silicon band-gap temperature sensors may be used.

In some embodiments, the gas pressures within the reactor may be monitored. By monitoring the pressure in front of an electron emitter, information may be gained about the density of electrons as they are pressed tightly against the confining wall. Pressure measurements from within the chamber may be used by a controller to regulate the flow rates of gas species entering and exiting the confinement region. In some embodiments, rotational speeds within the confinement region or annular space may be monitored using a camera that captures hundreds or thousands of images per second. In some cases, measuring the rotation of species within a reactor may be aided by introducing species that will fluoresce or have a detectable optical signature such as argon or quantum dots. In some embodiments, the gas composition with the confinement region may be monitored for fusion products such as $^4$He and $^3$He or for low quantities Deuterium within a reactant gas. In some embodiments, the detection of fusion products and reactants may be performed using an in situ mass spectrometer (e.g., a qRGA from Hiden Analytical that is capable of detecting low quantities of Deuterium in a gas sample), optical spectroscopy, or an NMR sensor. In some embodiments, a reactor may be equipped with Geiger counters to detect levels of radiation.

Figure 23A:
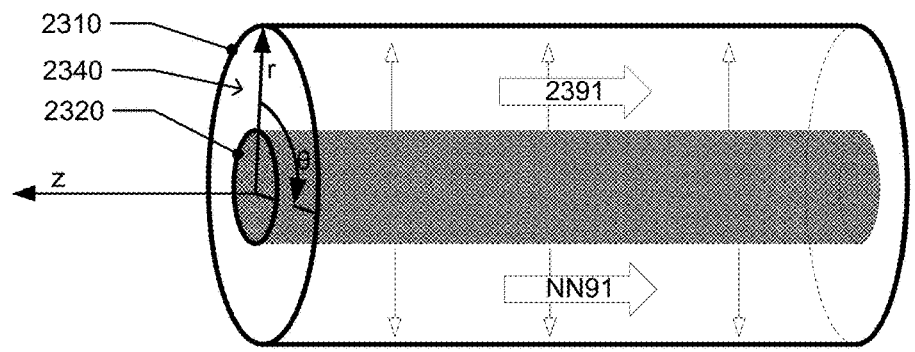
FIGS. 23a-c depicts a configuration where nuclear magnetic resonance sensing is used to determine the composition of gas reactants within a reactor.
Figure 23B:
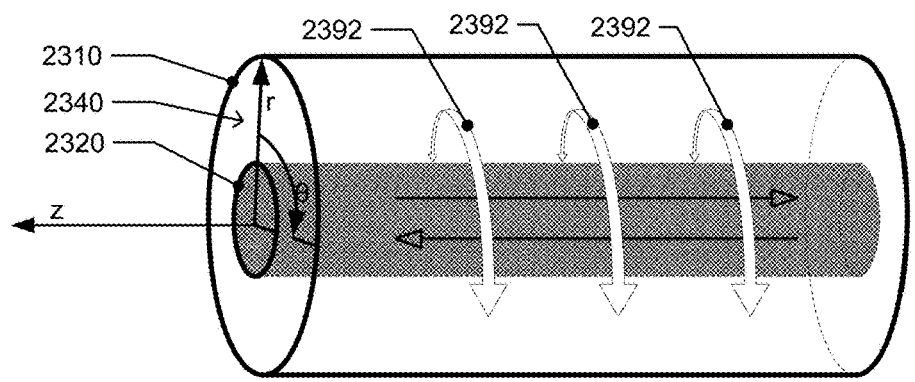
Figure 23C:
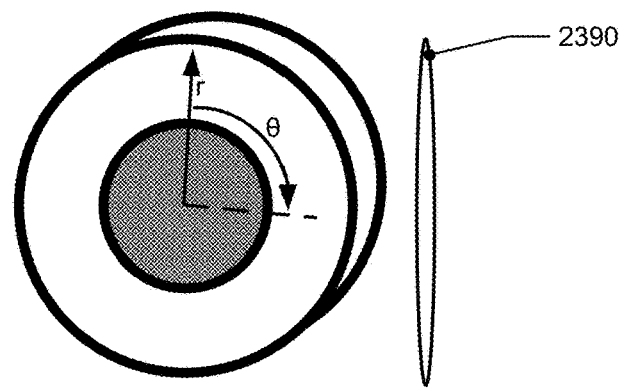

FIGS. 23*a-c* depict an example of how nuclear magnetic resonance sensing may be used to determine the composition of gas reactants in a concentric electrode embodiment. FIG. 23*a* depicts a reactor having inner electrode 2320, outer electrode 2310, and a substantially uniform and time-invariant magnetic field the z-direction 2391 that passes through the confinement region. The axially applied magnetic field may be used to align the nuclear spins of the rotating species and may be applied by a superconducting magnet as described elsewhere herein. In some cases, an axial magnetic field is greater than about 0.1 Tesla, in some cases, an axial magnetic field is greater than about 0.5 Tesla, and in some cases, an axial magnetic field is greater than about 2 Tesla through the confinement region.

When detection is desired, the nuclear spins of rotating species within the confinement region are perturbed by applying an RF pulse in the azimuthal direction. FIG. 23*b* depicts how an azimuthally, time-varying magnetic field 2392 is generated by applying an alternating current in the z-direction of the inner electrode. In some embodiments, the alternating current passing through the center electrode has a frequency of between about 60 Hz to about 1 MHz, and in some cases about 1 MHz to about 1 GHz. After perturbing the alignment of species with the time-varying magnetic field, the rate at which the nuclear spins of species are realigned is then monitored using a detection coil as depicted in FIG. 23*c*. A detection coil 2390 is substantially perpendicular to the major axis (the z-axis) of the reactor and monitors current passing through the coil as a result of the electromagnetic radiation that was absorbed and re-emitted by the rotating species. In some cases, detection coils similar to that used in a medical NMR system may be used.

Control System

Monitored parameters may be provided as inputs to a control system that operates the reactor in a regime that maintains system component integrity and supports fusion. The control system may control any and all parameters of the fusion reaction, and in some cases other operations such as heat energy gathering or utilization processes and conversion to electrical or other useful forms of energy. In certain embodiments, the control system maintains a balance between heat generation and heat extraction. Thus, for example, to maintain this predetermined and preselected balance, the control system may control application of electrical energy to electrodes in the reactor (e.g., by modulating electrical pulses, e.g., lengthening or shortening the time period between each pulse and/or changing the voltage applied to create the plasma), changing the magnetic field, for example, with an adjustable magnet in conjunction with a superconducting magnet, and changing the density of the reactants.

As discussed elsewhere herein, some parameters may need to fall within a defined process window such that both of these conditions are met. In some cases, a control system receives information that identifies an energy demand and adjusts process conditions accordingly. A control system may also have a criterion, which when met, initiates an automated shutdown process to prevent damage to the reactor or nearby operators. For example, if the temperature of the confining wall exceeds a certain threshold, or radiation thresholds are reached, a reactor may quench the fusion reaction. A control system may quench a reactor by, for example, grounding all electrodes, closing gas input valves, and/or introducing an inert gas species such as nitrogen.

Figure 24:
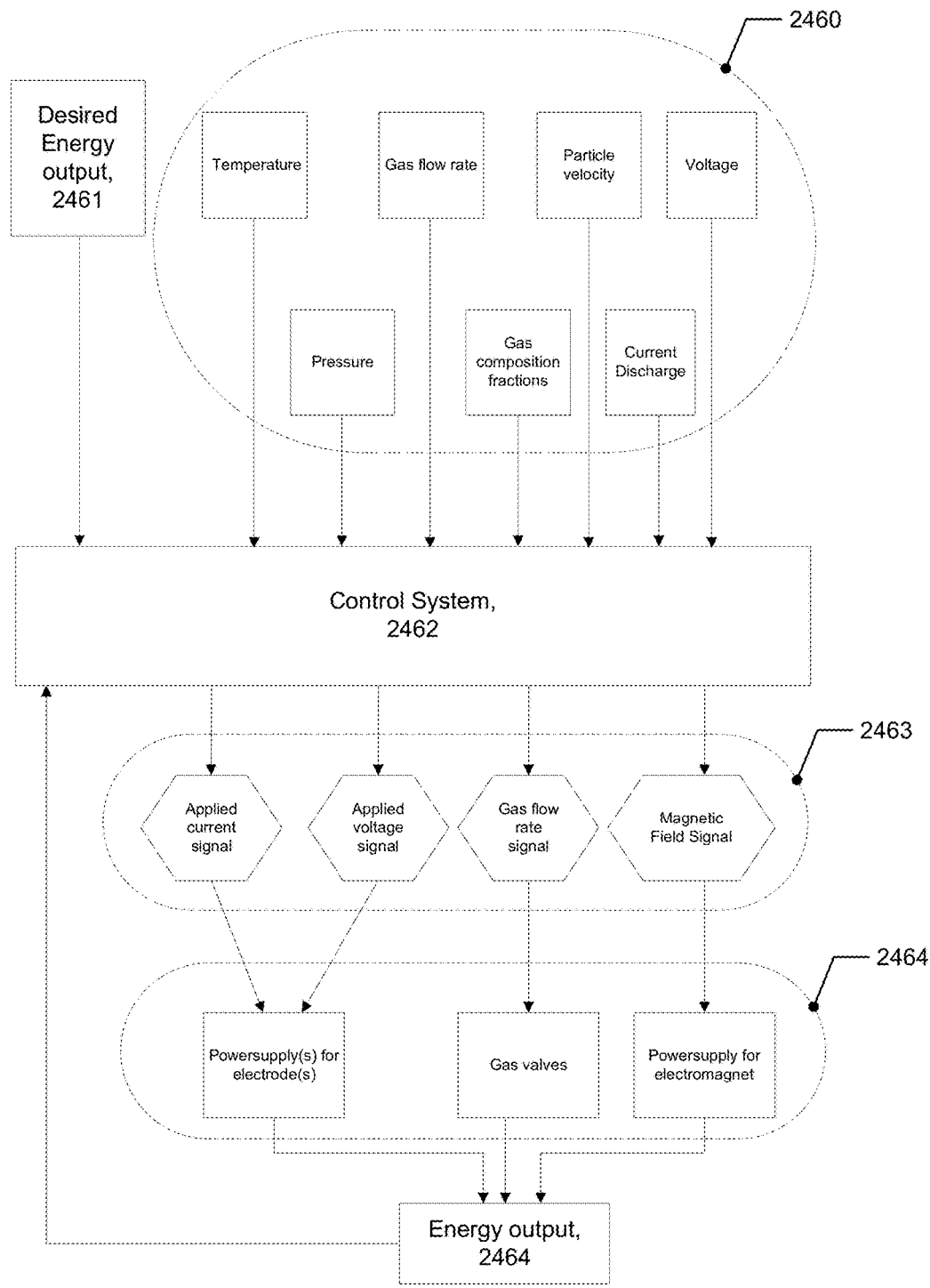
FIG. 24 depicts how a control system may be configured to operate a reactor using closed-loop feedback.

In some cases, a control system may provide closed-loop feedback as shown, for example, in FIG. 24. Based upon measured input parameters from sensors 2460 and a desired energy output signal 2461, a control system 2462 may send control signals 2463 to adjust the various parameter settings of the reactor 2464 as necessary to control the energy output 2465 or meet other specifications. Input parameters that are used by a controller may include parameters such as temperature, pressure, flow rates, gas composition fractions (e.g., partial pressures), particle velocities, current discharge between electrodes, and voltage. In some cases, the control system utilizes historical data of one or more parameters. For example, while it may be important to know a particular temperature value, it may also be important to understand the rate and/or magnitude at which temperature is fluctuating. Examples of reactor settings that may be adjusted by the controller include applied currents, applied voltages, applied magnetic field strength (in the case of an electromagnet), and gas flow rates (e.g., hydrogen flow rates). Typically, the controller passes a control signal to a reactor component responsible for the associated setting. For example, a control signal may be passed to a power supply to instruct the power supply to apply a specified voltage. In some cases, a setting may also be an input parameter to the control system. For example, in determining what voltage should be applied, a controller may account for the current and/or voltage presently applied to the electrodes. In some cases, a controller may use machine learning to improve its decisions so that a reactor may become more efficient over time, resistant to physical changes in the device (e.g., when a part fails and is replaced), or anticipate energy demand.

Certain operational features of a reactor may be independently controlled. For example, the flow rate of a cooling fluid may be controlled using a system that is independent of the control system responsible for adjusting the primary operating inputs of a reactor, such as current and gas flow rates. In another example, electron emitting modules, e.g. as depicted in FIG. 21*a*, may have an associated controller that receives a measured temperature of the electron emitter and determines what current should be applied to a filament to provide Joule heating.

The control system described above may be implemented in the form of control logic using computer software in a modular or integrated manner. There are many possible ways to control operation. Based on the disclosure and teachings provided herein, a person of ordinary skill in the art will appreciate how to implement the control functions using hardware and/or a combination of hardware and software.

In some cases, a control system may be implemented as software code to be executed by a processor using any suitable computer language such as, for example, Java, LabVIEW, MATLAB, C++, or Python using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. In some cases, a control system may be tested and designed using a FPGA (Field Programmable Gate Array), and then later manufactured through an ASIC process. In some cases, a controller may be a single chip that can securely store and execute the control logic. Any such computer readable medium may reside on or within a single computational apparatus and may be present on or within different computational apparatuses within a system or network. For example, the control system may be implemented using one or more processors, PLCs, computers, processor-memory combinations, and variations and combinations of these. The control system may be a distributed control network, a control network, or other types of control systems known to those of skill in the art for controlling large plants and facilities, and individual apparatus, as well as combinations and variations of these.

Radiation Shield

In some embodiments, such as when a reactor supports an aneutronic or substantially aneutronic reaction, the reactor may require little if any shielding to reduce radiation exposure. When there is a concern of neutronic radiation, the reactor may be outfitted with appropriate shielding. Neutrons readily pass through most material but interact enough to cause biological damage. In some cases, a reactor may be placed in an enclosure that absorbs neutrons. In some cases, the confinement wall of a reactor may include an external layer for absorbing neutrons. In some cases, shielding layers may be made of concrete having a high water content, polyethylene, paraffin, wax, water, or other hydrocarbon materials. In some cases, a shielding layer may include a lead or boron as a neutron absorber. For example, boron carbide may be used as a shielding layer where concrete would be cost prohibitive. In some embodiments, the ends of a reactor in the z-direction may include a material such as boron nitride that not only absorbs neutrons but is thermally and electrically insulating. In some cases, an electron emitter, such as lanthanum hexaboride, serves the additional function of providing shielding from neurotic radiation. In some cases, such as large scale reactors, tanks of water, oil, or gravel, may be placed over a reactor to provide effective shielding. The thickness of a shielding layer depends in part of what materials are used, where the reactor is located, the type of fusion reaction, and the size of the reactor. In some embodiments a shielding layer is greater than about 10 centimeters, in some cases, a shielding layer is greater than about 100 centimeters, and in some cases, a shielding layer is greater than about 1 meter.

Replaceable Components

Due to the aggressive nature of the plasma and fusion products within a reactor, electrodes may become damaged, distorted, embrittled, etc. Under normal operating conditions, some components of a reactor may eventually fail and need to be replaced. Further, when operating conditions exceed certain thresholds (e.g., high temperatures, pressures, plasma potentials, or reactant concentrations), components may be damaged or wear out more quickly. In cases where hydrogen is used as a reactant, electrodes may, over time, suffer from hydrogen embrittlement. If an embrittled electrode is not replaced, it is possible for the electrode to convert into a powder. In some cases, a reactor may be inadvertently operated outside its normal operating conditions resulting in increased wear or structural damage to one or more electrodes or other components. For example, if a cooling system malfunctions, the temperature of an electrode may near its melting temperature causing the electrode to deform. In some cases, thermal stresses may cause micro-fractures to appear on or within an electrode. If an electrode has an internal cooling system that breaches to allow water vapor to enter into the confinement region, the reactor may experience a spike in the pressure.

Fusion reactors as described herein may be highly configurable and modular. In certain embodiments, one or more components may be replaced and/or interchanged. Some components are permanent and are designed to not wear out during a reactor's lifetime, and some components are expected to be replaced after a certain number of operation cycles or time in operation. For each replaceable component, there may be a designated procedure for the removal, handling, refurbishment, and/or replacement of the component. In addition, there may be one or more indicators and field-implementable diagnostics that indicated and/or anticipate the degradation of the component.

Examples of replaceable components include one or more electrodes in the reactor, fusion reactants, containers fusion reactants (e.g. hydrogen gas canisters), and energy conversion devices associated with the reactor.

Examples of indicators that a component should be replaced include a decrease in electrical conductivity of an electrode, the time the component has been in operation, and the optical properties of the component (e.g., changes to the surface of a component may be detected optically). Mechanical failure may be determined by visual inspection, or in some cases, by monitoring measured parameters such as temperature, pressure, and conductivity of the electrodes. In some cases, a control system contains logic for determining a mechanical failure of an electrode or other component.

In some cases, the conductivity and/or conductance of electrodes may decrease over time. Due to the volatile nature of plasma, there can be an electrically insulative dielectric coating that forms on the electrode. If the conductivity and/or conductance of an electrode is reduced, the reactor may become less efficient and/or require excess amounts of power. If nothing is done to mitigate the declining conductance and/or conductivity of a reactor, the reactor may become an electrical and/or thermal hazard. While much of the discussion herein concerns determining an electrode's conductivity and/or conductance, it should be understood that conductivity may vary from position-to-position in an electrode. For example, the conductivity of the reaction-facing surface of an electrode may be much lower, after a long period of operation, than the conductivity of an interior portion of the electrode. As another example, the conductivity of the original material in an electrode may remain largely unchanged during operation, but a dielectric film formed on the reaction-facing surface of the electrode may significantly degrade the overall conductance of the electrode. Resistivity and/or resistance can be determined in lieu of conductivity and/or conductance.

Various techniques may be employed to monitor electrode conductivity and/or conductance or determine that electrode conductivity or conductance has reached a level that requires attention or replacement. In one example, using the electrode's geometry, the conductivity of the electrode may be determined by measuring the resistance between two points on the electrode surface when the reactor is not in operation. This measurement may be performed manually during a routine system check, e.g., by using a multimeter. In some cases, a reactor is configured with measurement circuitry that automatically measures the resistance of an electrode between operation cycles. In some cases, a reactor's control system may be configured to automatically determine the conductance of an electrode from a measured resistance. Another way an electrode's conductance may be determined is by performing a diagnostic cycle in which a gaseous reactant in the confinement region is replaced with another gas, and a plasma is generated within the confinement region. For example, hydrogen gas may be replaced with argon gas, neon gas, or nitrogen gas. A control system may then monitor the electrical behavior of the plasma measuring the voltage of the electrodes and the current passing through the electrodes. Based upon the electrical behavior of the argon plasma, the conductivity of an electrode may be determined. For example, the conductivity of each electrode may be determined by comparing the measured electrical behavior of the argon plasma (or another plasma) to an expected electrical behavior. In some cases, the expected electrical behavior of a plasma, such as an argon plasma, may be determined via simulation, or by measuring the electrical behavior on a new reactor that does not have a dielectric coating.

A reactor electrode may be assigned a predetermined threshold of low conductivity or conductance value that triggers service or replacement of an electrode. For example, if the conductivity of an electrode falls below about 80% of its expected value, the electrode may be replaced or treated to restore conductivity to an appropriate level.

In some embodiments, when an electrodes conductivity or conductance falls below and acceptable level, a cleaning cycle is performed. For example, a cleaning cycle may involve introducing a cleaning gas, e.g. argon, into the confinement region and operating the reactor to generate a plasma that removes some or all of the dielectric coating. In some cases, a weakly ionized plasma may be sufficient to remove the dielectric coating. In some cases, the argon gas may be fully ionized during a cleaning cycle. Depending on the chemical nature of the degradation, a chemically restorative treatment may be employed. For example, if the electrode degradation results from the formation of a hydride or other form of hydrogen-mediated reduction, the compromised electrode may be treated with an oxidizing agent, such as an oxygen-containing plasma.

In some cases, if the conductivity or conductance of an electrode falls below a designated level (e.g., about 50% of its expected value), the reactor may be determined to be unsafe to operate. This may be indicative that a thick dielectric film has formed and the reactor will require dangerous levels of power from a power source. In some cases, a control system or associated safety system may shut down operation until replacement or restoration of an affected electrode. In some cases, a reactor's control system contains logic for determining a mechanical failure of an electrode or other component and then triggering an alert or automatic shutdown of the reactor.

In some embodiments, one or more of the electrodes or magnets in a reactor include a protective or sacrificial layer. In some cases, this sacrificial layer is a sleeve (e.g., a sleeve that forms the interior surface of the confining wall) that may be replaced at scheduled intervals. In some embodiments, a metal component such as an electrode or a sleeve may be removed to undergo a restorative process, e.g. an annealing process to remove internal stresses that may have arisen due to thermal cycling. In some cases, e.g., when component experiences hydrogen embrittlement, the component may be removed and the material of the component may be reprocessed to make a new part. In some cases, an embrittled component, e.g. a tantalum electrode, may be restored to a ductile condition by annealing under a vacuum. For example, in some cases, an embrittled component may be restored by annealing at around 1200° C. under a vacuum.

Target materials (fusion reactants) may eventually be consumed and need to be replaced. For example, some embodiments employ lanthanum hexaboride which contains boron-11 as a reactant required for a proton-boron-11 fusion reaction. Once depleted, this material needs to be replaced. Due to thermal cycling, lanthanum hexaboride may also become brittle and fail. Destruction or degradation of lanthanum hexaboride will reduce the fusion reaction output. In some cases, a control system may notify an operator of a power drop-off that would correspond to a target material being depleted or moved out of the confinement region. In some cases, a control system may alert an operator when a consumable material like lanthanum hexaboride had reached a predetermined use limit and should be replaced.

EXAMPLES

The following non-limiting examples represent a few embodiments that may be practiced in accordance with the broader principles described herein.

1.) Negative Electrode (Outer Electrode)

The outer electrode, sometimes called the "shroud" includes a cylindrical metal ring with multiple points of attachment for the lanthanum hexaboride or other target material. The composition of the shroud is typically a refractory metal, such as tantalum (Ta) or tungsten (W), due to the high thermal resistance of refractory metals; however, certain embodiments of the reactor use lower temperature metals such as Alloy 316 Stainless Steel. These embodiments may include a liquid cooling circuit that prevents the shroud from reaching the critical melting temperature of the composition metal. As explained, the outer electrode may be either the more negative or the more positive electrode.

Electrical Conductivity

The plasma in the reactor is struck between the positive electrode and the negative electrode by utilizing electrical power from an external power supply. This event is mediated by the electrical voltage across the two electrodes and the electrical current traveling through the electrodes and the plasma. The voltage required to strike the plasma and initiate the fusion process may be directly related to the electrical conductivity of the two electrodes. As mentioned, there can be a dielectric (electrically insulative) coating that builds up on the negative electrode, thus affecting the electrical conductivity of the electrode.

A field-implementable diagnostic for determining conductivity of the outer electrode is a resistance measurement between two points using a digital multimeter. In some implementations, once the resistance is measured, its value is entered into QA software, which will indicate the conductivity and operational status of the outer electrode.

A second diagnostic for determining conductivity would involve the striking of an glow discharge argon plasma in the reactor. This is done via control software, which will subsequently monitor the electrical behavior of the argon plasma (voltage and current). By an automatic comparison to an internal calibration, the control software can determine the conductivity of the electrode and send the data to QA software.

If the QA software indicates that the electrical conductivity falls below 80% of the standard conductivity rating of the composition metal, then the AR unit is said to be outside of the optimal operation regime and into the non-optimal operation regime. If the conductivity falls below 50% of the standard rating, then the AR unit is said to be in the unsafe operation regime, as this will draw too much power from the power supply and provide a potential electrical and thermal hazard. If the conductivity is 0%, this indicates that a complete insulative layer has formed on the negative electrode and the system is non-operational.

Operation: Continue operating unit normally.

Non-optimal operation: Run Argon Cleaning Cycle on AR unit using provided control software. Repeat until conductivity enters 'optimal operation' zone. If conductivity does not improve, perform the 'unsafe operation' below.

Unsafe operation: The outer electrode should be cleaned.

Structural Integrity

It is possible for the mechanical structure of the shroud to become damaged, distorted, or embrittled. This can occur due to a number of different reasons.

A failure in the cooling system, or improper operation of the cooling system, can lead to extreme temperatures inside the reactor that are beyond the safe operating parameters. These extreme temperatures can lead to thermal shock, causing micro-fractures to appear on or within the shroud. Additionally, if these extreme temperatures approach the melting point of the shroud composition material, the shroud itself will begin to distort and melt.

A field-implementable diagnostic for detecting defects in structural integrity is visual inspection prompted by an abnormal temperature alert from the control software. The control software may monitor the temperature of several different components of the unit, and check that each component remains within safe operating parameters. If the temperature of any such component travels outside the safe operating parameters, it may trip a temperature indicator alarm. In extreme cases (such as a prolonged duration of an overheated component), the system may shut itself down and require a mandatory visual inspection of the integrity of the shroud. If the shroud is damaged, it may be sent to a QA team for inspection and analysis.

2.) Positive Electrode (Inner Electrode)

The inner electrode may includes a cylindrical metal disk and hollow metal cylinder attached to a high-voltage ceramic feedthrough on the back of the chamber. These two components are known as the 'head' and the 'rod.' The composition of the center electrode head is typically a refractory metal, such as tantalum (Ta) or tungsten (W), due to the high thermal resistance of refractory metals; however, different embodiments of the reactor use lower temperature metals such as Alloy 316 Stainless Steel. Higher-temperature center heads will operate longer and thus will warrant replacement less frequently. The center electrode rod is typically made of Alloy 316 Stainless Steel, since it does not experience the same extreme temperatures as the head.

In some embodiments, the center electrode rod is cooled with liquid water to prevent overheating. In embodiments utilizing a high-temperature head, the head is attached to the rod with a Molybdenum (Mo) set screw. In embodiments utilizing a low-temperature head, the head is also water cooled, and it is welded or soldered to the rod such that the cooling circuit is continuous.

Electrical Conductivity

As in the case for the outer electrode, the electrical conductivity of the inner electrode mediates the electrical behavior of the plasma. A change in the conductivity will result in the change of the voltage required to strike and sustain the plasma for the fusion reaction. As mentioned above, the volatile nature of the plasma and fusion reactions taking place inside the reactor can lead to the build-up of a dielectric coating on the surface of the inner electrode, thus affecting its electrical conductivity.

The standard field-implementable diagnostics for determining the electrical conductivity of the center electrode (with respect to the various operational regimes outlined above) are identical to those for the inner electrode.

Structural Integrity

The inner electrode has the same operational risks as the outer electrode (or shroud) with regards to the structural integrity of the component. It can be damaged, distorted, or embrittled; however, since there is a liquid cooling channel inside the inner electrode, there are additional methods for failure detection other than the thermal monitoring of specific components by the control system.

If the temperature of the center electrode rod (or the temperature of the liquid-cooled center electrode head described above as an alternate embodiment) approaches the melting temperature of the composition material, the outer surface of the rod (or head) may be breached, allowing a combination of water vapor and liquid water into the vacuum chamber. This can occur due to a failure of or improper use of the cooling system, as well as the appearance of a sustained plasma arc on the center electrode rod (or head) itself. Once this occurs, there will be an instantaneous rise in pressure due to the preponderance of water vapor entering the chamber through the breach. The control system will detect this pressure rise and immediately shut the system down with an error fault that warrants an immediate and required visual inspection.

3.) Lanthanum Hexaboride Target

Lanthanum Hexaboride, commonly referred to as $LaB_6$, is a refractory ceramic material that is used in the scientific industry as an electron emitter due to its low work function. In a reactor, the $LaB_6$ is attached to the negative electrode via uniformly distributed attachment points along the inner wall. The $LaB_6$ contains the solid boron fuel required for a fusion reaction, and will need to be replaced once the fuel is depleted.

Boron Isotope Composition

There are two main isotopes (atoms of same number of protons and different number of neutrons) of boron found in nature, $^{10}B$, and $^{11}B$. The most abundant of these two isotopes is $^{11}B$, as 80% of all Boron is found in this form. Since this is also the isotope required for the fusion reaction to take place, it may be necessary to know the relative concentration of this particular isotope present in the $LaB_6$ fuel. There are various methods for detective this concentration, including inductively coupled plasma optical emission spectrometry (ICP-OES), thermal ionization mass spectrometry (TIMS), secondary ion mass spectrometry (SIMS), inductively coupled plasma mass spectrometry (ICP-MS), among others.

In some embodiments, there is not field-implementable diagnostic that is able to measure the boron isotope composition of the $LaB_6$, as these are techniques that require the sample to be sent to a third-party analytical diagnostics lab.

Structural Integrity

Due to the ceramic nature of this compound, it is extremely brittle, and is extremely susceptible to thermal stress. The volatile reactions occurring inside the reactor, as well as the rapid rates of heating and cooling present in various components such as the center electrode and the shroud, can cause the structural integrity of the $LaB_6$ to break down. It has been observed in several embodiments of the reactor that the $LaB_6$ fuel will tend to break apart over time, which warrants the need for replacement.

One field-implementable diagnostic for determining the structural integrity (and lack thereof) of the $LaB_6$ fuel is by visual inspection. There are certain indicators provided by the control software that warrant the need for a visual inspection of the $LaB_6$. Because the fusion reactions occur at the $LaB_6$ sites, the entirety of the output power (as measured by the control software) is extracted from these sites. If the steady-state power output of the reactor drops by more than 20%, it could indicate a problem with one of the $LaB_6$ pieces and trip a power indicator alarm on the software. This type of alarm would warrant the need for a visual inspection of the $LaB_6$ pieces.

Energy Conversion Hardware

Reactors as described herein produce energy in one or more forms; typically they produce multiple forms of energy simultaneously. When operating, most reactors produce thermal energy. They may also produce radiant energy over a broad or narrow range of frequencies. For example, excited species within the reactor (e.g., electronically excited hydrogen atoms) emit radiation in one or more frequency bands. Often the reactor operates in modes that require plasma and/or produce a plasma, and when the plasma exists it produces radiant energy. Still further, many reactions produce charged species (e.g., ions such as alpha particles) with high levels of kinetic energy. Reactors may also produce mechanical energy through pressure variations or oscillations.

Any one or more of these energy forms may be converted to different energy forms usable for particular applications. Therefore, in certain embodiments, an energy conversion device or component is coupled to an associated reactor. In some cases, the energy conversion device converts thermal energy from the reactor to electrical energy (e.g., a thermoelectric device). In some cases, the energy conversion device converts thermal energy from the reactor to mechanical energy (e.g., a heat engine). In some cases, the energy conversion device converts electromagnetic radiation from the reactor to electrical energy (e.g., a photovoltaic device). In some cases, the energy conversion device converts the kinetic energy of charged reaction products (e.g., alpha particles) or ionized fusion reactants (e.g., protons) to electrical energy. In some cases, the energy conversion device converts mechanical energy from the reactor to electrical energy (e.g., a piezoelectric device).

Various energy conversion devices may be used to convert thermal energy produced by reactor into mechanical and/or electrical energy. For example, a thermoelectric generator may be thermally coupled to a reactor to generate electrical energy. A thermoelectric generator may be thermally coupled to the reactor by, for example, being placed on the confinement wall of the reactor or having thermal energy from the reactor delivered via a heat transfer device such as a heat pipe. In another example, a reactor may convert thermal energy into mechanical energy (e.g., a moving piston or a rotating crankshaft) via a heat engine. In some embodiments, a reactor is outfitted with a Stirling engine. In some embodiments, the reactor may be outfitted with a heat engine, e.g., a heat engine that uses the Rankine cycle, where the working fluid experiences cyclic phase changes. If electrical energy is desired, a heat engine may be configured with an electric generator that converts, for example, a rotating crankshaft or an oscillating piston into electrical energy.

Some energy conversion devices may convert electromagnetic radiation or radiant energy produced by reactor into electrical energy. For example, a reactor may have photovoltaic cells on either end of the confinement region to convert radiant energy into electrical energy. In some cases, the reactor may include a transparent barrier to provide thermal protection and/or optical devices to concentrate the radiant energy onto a photovoltaic cell. In some cases, a photovoltaic cell may have a tuned bandgap corresponding to a narrowband wavelength of radiant energy (e.g., corresponding to hydrogen) emitted from the reactor.

The reactor may also be configured with components that convert the kinetic energy of charged particles emitted from a reactor into electrical energy. For example, positively charged particles (e.g. alpha particles) may be forced to travel through an opposing electric field generated by one or more electrodes that slow their travel. As the particles decelerate, an electric current is generated in an electrical circuit connected to the positively charged electrode(s). In some cases, alpha particles emitted from the reactor may be directed towards such electrodes via applied magnetic fields. In some cases, the reactor may be configured with a magnetohydrodynamic generator (MHD generator) that converts the kinetic energy of a plasma generated as a result of a nuclear reaction into electrical energy.

In some cases, the reactor may use a single energy conversion device (or energy conversion modules) to convert energy produced by the reactor into mechanical and/or electrical energy. In some embodiments, the reactor may use a plurality of energy conversion devices (or energy conversion modules) to convert energy produced by the reactor into mechanical and/or electrical energy. Since the reactor may produce various forms of energy, different types of energy conversion devices may be combined to increase the total mechanical and/or electrical energy that is generated. In some cases, the addition of a second energy conversion device may not reduce the energy output of a first energy conversion device because the energy conversion devices convert different forms of energy produced by the reactor. For example, in some embodiments, the reactor may generate electrical energy from both a photovoltaic cell which converts radiant energy and a thermoelectric generator which converts thermal energy. In this example, the presence of a photovoltaic cell may not diminish the electrical energy produced by the thermoelectric generator and vice versa. In some embodiments, a reactor may be outfitted with multiple energy conversion devices that convert the same type of energy produced by the reactor. For example, in some cases, a reactor may be outfitted with a Stirling engine as well as a thermoelectric generator both of which make use of thermal energy. In this example, a thermoelectric generator may simply capture the thermal energy that was not converted to mechanical and/or electrical energy by the Stirling engine. In general, any combination of energy conversion devices or modules described in herein may be used to generate mechanical and/or electrical energy from a reactor.

Enclosure

While not depicted, a reactor may include an enclosure that walls off the confinement region from the ambient environment. In some cases, the dimensions of an enclosure are governed in part by the outer dimensions of a confining wall. In some embodiments, the confining wall defines the boundary of the enclosure in the r-direction, and the confinement region is isolated from the external environment using flanges on both ends of the confinement wall in the z-direction. In some embodiments, an entire system including control systems, power supplies, magnets, and energy conversion apparatuses is placed within an enclosure. Materials chosen for an enclosure may depend on the enclosure's intended purpose. For example, enclosures may be needed to provide biological shielding, thermal isolation, and/or to enable low-pressure operating conditions. In some cases, an enclosure may have a layered structure in which each layer provides a different function. For example, an enclosure may include a hydrocarbon material for biological shielding and a ceramic layer to provide thermal insulation. In some cases, more than one enclosure may be used. For example, a first enclosure may include flanges that seal off the confinement region in the z-direction creating a vacuum chamber while a second, exterior enclosure encompasses the entire reactor. Based on the disclosure and teachings provided herein, a person of ordinary skill in the art will know and appreciate ways and/or methods to implement an enclosure to that meets the needs of a reactor's application.

Process Conditions

Multistage Operations and/or Reactions

Figure 25:
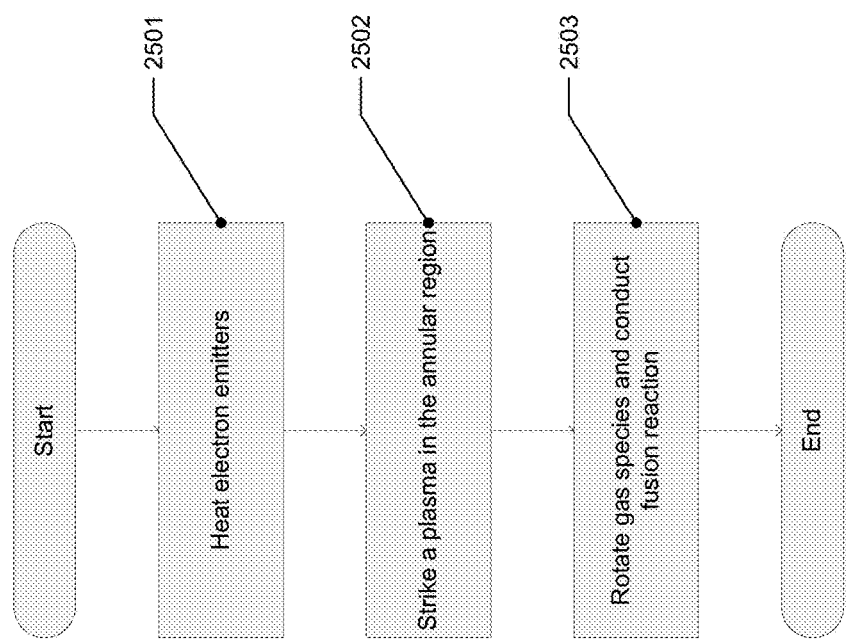
FIG. 25 depicts an example of a multistage process flow that may be used to operate a reactor

In some cases, the energy output or efficiency of a reactor is improved when operated in multiple stages. In some cases, a reactor may have one or more preparatory stages that prime the conditions within a reactor for conducting a fusion reaction. For example, preparatory stages in a multistage process may be used to increase the temperature of electron emitters, cool the temperature of a confining wall, generate a plasma within the confinement region, or modify the gas pressure within the confinement region. FIG. 25 depicts an example of a multistage process flow that may be used to operate a reactor. In a first operation, 2501, electron emitters are heated until they reach a prescribed temperature for emitting electrons. After heating the electron emitters in 2501, an alternating current is applied between the electrodes of the reactor to strike a weakly ionized plasma.

Immediately after initiating a plasma in the confinement region, the reactor may transition to a stage used to rotate charged particles in the reactor and sustain a fusion reaction. In some Lorentzian rotors, this may mean applying a direct current to the electrodes when a uniform magnetic field is applied. Alternatively, in embodiments in which an alternating magnetic field is applied in the z-direction of a reactor, this may mean applying an alternating current to the electrodes at the same frequency that the magnetic field oscillates. In some cases, an alternating magnetic field may be applied by applying an alternating current to an electromagnet (e.g. a superconducting magnet) or physically moving permanent magnets by, e.g., by having rotors having magnets with alternating magnetic orientations on either side of the confinement region. In some cases, the rotation of neutrals and charged particles is maintained in the same direction by alternating the electric field and the magnetic field at the same frequency. For example, in some cases, the both the electric and magnetic field may be oscillated at a frequency that is between about 0.1 Hz and 10 Hz, in some cases, about 10 Hz to about 1 kHz, and in some cases greater than 1 kHz.

In a wave-particle embodiment, a sequence of electrode charges, or a drive signal, may be applied to the electrodes bordering the confinement region to initiate rotation. For example, a drive signal may be started a low frequency, e.g. about 60 Hz and then ramp up to a higher frequency e.g. about 10 MHz. In some cases, a reactor may include a similar multistage process for terminating a fusion reaction. In some cases, a reactor may have an idle stage of operation that occurs between when fusion reaction is halted and then resumed. During operation of a reactor, the parameters may be closely monitored. In a reactor that makes use of a Lorentz force to rotate charges species, the current density in the confinement region or annular space near the confining wall may be in the range of about 150 A/m$^2$ to about 10 kA/m$^2$, e.g., about 150 A/m$^2$ to about 9 kA/m$^2$. In some cases, the current density near a confining wall may be in the range of about 150 A/m$^2$ to about 700 kA/m$^2$, and in some cases in the range of about 400 A/m$^2$ to about 6000 kA/m$^2$. In some cases a reactor is operated to maintain a sufficient electric field near the confining wall. For example, in some cases the electric field is greater than about 25 V/m, in some cases greater than about 40V/m, and in some case greater than about 30V/m.

In some multistage operations, a reactor may periodically alternate the direction in which charged particles are rotated. In some cases, by alternating the direction that charged particles rotate, the rate of collisions between two rotating fusion reactants may be increased. In some cases, the direction of rotation may be alternated to increase or control the rate of fusion in a reactor. In some embodiments, by alternating the direction of rotation the rate of fusible events on a confinement wall may be reduced due to fusible events occurring within the annular space rather than on the confinement surface. This may be beneficial to, for instance, reduce heat imparted to a confinement wall if the confinement wall becomes too hot. In the cases of Lorentzian rotors, the direction of rotation may be alternated by alternating an applied electric field and/or magnetic field. For example, if the magnetic field is alternated while an electric field is maintained, the Lorentzian force on charged particles will also alternate directions. In some cases, an applied electric field and or an applied magnetic field is alternated at a frequency between about 0.1 Hz to about 10 Hz, in some cases, about 10 Hz to about 1 kHz, and in some cases greater than about 1 kHz. This may have the effect of concentrating electrons in the electron-rich region, concentrating rotating particles in close proximity, and in some cases, increasing the number of fusion reactions.

Gas Conditions

In cases where gas is introduced into the confinement region, e.g. a hydrogen or helium reactant gas, it may be beneficial for the reactant gas to have certain purity. In some cases, impurities in a reactant gas volume may decrease the rate of fusion and the overall energy output. In cases where a reactant gas is readily available in a pure form, a reactant gas having a purity of at least about 99.95% by volume or at least about 99.999% by volume. This means there are fewer than 10 vpm (volume per million) impurities in the cylinder.

In some cases, deuterium, a naturally occurring isotope of hydrogen, may be found within a hydrogen reactant gas. For example, deuterium may be present within the impurities of a hydrogen tank, and as such, present a potential hazard when present in sufficient quantities within the reactant gas. If there is too much deuterium in the fuel, fusion reactions other than proton-boron[11] may occur within the reactor. In some instances, these other reactions may emit radioactive byproducts. To monitor the amount of deuterium in a reactant gas, a reactor may be equipped with sensors, such as the qRGA from Hiden Analytical mass spectrometer, for monitoring the amount of deuterium within a hydrogen reactant gas.

Prior to ignition, a reactor may contain a mole fraction of ions to neutrals that is close to 0%. After striking a plasma, the reactor may be operated having a mole fraction of ions to neutrals in the rotating gas species that is about 1:1000 to about 1:1,000,000. In some cases, the mole fraction of ions to neutrals in a reactant gas may vary depending on the particular stage of a multistage process flow. For example, in the process flow of FIG. 25, a gas may have a higher mole fraction of ions to neutrals after initiating a plasma in stage 2502 than while the reactor is operating at steady state in stage in 2503.

As described elsewhere, reactors may be equipped with gas inlet and exit valves. In principle, the flow through a gas inlet valve and/or a gas outlet valve may be controlled to maintain a desired gas composition or gas pressure within the confinement region. In some cases, the gas volume in the confinement region may be replaced at a rate that is less than about once a minute, or about once an hour. In many embodiments, gas valves may be sealed, so there is no fluid flow during operation of the reactor.

In some cases, a reactant gas is maintained at standard temperature and pressure before generating a plasma in the confinement region. In some cases, such as when a vacuum enclosure is used, a vacuum pump may be used to lower the pressure to less than about $1 \times 10^{-2}$ Torr, and in some cases less than about $1 \times 10^{-6}$ Torr, prior to striking a plasma in the confinement region. In some cases, to increase the density of neutrals a reactant gas feedline may increase the pressure within a reactor to more than about 0.1 Torr, and in some cases more than about 10 Torr before striking a plasma in the confinement region or during operation of a reactor. During operation of the reactor, particles may experience a centripetal acceleration that is on the order of a billion times that of the gravitational acceleration on the surface of the earth. In some cases, the gas pressure and/or density along the confinement wall may be monitored during operation of the reactor. If the pressure induced the rotating species is not sufficient near the confining wall, the electron rich region may diffuse farther into the confinement region and not provide the desired electron screening effect. In some cases, the gas pressure near the confinement wall may be monitored in real time. Prior to initiating a plasma the temperature of a gas may be approximately at room temperature, in some cases a gas is initially heated. In some cases, the gas is heated to greater than about 1,800° C., and in some cases the gas is heated to greater than about 2,200° C. During steady operation of the reactor the gas temperature may me heated such that the gas in the confinement region is in the range of about 400° C. to about 800° C., and in some cases in the range of about 900° C. to about 1,500° C.

As discussed elsewhere, a reactant gas may be delivered into a reactor by a variety of mechanisms. In cases in which as inlet valve is used, a gas reactant may be delivered from a gas canister or pressurized tank. In some embodiments, a reactant gas such as hydrogen may be delivered into the confinement region by being out-diffused from the confinement wall or a hydrogen absorbing material such as titanium or palladium.

Operating Conditions for Reducing Coulombic Barrier

As described elsewhere herein, the rate of fusion per volume per unit time may be expressed by $$dN/dT = n_1 n_2 \sigma v$$

where $n_1$ and $n_2$ are the densities of the respective reactants, $\sigma$ is the fusion cross section at a particular energy, and $v$ is the relative velocity between the two interacting species. The product ($\sigma v$) may be increased by reducing the coulombic barrier. In some cases the fusion cross section may be between about $10^{-30}$ cm$^2$ and about $10^{-48}$ cm$^2$, and in some cases about $10^{-28}$ cm$^2$ and about $10^{-24}$ cm$^2$. In some cases the relative velocity is between $10^4$ m/s and $10^6$ m/s, and in some cases between about $10^3$ m/s and about $10^4$ m/s. In some cases, a reduction to the coulombic barrier may result in a reaction rate that is about $10^{17}$ to about $10^{22}$ fusion reactions per second per cubic centimeter along the confinement wall.

As discussed elsewhere, an electron-rich region may be formed near the confinement wall to provide a screening effect between colliding nuclei. In some cases, electron emitters may be used to provide free electrons to this region. Emitters may be energized optically (e.g., using a laser), by frictional heating of the rotating particles, and/or by Joule heating.

Within the electron-rich region, the density of electrons may be on order of about $10^{10}$ cm$^{-3}$ to about $10^{23}$ cm$^{-3}$, and in some cases, the density of electrons is on the order of about $10^{23}$ cm$^{-3}$ within this region. In some embodiments, the density of neutrals in the electron-rich region may be about $10^{16}$ cm$^{-3}$ to about $10^{18}$ cm$^{-3}$, and in some cases, the neutrals density within the confinement region is on the order of about $10^{20}$ cm$^{-3}$. Positive ions may be found at a much lower density than neutrals within the electron-rich region. In some cases, the density of positive ions is about $10^{15}$ cm$^{-3}$ to about $10^{16}$ cm$^{-3}$. In some cases the ratio of electrons to positive ions within the electron-rich region is in the range of about $10^6$:1 to about $10^8$:1.

The radial thickness of the electron-rich region may be characterized as the region in where most of the electron gradient exists. In some cases, the electron-rich region is in the range of about 50 nm to about 50 um, in some cases, the electron rich is about 500 nm to about 1.5 um.

Within the electron-rich region, e.g. about 1 um away from the confining wall, there may be a strong electric field. In some cases, the electric field within the electron-rich region (or confinement region) is greater than $10^6$ V/m, and in some cases, the electric field is greater than about $10^8$ V/m. In some cases, the temperature of electrons in this region is about 10,000 K to about 50,000 K, and in some cases about 15,000 K to about 40,000 K.

In some cases, if one parameter is constrained by a physical limitation, that parameter may end up being a driving parameter that affects other parameters within the electron-rich region. For example, the Lawson criterion involves a balance of parameters.

In some cases, the parameters of the electron-rich region may depend in part on the fusion reaction that is targeted. For example, the parameter ranges are different in a p+$^{11}$B reaction vs. a D+D reaction.

In general, certain embodiments of this disclosure lower or reduce the Coulomb barrier by creating, modifying, or utilizing effects that have negative (attractive) potentials. In these embodiments, the potential of approaching nuclei has a substantially lowered Coulomb barrier for tunneling.

Another approach to increasing the probability of fusion events is by aligning the spin of the fusion reactants. The nuclear force has a spin-dependent component. When spins are aligned, between two nuclei, e.g., those of a deuteron and a deuteron, the coulombic barrier is reduced. Nuclear magnetic moments play a role in quantum tunneling. Specifically, when the magnetic moments of two nuclei are parallel, an attractive force between the two nuclei is created. As a result, the total potential barrier between two nuclei with parallel magnetic moments is lowered, and a tunneling event is more likely to occur. The reverse is true when two nuclei have antiparallel magnetic moments, the potential barrier is increased, and tunneling is less likely to occur. When the magnetic moment of a particular type of nucleus is positive, the nucleus tends to align its magnetic moment in the direction of an applied magnetic field. Conversely, when the moment is negative, the nucleus tends to align antiparallel to an applied field. Most nuclei, including most nuclei which are of interest as potential fusion reactants, have positive magnetic moments (p, D, T, $^6$Li, $^7$Li, and $^{11}$B all have positive moments; $^3$He and $^{15}$N have negative moments). In certain embodiments, a magnetic field is provided that aligns the magnetic moments in approximately the same direction at every point within the device where a magnetic field is present. This results in a reduction of the total potential energy barrier between nuclei when the first and second working materials have nuclear magnetic moments which are either both positive or both negative. It is believed that this leads to an increased rate of tunneling and a greater occurrence of fusion reactions. This effect may also be referred to as spin polarization or magnetic dipole-dipole interaction. In addition, the gyration of a nucleus about a magnetic field line also contributes to determining the total angular momentum of the nucleus. So when the cyclotron motion of the nucleus produces additional angular momentum in the same direction as the polarization of the nuclear magnetic moment, the Coulomb barrier is further reduced.

In some cases, the spin states of fusion reactants (e.g., $^1$H and $^{11}$B) in the confinement region and along the confining wall may be aligned by applying a magnetic field in the range of 1-20 T. In cases in which a magnetic field is used to provide a Lorentzian force, the magnetic field may also align the spin states of the fusion reactants. The combination of a reduced coulombic barrier through, e.g., electron screening and a spin polarization (enabled by a strong magnetic field acting on the reactant nuclei) may produce a significant enhancement in the rate fusion. The electrostatic attraction between two nuclei includes a spin-dependent term that becomes dominate at short distances (e.g., less than 1 fm).

Applications

Fusion reactors as described herein have abundant applications that may resolve many societal issues such dependence on fossil fuels. In some cases, the use of fusion reactors may make feasible and/or practical energy intensive applications that were not feasible or practical with conventional power generation methods. A few applications of fusion reactors are now briefly discussed.

In some cases, fusion reactors may be used to retrofit a fossil fuel power plant such as a power plant which burns coal, natural gas, or petroleum to produce electricity. In some cases, fusion reactors described herein may be used to retrofit a fission power plant. When retrofitting a power plant, in some cases, it may only be necessary to replace or update the portions of the power plant where energy is produced. This makes power plant retrofits simple and cost efficient as turbines, generators, cooling towers, connections to a power distribution network, and other infrastructure may be reused. For example, a coal power plant may be retrofitted by replacing a coal-fired boiler with a fusion boiler that utilizes a reactor described herein. Similarly, a fission power plant may be retrofitted by replacing the control rods and uranium fuel with a fusion reactor as described herein.

In some cases, a fusion reactor has a modular design that employs a plurality of smaller reactors. By having a plurality of reactors, the power output of a plant may be modulated to meet energy demand by varying the number of reactors in operation. Additionally, if individual reactors can be serviced or replaced while other reactors remain operable, the overall power output of the plant may not be significantly affected.

In some cases, a fusion reactor may be used as a heating interface for industrial processes such as fiberglass manufacture. In some cases, a reactor is configured as the heat source for a steam generator (e.g., a steam generator used for steam cleaning or metal cutting). In some cases, a reactor is used as a source of helium where helium is produced as a result of a fusion reaction (e.g., when the reactor conducts proton-boron-11 fusion). In some cases, the reactor may be used as part of a water heater, such as a home-sized water heater. For example, the reactor may be placed within a water tank or may be thermally coupled to a water tank such that heat emanating from the reactor is used to heat water. In some cases, a fusion-based water heater may be paired with a water radiator to provide indoor heating.

In some cases, a fusion reactor is used for transportation applications. For example, a fusion reactor may be used to power and automobiles, planes, trains, and boats. An automobile, for instance, may be outfitted with a reactor having one or more energy conversion modules configured to generate electrical and/or mechanical energy. In an electric car, electrical energy produced by a reactor may be used to charge a battery or capacitor which is used to provide power to an electric motor. For example, a reactor may be operated to charge a car battery whenever the battery's state of charge falls below a certain threshold value. In some cases, mechanical energy is produced by, for example, a Stirling engine which is used to provide the driving power for a car. In some cases, a fusion reactor may be used to provide power to outer space vehicles. Some designs for outer space vehicles use a fission reactor such as a radioisotope thermoelectric generator. Such designs suffer from use and generation radioactive isotopes. They also require carrying relatively large amounts of radioactive fuel. Since reactors described herein may be aneutronic or substantially aneutronic, these reactors may be much more preferable for spacecraft designed to carry human occupants. Additionally, the energy densities of fusion reactants used for reactors described herein are significantly higher than fuels required by a fission reaction or a chemical reaction to produce the same amount of energy.

The claim elements that do not recite "means" or "step" are not in "means plus function" or "step plus function" form. (See, 35 USC § 112(f)). Applicant intends that only claim elements reciting "means" or "step" be interpreted under or in accordance with 35 U.S.C. § 112(f).

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A reactor comprising:
   a substantially cylindrical confining wall that has a longitudinal axis and at least partially encloses a confinement region;
   a plurality of electrodes adjacent or proximate to the confinement region;
   an inlet to the confinement region for permitting introduction of a fluid to the confinement region, the fluid containing a first reactant;
   a second reactant; and
   a control system comprising one or both of a voltage source and a current source and configured to apply an electric potential between at least two of the plurality of electrodes that generates an electric field and an electrical current between the at least two electrodes;
   wherein:
   the electrical current generates, from the first reactant, an ionized plasma of ions and neutrals;
   the electric field, alone, or in conjunction with a magnetic field, induces and/or maintains azimuthal rotation of the ions in the confinement region around the longitudinal axis, the azimuthal rotation of the ions configured to: (i) impart azimuthal rotation to neutrals of the first reactant, and (ii) promote repeated collisions between one or both of the ions and the neutrals with the second reactant; and, during operation:
   the repeated collisions produce an interaction with the second reactant that produces a product having a nuclear mass that is different from a nuclear mass of any of the nuclei of the neutrals and the reactant; and
   an electron-rich region proximate to the second reactant has an excess of electrons over positively charged particles of at least about $10^6/cm^3$.

2. The reactor of claim 1, wherein the plurality of electrodes are azimuthally distributed about the confinement region, and wherein the control system is configured to induce rotational movement of charged particles and the neutrals in the confinement region by applying time-varying voltages to the plurality of electrodes.

3. The reactor of claim 1, wherein the reactor is configured to induce rotational movement of charged particles and the neutrals in the confinement region by an interaction between the electric field and an applied magnetic field within the confinement region.

4. The reactor of claim 1, wherein, during operation, a ratio of electrons to positive ions within the electron-rich region is between about $10^6:1$ and $10^8:1$.

5. The reactor of claim 1, wherein, during operation, the electron-rich region has an electric field strength of at least about $10^6$ V/m.

6. The reactor of claim 1, wherein, during operation, the electrons in the electron-rich region have a temperature, on average, of between about 10,000 K to 50,000 K.

7. The reactor of claim 1, wherein, during operation, the neutrals in the electron-rich region have an energy of, on average, of between about 0.1 eV and 2 eV.

8. The reactor of claim 1, wherein, during operation, the electrons in the electron-rich region have a density of about $10^{10}$ cm$^{-3}$ to about $10^{23}$ cm$^{-3}$.

9. The reactor of claim 1, wherein, during operation, the electron-rich region extends from the reactant into the confinement region by a distance of between about 50 nanometers and 50 micrometers.

10. The reactor of claim 1, wherein, during operation, the neutrals in the confinement region proximate the reactant have a concentration of at least about $10^{16}$/cm$^3$.

11. The reactor of claim 1, further comprising an electron emitter disposed in or adjacent to the confinement region such that, during operation, the electron emitter generates electrons in the confinement region.

12. The reactor of claim 11, wherein the electron emitter is attached to or embedded in the confining wall.

13. The reactor of claim 11, wherein the electron emitter has at least one point protruding into the confinement region.

14. The reactor of claim 11, further comprising a laser configured to emit a beam of light through the confinement region and onto the electron emitter or the confining wall such that interaction between the beam of light and the electron emitter or the confining wall causes electrons to be emitted into the confinement region.

15. The reactor of claim 11, wherein the electron emitter comprises boron or a boron-containing material.

16. The reactor of claim 1, wherein the reactant comprises boron-11.

17. The reactor of claim 1, wherein the interaction is a fusion reaction.

18. The reactor of claim 17, wherein the fusion reaction is aneutronic.

19. The reactor of claim 1, wherein the neutrals comprise neutral hydrogen, deuterium, and/or tritium.

20. The reactor of claim 1, further comprising an energy conversion device configured to extract thermal energy, the kinetic energy of charged reaction products, and/or mechanical energy from the reactor and convert said thermal, kinetic, and/or mechanical energy to electrical and/or mechanical energy for doing work outside the reactor.

* * * * *